United States Patent
Yoneda et al.

(10) Patent No.: US 6,998,453 B2
(45) Date of Patent: Feb. 14, 2006

(54) (METH)ACRYLIC ACID TYPE POLYMER AND UNSATURATED POLYALKYLENE GLYCOL TYPE COPOLYMER, AND METHODS FOR PRODUCTION THEREOF

(75) Inventors: Atsuro Yoneda, Toyonaka (JP); Takahiro Tsumori, Suita (JP); Yoshikazu Fujii, Suita (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/262,985

(22) Filed: Oct. 2, 2002

(65) Prior Publication Data

US 2003/0158361 A1   Aug. 21, 2003

(30) Foreign Application Priority Data

Oct. 3, 2001 (JP) .............................. 2001-307757
Jun. 20, 2002 (JP) .............................. 2002-180455

(51) Int. Cl.
   *C08F 2/00* (2006.01)
(52) U.S. Cl. .................................... 526/234; 526/317.1
(58) Field of Classification Search ................ 526/234, 526/317.1, 81
   See application file for complete search history.

(56) References Cited

U.S. PATENT DOCUMENTS

| 3,646,099 | A | 2/1972 | Dannals |
| 6,297,336 | B1 * | 10/2001 | Shioji et al. ............. 526/317.1 |
| 6,310,156 | B1 | 10/2001 | Maeda et al. |
| 2002/0019329 | A1 * | 2/2002 | Hemmi et al. .............. 510/475 |

FOREIGN PATENT DOCUMENTS

| EP | 1 182 217 A2 | 2/2002 |
| JP | B-60-248061 | 6/1985 |
| JP | A-64-38403 | 2/1989 |
| JP | A-05-86125 | 4/1993 |
| JP | 11-315115 | 11/1999 |
| JP | 2002-60785 | 2/2002 |

* cited by examiner

*Primary Examiner*—Tatyana Zalukaeva
(74) *Attorney, Agent, or Firm*—Mathews, Shepherd, McKay & Bruneau, P.A.

(57) ABSTRACT

This invention concerns a (meth)acrylic acid type polymer, wherein the value S representing the quantity of an sulfur element introduced which is defined by the formula, S=(quantity of S contained in polymer)/(total quantity of S)×100, is not less than 35. This (meth)acrylic acid type polymer is a water-soluble polymer of a low molecular weight which has only a small impurity content, entails no precipitation of an impurity during the preservation at a low temperature, and excels in dispersibility, chelating ability, and an anti-gelling property.

9 Claims, No Drawings

(METH)ACRYLIC ACID TYPE POLYMER AND UNSATURATED POLYALKYLENE GLYCOL TYPE COPOLYMER, AND METHODS FOR PRODUCTION THEREOF

BACKGROUND OF THE INVENTION

1. Field of the Invention

This invention relates to (meth)acrylic acid type polymers used advantageously for such applications as water type dispersants, descaling agents, and detergent builders, a method for the production thereof, and a detergent using thereof.

This invention also relates to unsaturated polyalkylene glycol type copolymers used advantageously for such applications as water type dispersants, descaling agents, cement additives, and detergent builders, a method for the production thereof, and detergents using thereof.

2. Description of the Related Art

<Prior Art Concerning (meth)acrylic Acid Type Polymer>

Of such water-soluble polymers as polyacrylic acid and polymaleic acid, those which have low molecular weights have been heretofore used advantageously for dispersants directed toward inorganic pigments and metal ions, descaling agents, and detergent builders. As a means for obtaining such water-soluble polymers of low molecular weights, the methods which are disclosed, for example, in JP-A-64-38403 and JP-A-05-86125 have been known.

The method disclosed in JP-A-64-38403, in radically polymerizing one or more water-soluble vinyl monomer (ethylenic monomer) with the use of a water-soluble azo type radical polymerization initiator, contemplates the presence in the reaction system of 0.1–30 mol % of sulfurous ion based on the quantity of the monomer. The monomer used in this case does not need to be particularly restricted but is only required to be a water-soluble vinyl monomer. The use of this method allows production of water-soluble polymers of low molecular weights not less than several tens of thousand with satisfactory reproducibility.

JP-A-05-86125 obtains a water-soluble polymer formed of not less than 95 mol % of acrylic acid or an acrylate by subjecting acrylic acid or an acrylate to aqueous solution polymerization while retaining the pH of the solution in the range of 6–9 (under the neutral condition). At this time, the number average molecular weight of the polymer is in the range of 300–10000 and the degree of dispersion is in the range of 1.3–2.3. Since the water-soluble polymer obtained by this method has a low molecular weight and has a degree of dispersion in a narrow range (having a narrow molecular weight distribution), it exhibits a high degree of dispersibility and is used advantageously for various dispersants and detergent builders.

JP-B-60-24806 discloses a method for producing an acrylate type low molecular weight polymer. The method of JP-B-60-24806 consists in subjecting (A) an alkali metal salt of acrylic acid, (B) acrylamide or 2-hydroxyethyl (meth)acrylate, and (C) a hydrophilic monomer capable of copolymerizing with the (A) and (B) components mentioned above in a prescribed ratio to aqueous solution polymerization. The polymerization conditions are not less than 10 liters of air per mol of the (A) component and a polymerization temperature of not higher than 80° C.

The acrylate type water-soluble polymer obtained by this method has a molecular weight in the range of 500–100000 and a narrow molecular weight distribution. Further, the water-soluble polymer entrains no impurity and incurs coloration only slightly. Moreover, the terminal of the straight chain or the side chain of this water-soluble polymer is capable of introducing 0.5–1.5 sulfonic groups per molecule. The water-soluble polymer, therefore, excels in dispersibility and the chelating property and can be advantageously used for dispersants directed to inorganic pigments, detergent builders, cleaning agents, and descaling agents.

As a technique for producing a low molecular polymer which is not such a water-soluble polymer as mentioned above, the method disclosed in U.S. Pat. No. 3,646,099 may be cited. The low molecular weight polymer which is disclosed in this publication is intended for use in electroconductive coating materials. It is formed by polymerizing (meth)acrylonitrile and a hydrophobic monomer and has to fulfill the essential requirement that the hydrophobic monomer be in a proportion of not less then 40 mol %. By this method, it is made possible to produce a polymer having a molecular weight of not more than 25000.

By the techniques disclosed in JP-A-64-38403 and JP-A-05-86125, however, it is difficult to introduce a sulfonic group quantitatively into the terminal or the main chain of the relevant polymer. The water-soluble polymers obtained by these techniques, therefore, hardly deserve to be rated fully excellent in the dispersibility and the anti-gelling property and are not optimum for dispersants, detergent builders, cleaning agents, and descaling agents.

By the technique which is disclosed in JP-B-60-24806, it is made possible to obtain a water-soluble polymer having a sulfonic group introduced to a certain degree therein. Since the monomer used in this technique is an acrylate (alkali metal salt), the system of polymerization reaction is substantially completely neutralized.

In the polymerization performed in such a neutral state as uses an acrylate, when the concentration of a solid component in the reaction system is heightened, the viscosity of the reaction solution tends to increase conspicuously in accordance as the polymerization proceeds and the molecular weight of the produced polymer tends to increase to a copious degree. Thus, the technique taught in JP-B-60-24806, when used in the polymerization of a monomer, is at a disadvantage in failing to produce a polymer of a low molecular weight under the condition of a high concentration and incurring a decline in the efficiency of production.

Further, by the technique disclosed in U.S. Pat. No. 3,646,099, it is made possible to produce a polymer of a low molecular weight advantageously. The technique disclosed in U.S. Pat. No. 3,646,099, however, is directed toward producing a polymer using a hydrophobic monomer in a proportion of not less than 40 mol %. The low molecular weight polymer consequently obtained is not soluble in water. Specifically, the technique disclosed in U.S. Pat. No. 3,646,099 is directed toward producing a low molecular weight polymer for use in electroconductive coating materials. By simply substituting the monomer for a water-soluble monomer, it is not possible to produce satisfactorily a water-soluble polymer.

In order for the water-soluble polymer of a low molecular weight mentioned above to be used advantageously for dispersants, descaling agents, and detergent builders, the water-soluble polymer is preferred to excel in the anti-gelling property, i.e. quality of rejecting gelation, besides the dispersibility and the Ca-binding capacity which are inherent in the water-soluble polymer. The techniques disclosed in the publications mentioned above, however, are incapable of producing a water-soluble polymer excelling in the anti-gelling property. They are, therefore, incapable of obtaining a water-soluble polymer possessing properties which fully befit dispersants, descaling agents, and detergent builders.

Thus, the methods described above are not fully satisfactory for the water-soluble polymer of a low molecular weight which excels in the dispersibility and the anti-chelating property and excels in the anti-gelling property as well and for the purpose of effecting efficient production of the water-soluble polymer.

The present inventors have discovered that a (meth) acrylic acid type polymer of a low molecular weight excelling in the dispersibility and the chelating property and in the anti-gelling property as well can be efficiently produced by polymerizing a monomer having a sulfonic group quantitatively introduced into the terminal and containing (meth) acrylic acid under an acidic condition. The (meth)acrylic acid type polymer mentioned above is a polymer which is formed by polymerizing 50–100 mol % of (meth)acrylic acid and 0–50 mol % of a water-soluble monoethylenically unsaturated monomer capable of copolymerizing with the (meth)acrylic acid in an aqueous solution and which has a sulfonic group linked to the terminal thereof. This (meth) acrylic acid type polymer is characterized by the fact that the value Q representing the anti-gelling ability defined by the formula, Q=Degree of gelation×$10^5$/weight average molecular weight, is less than 2.0. The (meth)acrylic acid type polymer is a water-soluble polymer of a low molecular weight which excels in the anti-gelling property and in the dispersibility and the chelating ability as well. In the method for the production of this polymer, the hydrophilic monomer containing not less than 50 mol % of (meth)acrylic acid is used in a proportion of not less than 60 mol %, the pH of the system used for polymerizing the monomer is less than 5, and the degree of neutralization is less than 40 mol %. The monomer mentioned above is polymerized by using as an initiator the combination of one or more species respectively of persulfate and bisulfite. More preferably, a hydrophilic monomer containing at least 50 mol % of (meth)acrylic acid is used in a proportion of not less than 60 mol % and, while this monomer is added dropwise to be polymerized under such acidic conditions as a pH of less than 5 and a degree of neutralization of less than 40 mol %, the solid concentration of the system of polymerization at the time that the dropwise addition of the monomer is completed is set at a level of not less than 40 mass % and the weight average molecular weight is set at a level in the range of 3000–15000. The present inventors have found that in consequence of the polymerization, a water-soluble polymer of a low molecular weight excelling in the anti-gelling property and in the dispersibility and the chelating ability can be produced with high efficiency. This knowledge has been proposed in JP-A-11-315115.

The water-soluble polymer of JP-A-11-315115 has been finding extensive utility because it is possessed of properties befitting dispersants, descaling agent, and detergent builders.

<Prior Art Concerning Unsaturated Polyalkylene Glycol Type Copolymer>

It has been known that copolymers formed by using an unsaturated polyalkylene glycol type monomer are useful as builders for liquid detergents. For example, the copolymers of such unsaturated polyalkylene glycol type monomers as ethylene oxide adducts of 3-methy-3-buten-1-ol and such unsaturated monocarboxylic acid type monomers as (meth) acrylic acid are useful as liquid detergent builders. As a means to obtain such a copolymer, the method disclosed in JP-A-2002-60785, for example, has been known.

The method disclosed in the publication mentioned above, in copolymerizing a monomer component essentially containing either an unsaturated monocarboxylic acid type monomer or an unsaturated dicarboxylic acid type monomer and an unsaturated polyalkylene glycol type monomer, effects the necessary polymerization by using a persulfate or hydrogen peroxide as an initiator. When this method is used, a copolymer having a molecular weight up to several tens of thousand can be obtained with high reproducibility.

The polymer which is obtained by this method excels in the compatibility with a liquid detergent and in the dispersibility and can be advantageously used for detergent builders, particularly liquid detergent builders.

As a technique for producing a (meth)acrylic acid type polymer of a low molecular weight, which is not a polymer containing an unsaturated polyalkylene glycol type monomer, the method disclosed in JP-A-11-315115 may be cited.

By the method disclosed in the publication mentioned above, when a monomer component essentially containing a (meth)acrylic acid type monomer is polymerized, the polymerization is effected at a high concentration of not less than 40 mass % by using a persulfate or a bisulfite as an initiator. By using this method, it is made possible to obtain a low molecular weight polymer having a molecular weight of not more than several tens of thousand with high reproducibility.

The polymer which is obtained by this method has a narrow molecular weight distribution and incurs coloration only slightly. Further, this polymer has sulfur oxygen acid quantitatively introduced into the terminal of the straight chain or to the side chain thereof. Thus, this polymer excels in the dispersibility and the anti-gelling property and can be advantageously used for dispersants directed toward inorganic pigments, detergent builders, cleaning agents, and descaling agents.

When a copolymer of a (meth)acrylic acid monomer and an unsaturated polyalkylene glycol type monomer is produced by using the technique disclosed in JP-A-2002-60785, however, the polymer has the molecular weight thereof increase unless the polymerization concentration is lowered to the order of 20 mass %. The polymerization solution possibly succumbs to gelation. Thus, the polymerization concentration must be lowered at a sacrifice of productivity. Further, the aqueous solution of polymer consequently obtained has an inferior hue. In the light of these factors, the polymer does not deserve to be rated as optimum for detergent builders.

Further, by using the technique disclosed in JP-A-11-315115, it is made possible to produce a polymer of a low molecular weight in a high concentration. Since this technique is directed toward producing a polymer by mainly using a (meth)acrylic acid type monomer, the polymer obtained by the technique has low compatibility with liquid detergents. By the technique disclosed in JP-A-11-315115, therefore, it is difficult to produce a polymer suitable for liquid detergent builders.

By such conventional techniques as these, it has never been made possible to produce a polymer of a low molecular weight excelling in hue, compatibility with liquid detergents, dispersibility, and anti-gelling property at a high concentration with satisfactory efficiency.

<Problems Concerning (meth)acrylic Acid Type Polymer>

The present inventors, not satisfied with the development of this novel technique, have further continued a study concerning the (meth)acrylic acid type polymer and the method for production thereof disclosed in JP-A-11-315115 It has been consequently ascertained ① that the bisulfite used as an initiator emits sulfur dioxide in a large quantity during the course of the production, the generated sulfur dioxide dissolves in the liquid phase and forms an impurity, the sulfur dioxide which has escaped solution in the liquid phase is discharged from the system in a large quantity, and the discharged sulfur dioxide gives rise to a new problem of necessitating a costly treatment which comprises recovering this harmful gas with a proper adsorbent and discarding the spent adsorbent and ② that since the bisulfite as an initiator escapes in the form of sulfur dioxide and incurs loss of effect, the molecular weight of the polymer is not lowered, the total quantity of the initiator required is increased, the production is suffered to form a large quantity of an impurity, the high performance owned inherently by the produced (meth)acrylic acid type polymer is not manifested fully satisfactorily, and a new problem of degrading quality and inducing precipitation of an impurity during the preservation at a low temperature is encountered.

An object of this invention, therefore, is to provide a (meth)acrylic acid type polymer which is a water-soluble polymer of a low molecular weight excelling in dispersibility, chelating ability, and anti-gelling property. The (meth)acrylic acid type polymer of this invention has a prominently allayed impurity content and a further enhanced performance. Further, the (meth)acrylic acid type polymer of this invention possesses an outstanding ability to preserve constantly stably the high performance endowed during the course of production without being affected by the environment of preservation and suffers neither from degradation of quality nor precipitation of an impurity during the preservation at a low temperature.

Another object of this invention is to provide a method for producing a (meth)acrylic acid type polymer which is a water-soluble polymer of a low molecular weight excelling in dispersibility, chelating ability, and anti-gelling property. By the method of this invention for the production of a (meth)acrylic acid type polymer, it is made possible to produce a (meth)acrylic acid type polymer which allays generation of a large quantity of sulfur dioxide and generation of an impurity and acquires a further enhanced performance.

Still another object of this invention is to provide a detergent formed by using (as a high performance detergent builder) a (meth)acrylic acid type polymer which is a water-soluble polymer of a low molecular weight excelling in dispersibility, chelating ability, and anti-gelling property. The detergent of this invention acquires a further enhancement of performance and quality. Further, the detergent of this invention is possessed of a high ability of effecting stable preservation incapable of being effected by the environment of preservation.

<Problems Concerning Unsaturated Polyalkylene Glycol Type Copolymer>

The unsaturated polyalkylene glycol type copolymer disclosed in JP-A-2002-60785 indeed excels in compatibility with liquid detergents and dispersibility and nevertheless betrays deficiency in hue and in productivity as well. Meanwhile, the polymer disclosed in JP-A-11-315115 is deficient in compatibility with liquid detergents. The problem to be fulfilled by this invention, therefore, resides in providing a liquid detergent grade builder, a cement additive, and a detergent containing the liquid detergent grade builder which excels in compatibility with liquid detergents, dispersibility, and hue.

Further, the object to be fulfilled by this invention consists in providing a method for polymerizing an unsaturated polyalkylene glycol type copolymer excelling incompatibility with liquid detergents, dispersibility, and hue in a high concentration with high productivity.

SUMMARY OF THE INVENTION

The present inventors have made a diligent study concerning a (meth)acrylic acid type polymer of a low molecular weight excelling in dispersibility, chelating ability, and anti-gelling property and a method for the production thereof with a view to fulfilling the objects mentioned above. Consequently, they have found that while the (meth)acrylic acid type polymer is indeed a water-soluble polymer of a low molecular weight combining dispersibility, chelating ability, and anti-gelling property, it has been unable to manifest the inherently owned outstanding properties fully satisfactorily. They have also found that by the prolonged polymerization at a low temperature which appears to be deficient in productivity, it is made possible to decrease the discharged sulfur dioxide and decrease the impurity as well by decreasing the amount of the initiator to be used (preferably by further lowering the degree of neutralization during the process of polymerization). As a result, it is made possible to improve remarkably the properties owned by the (meth)acrylic acid type polymer, further allay the degradation of quality and the precipitation of an impurities during the preservation at a low temperature, and permit constantly stable retention of the high quality imparted in the course of production without being affected by the environment of preservation (namely allow thorough manifestation of the inherently owned quality without being degraded). This invention has been perfected based on the knowledge.

The present inventors have further discovered a method for polymerizing a monomer containing an unsaturated polyalkylene glycol type monomer by introducing sulfur oxygen acid to the terminal thereof in a high concentration of not less than 40 mass %. By this method, it is made possible to produce efficiently an unsaturated polyalkylene glycol type copolymer of a low molecular weight excelling incompatibility with liquid detergents, dispersibility, chelating ability, and anti-gelling property and an aqueous solution of this copolymer. They have eventually perfected this invention based on this knowledge.

The first aspect of this invention is directed toward a (meth)acrylic acid type polymer, wherein the value S representing the quantity of an sulfur element introduced which is defined by the formula, S=(quantity of S contained in polymer)/(total quantity of S)×100, is not less than 35.

The second aspect of this invention is directed toward a method for the production of a (meth)acrylic acid type polymer, characterized by using as an initiator the combination of one or more species respectively of a persulfate and a bisulfite, wherein the bisulfite is used in a proportion in the range of 0.5–5 by mass ratio relative to the mass of the persulfate taken as 1, the total quantity of the persulfate and the bisulfite to be added to the reaction system of polymerization is in the range of 2–20 g per mol of the monomer to be polymerized, and the polymerization temperature is in the range of 25–99° C.

The third aspect of this invention is directed toward an unsaturated polyalkylene glycol type copolymer, wherein the copolymer is produced by copolymerizing a (meth)acrylic acid type monomer A and an unsaturated polyalkylene glycol type monomer B, the copolymer possesses sulfur oxygen acid at the terminal thereof, and the value S representing the quantity of the sulfur element introduced which is defined by the formula, S=(quantity of S contained in the polymer)/(total quantity of S)×100, is not less than 3.

The fourth aspect of this invention is directed toward a method for the production of an unsaturated polyalkylene glycol type copolymer by the copolymerization of a (meth)

acrylic acid type monomer A and an unsaturated polyalkylene glycol type monomer B, wherein the combination of one or more species respectively of a persulfate and a bisulfite is used as an initiator.

DETAILED DESCRIPTION OF THE INVENTION

The above and other objects, features, and advantages of the present invention will become clear from the following description of the preferred embodiments.

Now, the embodiment of this invention will be described in detail below.

The first aspect of this invention is directed toward a (meth)acrylic acid type polymer, wherein the value S representing the quantity of an sulfur element introduced which is defined by the formula, S=(quantity of S contained in polymer)/(total quantity of S)×100, is not less than 35. Preferably, the polymer is formed by polymerizing a monomer containing 50–100 mol % of (meth)acrylic acid and 0–50 mol % of a water-soluble monoethylenically unsaturated monomer capable of copolymerizing with the (meth) acrylic acid in an aqueous solution. Further, in the (meth) acrylic acid type polymer which has such a sulfur-containing group as a sulfonic group linked to the terminal thereof and which has a value Q of not less than 3.0 for the anti-gelling ability, defined by the formula, Q=degree of gelation×$10^5$/ weight average molecular weight, the value S representing the quantity of the sulfur element incorporated is preferred to be not less than 35. It has been found by the present inventors that the purpose of enabling the (meth)acrylic acid type polymer of a low molecular weight excelling in dispersibility, chelating ability, and anti-gelling property to acquire a value S of not less than 35 for the quantity of the sulfur element, to be introduced is accomplished by controlling the polymerization temperature and the degree of neutralization within prescribed ranges during the course of production. By this control, it is made possible to repress the generation of sulfur dioxide in a large quantity and further repress the generation of an impurity. The polymer obtained through the process of production mentioned above and consequently allowed to acquire a value S of not less than 35 for the quantity of the sulfur element to be introduced has an extremely small impurity content. It is also made possible to repress the degradation of quality due to the impurity to a remarkably low degree. The precipitation of an impurity during the retention of the polymer in the form of an aqueous solution at a low temperature can be repressed also to a remarkably low degree. The polymer under discussion excels the (meth)acrylic acid type polymer proposed by the present inventors and disclosed in JP-A-11-315115 in the Ca-binding capacity. The polymer is colorless and transparent and excellent in hue as compared with the conventional aqueous solution of the (meth)acrylic acid type polymer. Thus, this invention promises further improvement of the quality.

In the (meth)acrylic acid type polymer, the value S representing the quantity of the sulfur element introduced generally exceeds 35 and preferably falls in the range of 35–70 and more preferably in the range of 40–60. If the value S representing the quantity of the sulfur element introduced falls short of 35, the shortage will be at a disadvantage in not allowing the quantity of an initiator required for the polymerization to be decreased satisfactorily, consequently preventing the formation of an impurity and the generation of sulfur dioxide from being effectively allayed, and possibly incurring the degradation of quality and the precipitation of an impurity during the preservation at a low temperature. The upper limit of the value S representing the quantity of the sulfur element introduced does not need to be particularly restricted.

Incidentally, the expression "quantity of S contained in the polymer" as used in the preceding definition of the value S representing the quantity of the sulfur element introduced refers to the quantity of S, which is contained in the (meth)acrylic acid type polymer. More specifically, the expression refers to the quantity of S contained in a macromolecular component formed of a (meth)acrylic acid type polymer which remains after such low molecular components as an impurity and an initiator fragment have been removed from the aqueous solution of a (meth)acrylic acid type polymer obtained by polymerization and subjected to adjustment of a solid content concentration and which is determined by the method of dialysis specifically described in the working example cited herein below. In other words, the expression may well be interpreted as referring to the quantity of S which is introduced into the terminal or the side chain of the (meth)acrylic acid type polymer in the form of such a sulfur-containing group as a sulfonic group. It may be safely inferred, therefore, that the proportion of the quantity of the S component contained originally in the used initiator which is introduced advantageously into the polymer in consequence of the reaction of polymerization increases in accordance as the value S representing the quantity of the sulfur element introduced is increased. The term "total quantity of S" used in the definition of the value S representing the quantity of the sulfur element introduced refers to the quantity of whole S contained in the phase in which the (meth)acrylic acid type polymer is present. The reason for not-using the quantity of S in the raw material used for the polymerization from the total quantity of S is that the quantity of S (sulfur component) which has been discharged out of the system as sulfur dioxide is absent from the (meth)acrylic acid type polymer (aqueous solution) and has no possibility of being precipitated as an S-containing impurity during the preservation at a low temperature.

The term "(meth)acrylic acid type polymer" as used in the present invention refers to a comprehensive concept covering an aqueous solution containing a (meth)acrylic acid type polymer obtained by polymerization, the aforementioned aqueous solution having such an aqueous solvent as water added thereto or removed therefrom in a proper quantity for the purpose of adjusting a solid content concentration, a solid substance obtained by depriving the aqueous solution of the aqueous solvent and drying the residue, the aqueous solution of a (meth)acrylic acid type polymer obtained by properly depriving an aqueous solution containing a (meth) acrylic acid type polymer resulting from polymerization of an impurity and purifying the residue, the aqueous solution having an aqueous solvent added thereto or removed therefrom for the purpose of adjusting a solid component concentration, a (meth)acrylic acid type polymer dried till a solid state, and the aqueous solution optionally having proper additives such as, for example, preservation stabilizers (absorbent for ultraviolet light and antioxidant), coloring agents, antistatic agents, slip additives, fillers, flame retardants, and foaming agents incorporated therein in proportions incapable of adversely affecting the quality of the (meth)acrylic acid type polymer obtained by polymerization. In short, the (meth)acrylic acid type polymer does not need to be particularly discriminated on account of shape and composition but is only required to contain a (meth) acrylic acid type polymer. The (meth)acrylic acid type polymer of this invention, therefore, embraces the case of forming the polymer solely of a purified (meth)acrylic acid type polymer. Thus, the (meth)acrylic acid type polymer of this invention has only to satisfy the aforementioned value S representing the quantity of the sulfur element introduced and ought to be interpreted in the broadest possible sense without reference to the designation. It ought not to be interpreted (restricted) narrowly as the solid component of a (meth)acrylic acid type polymer or the aqueous solution thereof. From the viewpoint of simplifying the process of production, it is commendable to utilize the aqueous solution containing a (meth)acrylic acid type polymer obtained by polymerization directly as a dispersant, a descaling agent, and a detergent builder, for example. From the viewpoint of lowering the cost of transportation, it is commendable to transport the polymer in the form of a solid substance instead of such a bulky form of an aqueous solution and optionally transform the solid substance into an aqueous solution when the polymer is compounded as a dispersant, a descaling agent, or a detergent builder, for example. From the viewpoint of stabilizing the product in quality and stabilizing the preservation of the product, it is commendable to reduce the aqueous solution containing a (meth)acrylic acid type polymer obtained by polymerization to a finished product by depriving the aqueous solution of an impurity. Thus, the polymer may be suitably endowed with such a shape and a composition as befit the purpose of use. That is, the (meth) acrylic acid type polymer does not need to be particularly restricted on account of shape and composition but has only to be such that the polymer obtained by polymerization fulfills the requirement that the value S representing the quantity of the sulfur element introduced determined by the analysis of a prescribed method (specifically described in a working example hereinafter) be not less than 35.

The (meth)acrylic acid type polymer according to this invention is preferred to fulfill the requirement that R of the formula, R=(the integral ratio of signals of 2.3–4.3 ppm)/(the integral ratio of 0.8–4.3 ppm including a signal of PSA)×100, in the $^1$H-NMR spectrum be in the range of 1–10 besides satisfying the aforementioned value S representing the quantity of the sulfur element introduced. As a result, it is made possible to acquire an effect equivalent to or higher than the effect of operation obtained by satisfying the requirement concerning the aforementioned value S representing the quantity of the sulfur element introduced. That is, the (meth)acrylic acid type polymer fulfilling these requirements has an extremely small content of impurity and has the degradation of quality due to the impurity repressed to a remarkably low degree. Further, such a (meth)acrylic acid type polymer as this has the precipitation of an impurity during the preservation thereof in the form of an aqueous solution at a low temperature repressed to a remarkably low degree. Further, this (meth)acrylic acid type polymer excels in anti-gelling property and also excels in the Ca-binding capacity and enjoys an excellent hue. Thus, the further improvement of the quality can be materialized.

The value R of the (meth)acrylic acid polymer is generally in the range of 1–15, preferably in the range of 2–12, and more preferably in the range of 3–10. If this value R falls short of 1, the shortage will be at a disadvantage in degrading the anti-gelling ability, unduly increasing the total quantity of peaks originating in the organic matter of the (meth) acrylic acid type polymer (mostly of the quantities of peaks originating in such an impurity as an initiator fragment) relative to the quantity of peaks originating in the quantity of S contained in the (meth)acrylic acid type polymer, hardly allowing efficient incorporation of such a sulfur-containing group as a sulfonic group into the (meth)acrylic acid type copolymer, consequently inducing degradation of quality, and possibly preventing the effect of allaying the precipitation of an impurity during the preservation of the polymer in the form of an aqueous solution at a low temperature from being manifested fully satisfactorily. Conversely, if the value R mentioned above exceeds 15, the excess will be at a disadvantage in unduly decreasing the molecular weight and also decreasing the quantity of carboxylic acid and degrading the chelating ability.

Here, the integral ratio of the signals of 2.3–4.3 ppm includes such peaks as originate in the quantity of S contained mainly in the (meth)acrylic acid type polymer. Meanwhile, the integral ratio of 0.8–4.3 ppm including the signal of PSA include all the peaks originating in the organic matter of the (meth)acrylic acid type polymer. The acronym "PSA" as used herein stands for sodium polyacrylate. The object sample of the $^1$H-NMR spectrum means the aqueous solution containing the (meth)acrylic acid type polymer used for the analysis. To be specific, the object sample of the $^1$H-NMR spectrum is prepared, as described specifically in a working example cited herein below, by subjecting 1 g of a given (meth)acrylic acid type polymer obtained by polymerization to vacuum drying till the solvent component remaining therein is thoroughly removed.

Then, the (meth)acrylic acid type polymer according to this invention has to fulfill the requirement that the heavy metal ion concentration is in the range of 0.5–10 ppm besides satisfying the aforementioned value S representing the quantity of the sulfur element introduced and preferably further the value R. As a result, it is made possible to decompose the peroxide used during the course of polymerization and decrease (decompose) the initiator (peroxide) persisting in the (meth)acrylic acid type polymer and enhance the hue (colorless and transparent).

Here, the heavy metal ion concentration of the (meth) acrylic acid type polymer is generally in the range of 0.05–10 ppm, preferably in the range of 0.1–8 ppm, and more preferably in the range of 0.15–5 ppm. If the heavy metal ion concentration falls short of 0.05 ppm, the shortage will be at a disadvantage in precluding the acquisition of the effect mentioned above, preventing the quantity of the initiator (peroxide) from being decreased fully satisfactorily, making it necessary when the (meth)acrylic acid type polymer is employed for such a use as demands an excellent hue to decompose or remove such an impurity as an initiator possibly persisting in the (meth)acrylic acid type polymer, and consequently incurring an extra cost for purification. This shortage, when the initiator (peroxide) is suffered to survive in a large quantity in the (meth)acrylic acid type polymer, possibly incurs the problem of safety (stimulation of the skin), depending on the kind of use and likewise necessitates removal of an impurity for the sake of purification. Conversely, if the heavy metal ion concentration exceeds 10 ppm, though the excess indeed allows such an impurity as the initiator persisting in the (meth)acrylic acid type polymer to be decomposed or removed fully satisfactorily, it nevertheless will possibly induce gelation of the polymer and, because of the emanation of the color of heavy metal, impose a restriction on the application of the polymer to such a use as demands an excellent hue.

The heavy metal ion mentioned above does not need to be particularly restricted. As concrete examples of the heavy metal ion, iron ion, nickel ion, chromium ion, and molybdenum ion may be cited. Owing to the excellence in safety, iron ion and nickel ion prove advantageous and iron ion proves particularly favorable. For the purpose of addition to the polymer, such a heavy metal ion may be introduced into the system prior to the start of the polymerization or after the start of the polymerization. The heavy metal ion which is liquated from a device used in the process of production may be incorporated at a prescribed ion concentration into the polymer.

Incidentally, such a heavy metal ion as this does not need to be chemically or physically bound as part of the (meth) acrylic acid type polymer but is only required to be present in the (meth)acrylic acid type polymer.

Then, the (meth)acrylic acid type polymer according to this invention is preferred to fulfill the requirement that the value Q of the formula, Q=degree of gelation×10$^5$/weight average molecular weight, be less than 3.0 besides satisfying the aforementioned value S representing the quantity of the sulfur element introduced and further preferably the value R or the iron ion concentration. Heretofore, the polymer possessing an anti-gelling property used to have a particularly low molecular weight among other polymers having a low molecular weight. In order for this polymer to acquire a satisfactory anti-gelling property, it has been necessary to decrease further the molecular weight of this polymer which originally has a low molecular weight. For the polymer which has an unduly small molecular weight, however, it is difficult to incorporate such a sulfur-containing group as a sulfur ion quantitatively into the terminal or the side chain of the polymer, specifically in such a quantity as satisfies the value S representing the quantity of the sulfur element introduced as defined above. Thus, the polymer is incapable of manifesting fully satisfactorily the dispersing ability and the descaling ability and cannot be advantageously used for a dispersant, a descaling agent, or a detergent builder. In contrast thereto, the (meth)acrylic acid type polymer according to this invention has a sulfur-containing group quantitatively introduced in the terminal or the main chain of the polymer. To be specific, it has such a sulfur-containing group as a sulfonic group introduced therein in such a quantity as satisfies the value S representing the quantity of the sulfur element introduced as defined above. As a result, the (meth) acrylic acid type polymer is enabled to manifest an excellent anti-gelling property notwithstanding it has acquired a large molecular weight as compared with the conventional polymer having an anti-gelling property. That is, when the value S mentioned above is satisfied and the value Q representing the anti-gelling ability as well is confined within the range specified above, the (meth)acrylic acid type polymer is enabled, when applied so such uses as an aqueous dispersant, a descling agent, or a detergent builder, to reject gelation and manifest an exceptionally satisfactory anti-gelling property and consequently the Ca-binding capacity. Thus, it can be advantageously applied to such uses as an aqueous dispersant, a descaling agent, or a detergent builder. Specifically since this polymer is capable of rejecting the gelation under the circumstance of use and further under the circumstance of the preservation subsequently to the mixing (compounding) with other components, the finished product of this polymer is enabled to enhance further the quality and the stabilization of quality.

Here, the value Q representing the anti-gelling ability is generally less than 3.0, preferably less than 2.7, and more preferably less than 2.5. If this value Q exceeds 3.0, the excess will possibly result in restricting the uses to be found for the finished product owing to the insufficiency of the anti-gelling ability. Incidentally, the lower limit of this value Q does not need to be particularly restricted.

In the production of the conventional water-soluble polymer of a low molecular weight exhibiting an anti-gelling property, the initiator to be added to the reaction system of polymerization is required to be in a larger amount than when the polymer of a higher molecular weight is produced. The (meth)acrylic acid type polymer proposed formerly by the present inventors as published in JP-A-11-315115 can repress this increase in the quantity of the initiator to be added to the reaction system of polymerization because it has a comparatively large molecular weight. Such a (meth) acrylic acid type polymer as this, therefore, is highly advantageous in terms of cost as compared with the conventional water-soluble polymer exhibiting the anti-gelling property. The present invention is capable of forming a (meth)acrylic acid type polymer having an equal value Q of the anti-gelling property in spite of a further decrease in the quantity of the initiator as compared with the (meth)acrylic acid type polymer proposed formerly in JP-A-11-315115. Thus, this polymer is enabled to decrease further the quantity of the impurity due to the initiator and attain further improvement of quality. Moreover, the further cut of the cost can be accomplished.

Here, the anti-gelling property is calculated as the value Q representing the anti-gelling ability and is rated based on the result of the calculation. The value Q representing the anti-gelling ability is calculated based on the following formula using the degree of gelation and the weight average molecular weight of the (meth)acrylic acid type polymer.

$Q$=Degree of gelation×10$^5$/weight average molecular weight

For the purpose of determining the "degree of gelation" in the formula given above, the known method for measuring the degree of gelation of a (meth)acrylic acid type polymer can be advantageously used. Specifically, a test solution is prepared by adding a low-concentration aqueous solution (having a solid component concentration of 1 mass %, for example) of the (meth)acrylic acid type polymer according to this invention and an aqueous calcium chloride solution to a buffer solution and mixing them together. The degree of gelation of the (meth)acrylic acid type polymer can be determined by allowing the test solution to stand at rest at a prescribed temperature for a prescribed duration (such as, for example, 90° C. and one hour) and thereafter assaying the test solution for absorbency in the wavelength zone of the ultraviolet light (UV). The method for the determination of the degree of gelation will be more specifically described in a working example to be cited herein below.

Then, the weight average molecular weight, Mw, of the (meth)acrylic acid type polymer according to this invention is generally in the range of 2000–20000, preferably in the range of 3000–15000, and more preferably in the range of 4000–10000. When the weight average molecular weight is in this range, the aforementioned (meth)acrylic acid type polymer is enabled to manifest conspicuously and effectively various properties such as dispersibility, chelating ability, and anti-gelling property. Thus, it can be applied more advantageously to such uses as a dispersant, a descaling agent, and a detergent builder. If the weight average molecular weight of the (meth)acrylic acid type polymer falls short of 2000, the shortage will possibly prevent the dispersing ability and the chelating ability from being manifested fully satisfactorily and restrict the uses to be found for the polymer. Conversely, if the weight average molecular weight of the (meth)acrylic acid type polymer exceeds 20000, the excess will transform the polymer to a high polymer and prevent the polymer from easily manifesting the satisfactory water solubility and anti-gelling property. When the (meth)acrylic acid type polymer (solid) obtained by purifying the aqueous solution containing a (meth)acrylic acid type polymer resulting from polymerization is measured for number average molecular weight by a proper method and when the aqueous solution containing a (meth) acrylic acid type polymer resulting from polymerization is measured for number average molecular weight, substantially no difference arises between the two measurements. In determining the value Q, therefore, it suffices to determine either of the weight average molecular weights.

The methods for determining the weight average molecular weight (Mw) and the number average molecular weight (Mn) of the (meth)acrylic acid type polymer will be described specifically in a working example to be cited herein below.

Then, the degree of dispersion (Mw/Mn) of the (meth) acrylic acid type polymer according to this invention is in the range of 1.5–2.9, preferably in the range of 1.8–2.7, and more preferably in the range of 2.0–2.5 when (1) the Mw falls short of 9000, depending on the magnitude of Mw. If this degree of dispersion falls short of 1.5, the shortage will complicate the synthesis of the polymer. Conversely, if the degree of dispersion exceeds 2.9, the excess will possibly induce degradation of quality because of the decrease in the component which is effective in fixing the quality and possibly prevent the (meth)acrylic acid type polymer to acquire a fully satisfactory dispersing ability and impose a restriction on the uses to be found for the polymer. Then, the degree of dispersion is in the range of 1.5–4.5, preferably in the range of 2.0–4.0, and more preferably in the range of 2.5–3.5 when (2) the Mw is in the range of 9000–20000. In this case, if the degree of dispersion falls short of 1.5, the shortage will result in complicating the synthesis of the polymer. Conversely, if the degree of dispersion exceeds 4.0, the excess will possibly induce degradation of quality because of a decrease in the component which is effective in governing the quality.

The Ca-binding capacity (one sort of the chelating ability) of the (meth)acrylic acid type polymer according to this invention can be decided in accordance with the Mw. When the Mw is in the range of 3000–10000, for example, the Ca-binding capacity is not less than 235, preferably not less than 240. If the Ca-binding capacity falls short of 235, the shortage will possibly prevent a detergent incorporating the polymer therein from manifesting fully satisfactory detergency. The (meth)acrylic acid type copolymer of this invention which particularly fulfills the value S representing the quantity of the sulfur element introduced and further preferably satisfies such necessary conditions as the value R, the iron ion concentration, and the value Q and enjoys a decrease in the quantity of an impurity far excels the (meth)acrylic acid type polymer of this invention proposed formerly by the present inventors in the Ca-binding capacity (chelating ability). Thus, it is enabled to manifest a decisively high decomposing and deterging power on the dirt of perspiration and the dirt of mud adhering to clothing, i.e. the dirt containing a Ca component and the tap water containing Ca.

The hue of the (meth)acrylic acid type polymer according to this invention excels the existing PSA assuming a yellow t brown color in terms of colorlessness and transparency. When general consumers (clients) are sizing up such products as detergents which are mostly in a white color, they often take into consideration even the hues of such detergents. In the light of the fact that the detergents which are colorless and transparent excel those which assume a yellow color in terms of commercial value, the polymer enjoying colorlessness and transparency proves highly advantageous.

The range of the degree of neutralization of the (meth) acrylic acid type polymer according to this invention ought not to be particularly restricted but may be properly adjusted to suit the purpose of use. It is generally in the range of 1–100%, preferably in the range of 20–99%, and more preferably in the range of 50–95%.

The (meth)acrylic acid type polymer of this invention is preferred to be a polymer which is formed by polymerizing in an aqueous solution a composition containing 50–100 mol % of (meth)acrylic acid and 0–50 mol % of a water-soluble monoethylenically unsaturated monomer capable of copolymerizing with the (meth)acrylic acid and consequently endowed with such necessary conditions as the aforementioned value S representing the quantity of the sulfur element introduced and further preferably the value R, the iron ion concentration, and the value Q. This polymer is further preferred to be a (meth)acrylic acid type polymer having such a sulfur-containing group as a sulfonic group linked to the terminal or to the main chain and having a value Q of less than 3.0 for the anti-gelling ability. Such a (meth)acrylic acid type polymer as satisfies these necessary conditions has such a sulfur-containing group as a sulfonic group linked to the terminal or the side chain of the polymer. Thus, this polymer exhibits a better anti-gelling property than the conventional polymer notwithstanding it has a large molecular weight as compared with the conventional polymer having an anti-gelling property. Further, since this polymer has a small impurity content, it can form a water-soluble polymer of a low molecular weight which has derived the maximum quality without sacrificing such prominent properties as dispersibility, chelating ability, and anti-gelling property. This polymer, therefore, can be advantageously applied to such uses as a dispersant, a descaling agent, and a detergent builder. The (meth)acrylic acid type polymer of this invention may be a polymer formed by polymerizing in an aqueous solution a composition containing 50–100 mol % of (meth)acrylic acid and 0–50 mol % of a water-soluble monoethylenically unsaturated monomer capable of copolymerizing with the (meth)acrylic acid and consequently has such a sulfur-containing group as a sulfonic group linked to the terminal or to the main chain and has deviated from the necessary condition that the aforementioned value Q representing the anti-gelling ability be less than 3.0. The polymer manifests the operation and the effect of this invention so long as it satisfies such necessary conditions as the aforementioned value S representing the quantity of the sulfur element introduced, and more preferably the value R, the iron ion concentration, and the value Q. The (meth)acrylic acid type polymers including the copolymers with such monomers as, for example, maleic acid, fumaric acid, itaconic acid, 2-hydroxyethyl (meth)acrylic acid, and copolymers thereof which are cited in Sub-paragraph "Monomer (II)" described herein below are embraced by this invention so long as they satisfy such necessary conditions as the aforementioned value S representing the quantity of the sulfur element introduced and further preferably the value R, the iron ion concentration, and the value Q.

The existing water-soluble polymers of low molecular weights which are used for dispersants and descaling agents are such that when their weight average molecular weights exceed 1000, they have their anti-gelling property exalt in accordance as their molecular weights decrease, namely as their weight average molecular weights approximate closely to 1000. Meanwhile, their chelating ability is exalted in accordance as the weight average molecular weights of the water-soluble polymers increase. The conventional water-soluble polymers, therefore, have incurred difficulty in satisfactorily improving the three properties, i.e. dispersibility, chelating ability, and anti-gelling property, all together.

In contrast thereto, the (meth)acrylic acid type polymer which is a polymer resulting from polymerizing in an aqueous solution the aforementioned monomer containing 50–100 mol % of (meth)acrylic acid and 0–50 mol % of a water-soluble monoethylenically unsaturated monomer capable of copolymerizing with the (meth)acrylic acid and which is consequently enabled to have such a sulfur-containing group as a sulfonic group linked to the terminal or the main chain, allow a value Q of less than 3.0 for the anti-gelling ability, and satisfy the aforementioned value S representing the quantity of the sulfur element introduced has such a sulfur-containing group as a sulfonic group introduced to the terminal or the side chain of the polymer. This polymer preferably fulfills such necessary conditions as the value R and the iron ion concentration. Such a (meth)acrylic acid type polymer as this excels in the dispersing ability and the anti-gelling property notwithstanding the weight average molecular weight is comparatively large. Particularly, for the large weight average molecular weight, the anti-gelling property is highly satisfactory. The (meth)acrylic acid type polymer which satisfies such necessary conditions as these, therefore, exhibits a high dispersing ability and an exceptionally fine anti-gelling property (refer to the value Q representing the anti-gelling ability shown in Table 11) besides manifesting the chelating ability of the same degree (refer to the Ca-binding capacity shown in Table 11) as the conventional (meth)acrylic acid type polymer which has an about equal weight average molecular weight.

As described above, the (meth)acrylic acid type polymer according to this invention is preferred to have such a sulfur-containing group as a sulfonic group linked to the terminal or the main chain and as well possess a high anti-gelling property. Owing to such sulfur-containing groups as the terminal sulfonic group just mentioned, the polymer is enabled to enhance the dispersing ability and the chelating ability thereof. Further, it is capable of manifesting a higher anti-gelling property. Thus, this (meth)acrylic acid type polymer is advantageously applied to such uses as a dispersant for inorganic pigments, a descaling agent, and a detergent builder.

The necessary condition that the polymer formed by polymerizing in an aqueous solution the aforementioned monomer containing 50–100 mol % of (meth)acrylic acid and 0–50 mol % of a water-soluble monoethylenically unsaturated monomer capable of polymerizing with the (meth)acrylic acid have such a sulfur-containing group as a sulfonic group linked to the terminal or the side chain and offer a value Q of less than 3.0 for the anti-gelling ability (of which the requirement regarding the value Q is as described above) will be described below in conjunction with the method for the production of a (meth)acrylic acid type polymer.

The second aspect of this invention is directed toward a method for the production of a (meth)acrylic acid type polymer, characterized by using as an initiator the combination of one or more species respectively of a persulfate and a bisulfite, wherein the bisulfite is used in a proportion in the range of 0.5–5 by mass ratio relative to the mass of the persulfate taken as 1, the total quantity of the persulfate and the bisulfite to be added to the reaction system of polymerization is in the range of 2–20 g per mol of the monomer to be polymerized, and the polymerization temperature is in the range of 25–99° C.

By adding as an initiator not only a persulfate but also a bisulfite in proportions in the ranges mentioned above, it is made possible to prevent the produced (meth)acrylic acid type polymer from being transformed into an unnecessarily high polymer and attain efficient production of a polymer of a low molecular weight. Besides this benefit, the produced (meth)acrylic acid type polymer is capable of incorporate therein such a sulfur-containing group as a sulfonic group quantitatively, i.e. in such a quantity as permits the aforementioned value S representing the quantity of the sulfur element introduced to fall in the range specified above. The fact that such a sulfur-containing group as a sulfonic group can be introduced quantitatively indicates that the persulfate and the bisulfite are functioning very satisfactorily as an initiator. Thus, the reaction system of polymerization does not require addition of an excess initiator and allows a further decrease in the quantity of the initiator to be added. As a result, it is made possible to repress the rise of the cost of production of the polymer and enhance the efficiency of production. The produced (meth)acrylic acid type polymer, therefore, is capable of repressing the aggregation with a metal salt of calcium, for example, and acquiring a satisfactory anti-gelling property. Further, by controlling the quantity of the initiator to be added to the reaction system of polymerization and the polymerization temperature within certain ranges, it is made possible to repress the generation of sulfur dioxide in a large quantity and allay the generation of an impurity as well. Thus, the further enhancement of the quality can be realized, the rise of the cost of production of the polymer can be repressed, and the efficiency of production can be exalted.

The monomer to be used in the method of production according to this invention does not need to be particularly restricted but has only to comprise a monomer component capable of producing a (meth)acrylic acid type polymer by polymerization. It is only required to contain at least (meth)acrylic acid (hereinafter referred to occasionally as monomer (I)). Optionally, it may contain a water-soluble monoethylenically unsaturated monomer capable of copolymerizing with (meth)acrylic acid (hereinafter referred to occasionally as monomer (II)) and/or other monomer (hereinafter referred to occasionally as monomer (III)). The term "monomer" as used herein refers to what is formed of a monomer component and does not embrace a solvent, an initiator, and other additives which are other components to be used in the course of polymerization.

As concrete examples of the monomer (I) component, acrylic acid and methacrylic acid may be cited. These monomers may be used either singly or in combination. Preferably, acrylic acid alone or a mixture formed by mixing acrylic acid and methacrylic acid at a prescribed ratio.

The quantity of the monomer (I) to be incorporated in the aforementioned monomer is generally in the range of 50 100 mol %, preferably in the range of 70–100 mol %, and more preferably in the range of 90–100 mol % based on the total quantity of the monomer. If the quantity of the monomer (I) to be incorporated falls short of 50 mol %, the shortage will be at a disadvantage in preventing the chelating ability and the anti-gelling ability from being manifested as balanced harmoniously. Meanwhile, the upper limit of this quantity may be 100 mol %, namely the monomer may be formed wholly of (meth)acrylic acid. Further, when acrylic acid and methacrylic acid are used in combination as the monomer (I), the quantity of the methacrylic acid to be incorporated generally avoids exceeding 5 mol % and preferably falls in the range of 0.5–4 mol % and more preferably in the range of 1–3 mol %. If the quantity of the methacrylic acid to be incorporated exceeds 5 mol %, the excess will possibly result in degrading the chelating ability.

The monomer (I) may be added to the solvent which will be specifically described herein below preferably in the form of a solution (preferably an aqueous solution) of the monomer (I) in water. When the monomer (I) is used as the solution (preferably aqueous solution), the concentration thereof is generally in the range of 10–100 mass %, preferably in the range of 30–95 mass %, and more preferably in the range of 50–90 mass %. If the concentration of the monomer (I) in the solution falls short of 10 mass %, the shortage will result in lowering the concentration of the product and complicating transportation and storage of the product. The upper limit of this concentration ought not be particularly restricted. The concentration may be 100 mass % (namely wholly) of the monomer (I) (solution), i.e. the solution may be absolutely devoid of a solvent.

As concrete examples of the water-soluble monoethylenically unsaturated monomer which is capable of copolymerizing with (meth)acrylic acid, i.e. the aforementioned monomer (II), salts formed by partially neutralizing or completely neutralizing (meth)acrylic acid, i.e. the monomer (I), with such an alkali metal as sodium or potassium; salts formed by partially or completely neutralizing the monomer (I) with either ammonia or such an organic amine as monoethanol amine or triethanol amine; such monoethylenically unsaturated aliphatic monocarboxylic acids as crotonic acid and .-hydroxyacrylic acid; salts formed by partially or completely neutralizing the aforementioned monoethylenically unsaturated aliphatic monocarboxylic acid with an alkali metal; salts formed by partially or completely neutralizing the aforementioned monoethylenically unsaturated aliphatic monocarboxylic acid with either ammonia or such an organic amine as monoethanol amine or triethanol amine; such monoethylenically unsaturated aliphatic dicarboxylic acids as maleic acid, fumaric acid, and itaconic acid; salts formed by partially or completely neutralizing the aforementioned monoethylenically unsaturated aliphatic dicarboxylic acids; salts formed by partially or completely neutralizing the aforementioned monoethylenically unsaturated aliphatic dicarboxylic acids with either ammonia or such an organic amine as monoethanol amine or triethanol amine; such monoethylenically unsaturated monomers containing a sulfonic group as vinyl sulfonic acid, allyl sulfonic acid, and 3-alyloxy-3-hydroxypropane sulfonic acid; salts formed by partially or completely neutralizing the aforementioned monoethylenically unsaturated monomers with an alkali metal; salts formed by partially or completely neutralizing the aforementioned monoethylenically unsaturated monomers with either ammonia or such an organic amine as monoethanol amine or triethanol amine; and such unsaturated hydrocarbons containing a hydroxyl group as 3-methyl-2-buten-1-ol (occasionally referred to simply as prenol) and 3-methyl-3-buten-1-ol (occasionally referred to simply as isoprenol) may be cited, though not exclusively.

The monomer (II) may be properly selected from among the various compounds enumerated above, which may be used either singly or in the form of a combination of two or more members. Among other compounds cited above, one or more compounds selected from the group consisting of unsaturated aliphatic dicarboxylic acids, unsaturated hydrocarbons containing a sulfonic group, and salts formed by partially or completely neutralizing such compounds are preferably used because they particularly excel in chelating ability, dispersibility, and anti-gelling ability.

The quantity of the monomer (II) to be incorporated in the monomer is generally in the range of 0–50 mol %, preferably in the range of 0–30 mol %, and more preferably in the range of 0–10 mol % based on the total quantity of the monomer. If the quantity of the monomer (II) to be incorporated exceeds 50 mol %, the excess will possibly result in degrading the chelating ability. Meanwhile, since the monomer (II) is an arbitrary component, the lower limit of the quantity is 0 mol %. The homopolymer or the copolymer using the aforementioned monomer (I) component manifests the action and the effect of this invention fully satisfactorily even in the absence of the use of the monomer (II).

The monomer (II) may be dissolved in a solvent which will be specifically described herein below, preferably in water, and used in the form of a solution (preferably aqueous solution) of the monomer (II). When the monomer (II) is used as the monomer (II) solution (preferably aqueous solution), the concentration thereof is in the range of 10–100 mass %, preferably in the range of 20–95 mass %, and more preferably in the range of 30–90 mass %. If the concentration of the monomer (II) in this case falls short of 10 mass %, the shortage will result in lowering the concentration of the product and complicating transportation and preservation of the product. Meanwhile, the upper limit of this concentration ought not be particularly restricted. The concentration may be 100 mass % (namely wholly) of the monomer (II) (solution), i.e. the solution may be absolutely devoid of a solvent.

The monomer (III) other than the aforementioned monomers (I) and (II) does not need to be particularly restricted. As concrete examples of the monomer (III) usable herein, hydrophobic monomers, i.e. such (meth)acrylic esters as vinyl acetate, vinyl pyrrolidone, vinyl ethers, styrene, methyl (meth)acrylate, and ethyl (meth)acrylate may be cited. Such a monomer (III) as this may be properly selected from among the compounds enumerated above, which may be used either singly or in the form of a combination of two or more members. When a hydrophobic monomer is used as the monomer (III), though it indeed excels in respect of the property of dispersing a hydrophobic compound, it possibly deteriorates the anti-gelling property of the produced (meth) acrylic acid type polymer. Thus, the quantity of this monomer (III) to be incorporated must be restricted in accordance with the kind of use to be selected.

When a hydrophobic monomer is incorporated as the monomer (III) mentioned above, the quantity of the monomer (III) component to be incorporated generally avoids exceeding 40 mol % and preferably falls in the range of 0–20 mol % and more preferably in the range of 0–10 mol % based on the total quantity of the monomer. In other words, the quantity of the hydrophilic monomer combining the monomer (I) and the monomer (II) mentioned above (namely the hydrophilic monomer containing not less than 50 mol % of (meth)acrylic acid) to be incorporated generally exceeds 60 mol % and preferably falls in the range of 80–100 mol % and more preferably in the range of 90–100 mol % based on the total quantity of the monomer. If the quantity of the hydrophobic monomer of the aforementioned monomer (III) to be incorporated exceeds 40 mol % (namely when the quantity of the hydrophilic monomer combining the monomer (I) and the monomer (II) mentioned above to be incorporated falls short of 60 mol %), the produced polymer of a low molecular weight acquires so solubility in water as explained in U.S. Pat. No. 3,546,099. Further, the produced (meth)acrylic acid type polymer possibly entails an addition to the value Q representing the anti-gelling ability and possibly fails to acquire an excellent anti-gelling property.

The monomer (III) may be dissolved in a solvent which will be specifically described herein below (preferably an organic solvent) and added in the form of a solution of the monomer (III). The concentration of the monomer (III) thus used in the form of the monomer (III) solution is generally in the range of 10–100 mass %, preferably in the range of 20–95 mass % and more preferably in the range of 30–90 mass %. If the concentration of the monomer (III) solution falls short of 10 mass %, the shortage will result in lowering the concentration of the product and complicating transportation and storage of the product. Meanwhile, the upper limit of this concentration ought not be particularly restricted. The concentration may be 100 mass % (namely wholly) of the monomer (II) (solution), i.e. the solution may be absolutely devoid of a solvent.

The method of this invention prefers the monomer mentioned above to be polymerized in an aqueous solution. This aqueous solution contains a solvent, an initiator, and other additives.

Here, the solvent to be used in the reaction system of polymerization during the polymerization of the monomer in the aqueous solution is preferred to be such an aqueous solvent as water, alcohol, glycol, glycerin, or a polyethylene glycol. Water proves particularly preferable. Such aqueous solvents may be used either singly or the form of a combination of two or more members. For the purpose of exalting the solubility of the aforementioned monomer in such a solvent, an organic solvent may be properly added to the aqueous solvent in a proportion incapable of exerting an adverse effect on the polymerization of the monomer.

Specifically, as the organic solvent, one or more members properly selected from among lower alcohols such as methanol and ethanol; amides such as dimethyl formaldehyde; and ethers such as diethyl ether and dioxane may be used.

The quantity of the aforementioned solvent to be used is generally in the range of 40–200 mass % and preferably in the range of 45–180 mass % and more preferably in the range of 50–150 mass % based on the total quantity of the monomer. If the quantity of this solvent to be used falls short of 10 mass %, the shortage will result in heightening the molecular weight. Conversely, this quantity exceeds 200 mass %, the excess will result in lowering the concentration of the produced (meth)acrylic acid type polymer and possibly necessitating the removal of the used solvent. The greater part or the whole of the solvent may be placed in the reaction vessel during the initial stage of polymerization. Part of the solvent may be added (dropwise) suitably into the reaction system independently during the process of polymerization. Otherwise, the solvent may be properly added (dropwise) into the reaction system together with the monomer component, an initiator component, and other additives in such a form as has these components dissolved in advance in the solvent.

The initiator to be used in the reaction system of polymerization during the polymerization of the aforementioned polymer in the aqueous solution is preferred to be the combination of one or more species respectively of a persulfate and a bisulfite. By using this initiator, it is made possible to introduce a sulfonic group quantitatively to the terminal or the side chain, attain production of a water-soluble polymer of a low molecular weight excelling in anti-gelling property as well as in dispersibility and chelating ability, and allow effective manifestation of the action and the effect of this invention. By adding a bisulfite besides a persulfate to the system of initiator, it is made possible to prevent the produced polymer from being transformed into an unnecessarily high polymer and allow efficient production of the polymer of a low molecular weight.

As concrete examples of the aforementioned persulfate, sodium persulfate, potassium persulfate, and ammonium persulfate may be cited. Then as concrete examples of the bisulfite, sodium bisulfite, potassium bisulfite, and ammonium bisulfite may be cited. A sulfite or a pyrosulfite may be used in the place of such a bisulfite.

The ratio of addition of the persulfate and the bisulfite is such that the quantity of the quantity of the bisulfite is in the range of 0.5–5 mass parts, preferably in the range of 1–4 mass parts, and more preferably in the range of 2–3 mass parts based on one mass part of the persulfate. If the quantity of the bisulfite based on 1 mass part of the persulfate falls short of 0.5 mass part, the shortage will result in preventing the effect of the bisulfite from being manifested fully satisfactorily and, as a result, possibly disabling introduction of a sulfonic group to the terminal of the polymer in a quantity satisfying the aforementioned value S representing the quantity of the sulfur element introduced and further tending to add to the weight average molecular weight of the (meth)acrylic acid type polymer. Conversely, if the quantity of the bisulfite exceeds 5 mass parts based on one mass part of the persulfate, the excess will result in inducing such excess supply (unnecessary consumption) of the bisulfite in the reaction system of polymerization as prevents the effect of the bisulfite from being produced proportionately to the ratio of addition, consequently causing the excess bisulfite to undergo decomposition in the reaction system of polymerization and entail generation of a large quantity of sulfur dioxide, forming an impurity in a large quantity in the (meth)acrylic acid type polymer, and eventually degrading the quality of the produced (meth)acrylic acid type polymer and inducing precipitation of an impurity during the preservation of the product at a low temperature.

The quantities of the persulfate and the bisulfite to be added as the initiator are such that the total quantity of the persulfate and the bisulfite of the initiator is in the range of 2–20 g, preferably in the range of 4–15 g, more preferably in the range of 6–12 g, and still more preferably in the range of 6–9 g, per mol of the monomer. In spite of the addition of the persulfate and the bisulfite in such small quantities as these, this invention is enabled to allay remarkably the generation of sulfur dioxide and the occurrence of an impurity during the course of production, with the repression of the polymerization temperature to a low level as a contributive factor. As a result, it is made possible to introduce such a sulfur-containing group as a sulfonic group to the terminal or the side chain of the produced (meth)acrylic acid type polymer in such a quantity as satisfies the value S representing the quantity of the sulfur element introduced defined above. It is further made possible to preclude the degradation of the quality of the produced (meth)acrylic acid type polymer and the precipitation of an impurity during the preservation of the product at a low temperature. If the total quantity of the persulfate and the bisulfite of the initiator to be added falls short of 2 g, the shortage will result in eventually increasing the molecular weight of the produced polymer, possibly preventing such a sulfur-containing group as a sulfonic group from being introduced to the terminal of the produced (meth)acrylic acid type polymer in such a quantity as satisfies the value S representing the quantity of the sulfur element introduced defined above, and tending to increase the weight average molecular weight of the polymer. Conversely, if the total quantity exceeds 20 g, the excess will be at a disadvantage in preventing the persulfate and the bisulfite of the initiator from producing an effect proportionate to the quantity of addition and exerting such adverse effects as degrading the purity of the produced (meth)acrylic acid polymer.

The aforementioned persulfate which is one species of the initiator may be dissolved in the aforementioned solvent, preferably water, and added in the form of the persulfate solution (preferably aqueous solution). The concentration of the persulfate which is used in the form of the persulfate solution (preferably aqueous solution) is in the range of 1–35 mass %, preferably in the range of 5–35 mass %, and more preferably in the range of 10–30 mass %. If the concentration of the persulfate falls short of 1 mass %, the shortage will result in eventually lowering the concentration and complicating transportation and storage of the product. Conversely, if the concentration of the persulfate exceeds 35 mass %, the excess will possibly result in inducing precipitation of the persulfate.

The bisulfite which is one species of the initiator may be dissolved in the aforementioned solvent, preferably water, and added in the form of the bisulfite solution (preferably aqueous solution). The concentration of the bisulfite which is used in the form of the bisulfite solution (preferably aqueous solution) is in the range of 10–40 mass %, preferably in the range of 20–40 mass %, and more preferably in the range of 30–40 mass %. If the concentration of the bisulfite falls short of 10 mass %, the shortage will result in eventually lowering the concentration of the product and complicating transportation and storage of the product. Conversely, if the concentration of the bisulfite exceeds 40 mass %, the excess will possibly result in inducing precipitation of the bisulfite.

This invention does not exclude such a mode of embodiment as further uses other initiator (inclusive of a chain transfer agent). Such other initiator may be properly used, when necessary, in such a quantity as avoids exerting any adverse influence on the effect of this invention. In this invention, the aforementioned combination of a persulfate and a bisulfite is advantageously used in the initiator system. The initiator does not need to be particularly limited to this combination. This invention allows introduction of such a sulfur-containing group as a sulfonic group in such a quantity as satisfies the value S defined above. An initiator system which is capable of producing the polymer of a low molecular weight by one-step polymerization can be used herein.

As concrete examples of the other initiator (inclusive of a chain transfer agent), azo type compounds such as 2,2'-azobis(2-amidinopropane) hydrochloride, 4,4'-azobis-4-cyanovaleric acid, azobis-isobutylonitrile, and 2,2'-abobis(4-methoxy-2,4-dimethyl valeronitrile); organic peroxides such as benzoyl peroxide, lauroyl peroxide, peracetic acid, di-t-butyl peroxide, and cumene hydroperoxide; and hydrogen peroxide may be cited.

Such an initiator as this may be likewise dissolved in the aforementioned solvent, preferably water, and used in the form of the solution (preferably aqueous solution). The concentration of the initiator which is used in the form of the solution (preferably aqueous solution) has only to be in such a range as avoids impairing the effect of this invention. Generally, it is properly decided so as to equal to the aforementioned concentration of the persulfate or bisulfite solution.

As concerns the additive other than the initiator which can be used in the reaction system of polymerization during the polymerization of the aforementioned monomer in the aqueous solution, a proper additive may be added in such a quantity as avoids exerting an adverse effect on the operation and the effect of this invention. For example, a heavy metal concentration adjusting agent, an organic peroxide, hydrogen peroxide, and a metal salt are usable as such additives.

The aforementioned heavy metal concentration adjusting agent does not need to be particularly restricted. A polyvalent metal compound or simple substance may be used. As concrete examples of the heavy metal concentration adjusting agent, water-soluble polyvalent metal salts such as vanadium oxytrichloride, vanadium trichloride, vanadyl oxalate, vanadyl sulfate, vanadic anhydride, ammonium metavanadate, ammonium sulfate hypovanadous [$(NH_4)_2 SO_4 \cdot VSO_4 \cdot 6H_2O$], ammonium sulfate vanadous [$(NH_4)V(SO_4)_2 \cdot 12H_2O$], copper acetate (II), copper (II), copper bromide (II), copper (II) acetyl acetate, cupric ammonium chloride, copper ammonium chloride, copper carbonate, copper chloride (II), copper citrate (II), copper formate (II), copper hydroxide (II), copper nitrate, copper naphthenate, copper oleate (II), copper maleate, copper phosphate, copper sulfate (II), cuprous chloride, copper cyanide (I), copper iodide, copper oxide (I), copper thiocyanate, iron acetylacetonate, iron ammonium citrate, ferric ammonium oxalate, iron ammonium sulfate, ferric ammonium sulfate, iron citrate, iron fumarate, iron maleate, ferrous lactate, ferric nitrate, iron pentacarbonyl, ferric phosphate, and ferric pyrophosphate; polyvalent metal oxides such as vanadium pentoxide, copper oxide (I), ferrous oxide, and ferric oxide; polyvalent metal sulfides such as iron sulfide (III), iron sulfide (II), and copper sulfide; and copper powder and iron powder may be cited.

For this invention, the heavy metal concentration of the produced (meth)acrylic acid type polymer is preferred to be in the range of 0.05–10 ppm. It is, therefore, commendable to add properly the aforementioned heavy metal concentration adjusting agent in a proper quantity. The present inventors have further found that when a reaction vessel obtained by giving to the inner wall of the existing reaction vessel made of steel or a copper-based alloy a glass lining treatment excelling in a corrosion-resisting property and containers and stirrers made of stainless steel (SUS) are used, heavy metal ions, especially iron ions, are liquated (supplied) in a proper quantity defined above from the SUS, the material of the containers and others into the reaction solution under the conditions of production of this invention. The supply of ions which is effected in this manner is advantageous in terms of the effect vs cost. In the method of production according to this invention, the use of such reaction devices as reaction vessels and stirrers which are made of SUS can manifest the same operation and effect as the addition of the aforementioned heavy metal concentration adjusting agent. Though the existing reaction vessel made of steel or a copper-based alloy poses no problem, it possibly induces liquation of heavy metal ions in an excess concentration. The use of the existing reaction vessel proves uneconomical because the liquation of heavy metal ions inevitably induces development of the color originating in the heavy metal and consequently necessitates an operation for removing the heavy metal ions. The reaction vessel which has been given the glass lining treatment likewise poses no problem and permits use of the heavy metal concentration adjusting agent as occasion demands.

The polymerization temperature during the polymerization of the aforementioned monomer is generally in the range of 25–99° C. This polymerization temperature is preferably not lower than 50° C. and more preferably not lower than 70° C. The polymerization temperature is preferably not higher than 95° C. and more preferably not higher than 90° C. The polymerization may proceed even at a temperature lower than 90° C. If the polymerization temperature falls short of 25° C., the shortage will result in increasing the molecular weight and adding to the quantity of an impurity and unduly elongating the polymerization time and consequently degrading the productivity. Conversely, if the polymerization temperature exceeds 99° C., the excess will result in decomposing the bisulfite of the initiator and emitting sulfur dioxide in a large quantity, consequently inducing dissolution of sulfur dioxide in the liquid phase and occurrence of an impurity after the polymerization, further entailing discharge of sulfur dioxide from the system and necessitating a costly treatment for the recovery of the discharged sulfur dioxide during the process of polymerization, and, because of the escape of the bisulfite of the initiator in the form of sulfur dioxide, preventing the added initiator from fully satisfactorily manifesting an effect proportionately to the quantity of addition and preventing the molecular weight from being lowered as required. Incidentally, the term "polymerization temperature" as used herein means the temperature of the reaction solution in the reaction system.

The polymerization temperature does not need to be constantly retained approximately at a fixed level. It is permissible, for example, to initiate the polymerization at normal room temperature (which may fall short of 25° C., since a transient deviation of the polymerization temperature from the aforementioned range does not depart from the scope of this invention), elevating the temperature in a proper temperature-elevating time (or temperature-increasing rate) till a prescribed temperature, and retain the prescribed temperature thereafter. Otherwise, the duration of dropwise addition may be varied for each of such components as the monomer and the initiator which are added dropwise. As concerns the manner of dropwise addition, the temperature may be varied (raised or lowered) along the course of time within the aforementioned temperature range during the process of polymerization. The manner of dropwise addition ought not be particularly restricted but is only required to avoid impairing the operation and the effect of this invention.

Particularly in the case of the method which initiates the polymerization at normal room temperature (method of room temperature initiation), when the duration of 300 minutes is prescribed, for example, the polymerization may be so performed as to reach the set temperature (which is only required to be within the range of polymerization temperature defined above, preferably 70–90° C. and more preferably 80–90° C. or so) within a span of 120 minutes, preferably in the range of 0–90 minutes and more preferably in the range of 0–60 minutes and thereafter may be allowed to remain at such a set temperature as this till the polymerization is terminated. If the duration of temperature elevation deviates from the range mentioned above, the deviation will possibly result in suffering the produced (meth)acrylic acid type polymer to grow to an unnecessarily high polymer. The polymerization having its duration set at 300 minutes has been described for example. When the polymerization has a different set duration, it is commendable to set such a duration of temperature elevation as similarly proportionates the duration of temperature elevation to the duration of the polymerization by consulting the foregoing example.

The pressure in the reaction system during the polymerization of the aforementioned monomer is not particularly restricted. The polymerization may proceed under normal pressure (atmospheric pressure), reduced pressure, or increased pressure, whichever may best suit the occasion. For the purpose of preventing discharge of sulfur dioxide during the process of polymerization and allowing a required decrease in the molecular weight, it is commendable to perform the polymerization under normal pressure or under such an increased pressure as arises in a sealed reaction system. When the polymerization is performed under normal pressure (atmospheric pressure), the reaction system neither necessitates addition of a pressing device or decompressing device nor requires use of a reaction vessel or piping adapted to resist pressure. The normal pressure (atmospheric pressure), therefore, proves preferable from the viewpoint of the cost of production. That is, the optimum pressure conditions may be set, depending on the purpose for which the produced (meth)acrylic acid type polymer is used.

For the atmosphere in the reaction system, though air may be used in its unmodified form, an inert gas may be used preferably. It is commendable to have the interior of the reaction system displaced with such an inert gas as nitrogen in advance of the start of the polymerization, for example. Consequently, the gas forming the atmosphere in the reaction system (such as, for example, oxygen gas) is dissolved in the liquid phase and consequently allowed to function as a polymerization inhibitor. As a result, it is made possible to prevent the persulfate as an initiator from being inactivated and reduced and allow a further decrease in the molecular weight.

In the method of production according to this invention, the polymerization of the aforementioned monomer is preferred to proceed under an acidic condition. By using the acidic condition for the polymerization, it is made possible to repress the rise of the viscosity of the aqueous solution in the reaction system of polymerization and permit satisfactory production of a (meth)acrylic acid type polymer of a low molecular weight. It is further made possible to increase remarkably the efficiency of production because the reaction of polymerization can be made to proceed under the condition of a higher concentration than the level heretofore attained. Particularly, by lowering the degree of neutralization during the course of polymerization to a level in the range of 1–25 mol %, it is made possible to heighten synergistically the effect of decreasing the quantity of the aforementioned initiator and consequently exalting remarkably the effect of decreasing the impurity. Further, it is preferable to have the pH of the reaction solution so adjusted in the process of polymerization as to fall in the range of 1–6 at 25° C. By performing the reaction of polymerization under such an acidic condition as this, it is made possible to perform the polymerization at a high concentration and in one step as well. It is, therefore, made possible to obviate the step of concentration which has been possibly necessitated by the conventional method of production. Thus, the productivity of the (meth)acrylic acid type polymer can be remarkably enhanced and the rise of the cost of production can be repressed.

In the aforementioned acidic condition, the pH of the reaction solution at 25° C. during the process of polymerization is in the range of 1–6, preferably in the range of 1–5 and more preferably in the range of 1–4. If this pH falls short of 1, the shortage will possibly result in inducing emission of sulfur dioxide and exposing the devices to corrosion. Conversely, if this pH exceeds 6, the excess will result in degrading the efficiency of the bifulite and unduly increasing the molecular weight.

As concrete examples of the pH adjusting agent to be used for adjusting the reaction solution in the process of polymerization to the aforementioned pH, hydroxides of alkali metals such as sodium hydroxide and potassium hydroxide, hydroxides of alkaline earth metals such as calcium hydroxide and magnesium hydroxide; and organic amine salts such as ammonia, monoethanol amine, and triethanol amine maybe cited. These pH adjusting agents may be used either singly or in the form of a combination of two or more members. Among other pH adjusting agents enumerated above, such hydroxides of alkali metals as sodium hydroxide and potassium hydroxide are preferable and sodium hydroxide is particularly preferable. In the present specification, such a pH adjusting agent may be occasionally referred to simply as "a pH adjusting agent" or "a neutralizing agent."

The degree of neutralization in the process of polymerization is in the range of 1–25 mol %. When the aforementioned monomer (I) alone forms the monomer to be used for the polymerization, the degree of neutralization is preferably in the range of 2–15 mol % and more preferably in the range of 3–10 mol %. When the monomer to be used for the polymerization includes the monomer (II) in addition to the aforementioned monomer (I), it is permissible to have part or the whole of the monomer (II) added to the reaction system during the initial stage of polymerization. In this case, the degree of neutralization in the process of polymerization is preferably in the range of 1–25 mol % and more preferably in the range of 3–10 mol %. So long as the degree of neutralization in the process of polymerization falls in this range, the polymerization or copolymerization can be effected most advantageously when the aforementioned monomer (I) alone is used and when the monomer (I) and the monomer (II) are copolymerized. It is additionally made possible to produce a polymer of a low molecular weight favorably without entailing an increase of the viscosity of the aqueous solution in the reaction system of polymerization. Moreover, since the reaction of polymerization can be made to proceed under the condition of a higher concentration than the level heretofore attained, the efficiency of production can be exalted remarkably. If the degree of neutralization in the process of polymerization falls short of 1 mol %, the shortage will possibly result in increasing the quantity of sulfur dioxide to be emitted and adding to the molecular weight. Conversely, if the degree of neutralization in the process of polymerization exceeds 25 mol %, the excess will result in possibly degrading the efficiency of chain transfer of the bisulfite and increasing the molecular weight. This excess will also result in conspicuously increasing the viscosity of the aqueous solution in the reaction system of polymerization in consequence of the advance of the polymerization, consequently inducing an unnecessary addition to the molecular weight of the produced polymer and disabling the production of a polymer of a low molecular weight, preventing the effect of the decrease in the degree of neutralization from being manifested fully satisfactorily, and rendering it difficult to attain a large decrease in the impurity.

Here, the method for neutralization is not particularly restricted. As the neutralizing agent, such an alkaline monomer (II) component as sodium (meth)acrylate may be utilized. It is also permissible to use such a hydroxide of alkali metal as sodium hydroxide instead. Optionally, they may be used in combination. The neutralizing agent to be added during the process of neutralization may be in a solid form or in the form of an aqueous solution in a proper solvent, preferably water. When the aqueous solution is used, the concentration of this aqueous solution is in the range of 10–60 mass %, preferably in the range of 20–55 mass %, and more preferably in the range of 30–50 mass %. If the concentration of the aqueous solution falls short of 20 mass %, the shortage will result in lowering the concentration of the product and complicating transportation and storage of the product. Conversely, if the concentration exceeds 60 mass %, the excess will result in possibly inducing precipitation, heightening the viscosity, and consequently complicating transfer of the solution.

In preparation for the polymerization, the monomer, the persulfate and the bisulfite in the initiator system, and other additives are generally dissolved in advance in a proper solvent (preferably the same solvent as the solvent used for the solutions intended for dropwise addition) to produce a monomer solution, a persulfate solution, a bisulfite solution, and other additive solution. The polymerization is preferred to be continued while these solutions are continuously added dropwise over prescribed durations of dropwise addition to the (aqueous) solvent (optionally adjusted to a prescribed temperature) placed in advance in the reaction vessel. Further, part of the aqueous solvent may be added dropwise afterward separately from the solvent placed in advance in the reaction vessel in the reaction system of polymerization during the initial stage of polymerization (refer to Example 6 given in Table 1). The method of production of this invention, however, is not restricted to the method described heretofore. As regards the method of dropwise addition, for example, the dropwise addition may be effected continuously or intermittently as divided into several small fractions. Part or the whole of the monomer (II) may be placed in the reaction system during the initial stage of polymerization (namely part or the whole of the monomer (II) may be regarded as added dropwise at once then the polymerization is initiated). Further, the speed of dropwise addition (the quantity of dropwise addition) of the monomer (II) may be constantly fixed (fixed quantity) from the start through the completion of the dropwise addition or the speed of dropwise addition (quantity of dropwise addition) may be changed along the course of time, depending on the polymerization temperature, for example. Instead of having all the components of dropwise addition added dropwise at an equal rate, the time for starting the dropwise addition and the time for completing the dropwise addition may be staggered from one to another of the individual components of dropwise addition or the durations of dropwise addition assigned thereto may be shortened or elongated. Thus, the method of production of this invention permits such a proper alteration as avoids impairing the operation and the effect of this invention. When the individual components are added dropwise each in the form of a solution, the solutions for dropwise addition may be heated in advance to a level equivalent to the polymerization temperature in the reaction system. By so doing, the polymerization temperature, when required to be retained at a fixed level, produces only small changes and permits easy adjustment.

When the monomers (I), (II), and/or (III) are copolymerized with monomers A, B, and/or C which will be specifically described herein below, the durations of dropwise addition of these individual monomers may be controlled, depending on the polymerizing property of each monomer. When a monomer of a low polymerizing property is used, for example, the duration of dropwise addition may be shortened. It is also permissible to have part or the whole of this monomer placed in advance in the relevant vessel within the reaction system.

Further, the bisulfite is such that the molecular weight thereof during the initial stage of polymerization largely affects the final molecular weight thereof. For the purpose of lowering the initial molecular weight, therefore, it is commendable to have a portion, 5–20 mass %, of the bisulfite or the solution thereof added (dropwise) to the reaction system within 60 minutes, preferably within 30 minutes, and more preferably within 10 minutes after the start of polymerization. This measure is particularly effective when the polymerization is initiated at room temperature.

During the polymerization, it is more important to repress emission of sulfur dioxide and prevent formation of an impurity by lowering the polymerization temperature. For this purpose, the total duration of dropwise addition in the process of polymerization is required to be so long as to fall in the range of 180–600 minutes, preferably in the range of 210–480 minutes, and more preferably in the range of 240–420 minutes. In view of the aforementioned problems encountered during the process of production and in respect of encouraging the improvement of the quality of the produced polymer, however, the elongation of the polymerization time may well be rated as a very significant measure. If the total duration of dropwise addition falls short of 180 minutes, the shortage will result in preventing the effect of the persulfate solution and the bisulfite solution added as an initiator system from being easily manifested efficiently, rendering difficult the introduction of such a sulfur-containing group as a sulfonic group to the terminal or the side chain in such a manner as satisfies the value S representing the quantity of the sulfur element introduced, consequently disposing the polymer to acquire a heightened weight average molecular weight, possibly inducing the presence of an excess initiator owing to the dropwise addition in a brief duration into the reaction system, and consequently causing the excess initiator to decompose, emit sulfur dioxide, discharge it from the system, and give rise to an impurity. The appreciation of the technical significance of confining the polymerization temperature and the quantity of the initiator within specific low ranges, however, may be regarded as precluding such problems as described regarding the conventional technique from actually occurring. This interpretation holds good even in the case of deviations from various other polymerization conditions. Conversely, if the total duration of dropwise addition exceeds 600 minutes, notwithstanding the produced polymer enjoys an excellent quality because the emission of sulfur dioxide is repressed, the excess will result in degrading the productivity of the (meth)acrylic acid type polymer and possibly restriction the uses to be found for the produced polymer. The term "total duration of dropwise addition" as used herein refers to the duration from the time the dropwise addition of the first component for dropwise addition (not necessarily limited to one component) is started till the time the dropwise addition of the last component for dropwise addition (not necessarily limited to one component) is completed.

The duration of dropwise addition of the bisulfite or the solution thereof among other components for dropwise addition during the process of polymerization is has the termination thereof advanced by an interval in the range of 1–30 minutes, preferably in the range of 1–20 minutes, and more preferably 1–15 minutes from the point of termination of the dropwise addition of the monomer (I) or the solution thereof. By this measure, it is made possible to decrease the quantity of the bisulfite after completion of the polymerization and repress efficiently and effectively the emission of sulfur dioxide and formation of an impurity from the bisulfite. Thus, the quantity of the impurity which occurs when the sulfur dioxide in the gas phase is dissolved in the liquid phase after completion of the polymerization can be markedly decreased. When the bisulfite survives even after completion of the polymerization, it gives rise to an impurity and induces degradation of the quality of the polymer and precipitation of an impurity during the preservation of the product at a low temperature. Thus, the initiator including the bisulfite is preferred to have been consumed till thorough elimination by the time the polymerization is completed.

When the time for terminating the dropwise addition of the monomer (I) (solution) cannot be advanced by an interval of not less than one minute from the time for terminating the dropwise addition of the bisulfite (solution), the bisulfite possibly survives even after termination of the polymerization. The case of this nature embraces the case in which the termination of dropwise addition of the bisulfite or the solution thereof and the termination of dropwise addition of the monomer (I) or the solution thereof occur at the same time and the case in which the termination of dropwise addition of the bisulfite (solution) occurs after the termination of dropwise addition of the monomer (I) (solution). In these cases, it is difficult to repress the emission of sulfur dioxide and the formation of an impurity efficiently and effectively and the surviving initiator possibly exerts an adverse effect on the thermal stability of the produced polymer. Conversely, when the time for terminating the dropwise addition of the bisulfite or the solution thereof precedes the time for terminating the dropwise addition of the monomer (I) (solution) by an interval exceeding 30 minutes, the bisulfite has been used up by the time the polymerization is terminated. This thorough consumption of the bisulfite possibly incurs an increase of the molecular weight. Further, since the bisulfite is dropwise added in a large quantity in a brief span of time during the course of the polymerization because the speed of the dropwise addition of the bisulfite is higher than the speed of the dropwise addition of the monomer (I) (solution), the impurity and the sulfur dioxide are possibly generated in an increased quantity during this dropwise addition.

The time for terminating the dropwise addition of the persulfite (solution), among other components for dropwise addition, during the process of polymerization is delayed by an interval in the range of 1–30 minutes, preferably in the range of 1–20 minutes, and more preferably in the range of 1–15 minutes from the time for terminating the dropwise addition of the monomer (I) (solution). By this delay, it is made possible to decrease the quantity of the monomer surviving after completion of the polymerization and decrease markedly the impurity originating in the surviving monomer.

When the interval by which the time for terminating the dropwise addition of the persulfate (solution) is delayed from the time for terminating the dropwise addition of the monomer (I) (solution) falls short of 1 minute, this shortage will possibly result in inducing survival of the monomer component after the termination of the polymerization. The case of this nature embraces the case in which the termination of dropwise addition of the persulfate (solution) and the termination of dropwise addition of the monomer (I) (solution) occur at the same time and the case in which the termination of dropwise addition of the persulfate (solution) occurs after the termination of dropwise addition of the monomer (I) (solution). In these cases, the formation of an impurity is efficiently and effectively repressed with difficulty. Conversely when the time for terminating the dropwise addition of the persulfate (solution) is delayed by an interval exceeding 30 minutes after the time for terminating the dropwise addition of the monomer (I) (solution), the persulfate or the product of decomposition thereof possibly survives and forms an impurity after completion of the polymerization.

The concentration of the solid component (namely the concentration of the solid component formed by the polymerization of the monomer) in the aqueous solution at the time that the dropwise addition of each of the components is terminated and the reaction of polymerization in the reaction system of polymerization is terminated generally exceeds 35 mass % and preferably falls in the range of 40–70 mass % and more preferably in the range of 45–65 mass %. So long as the concentration of the solid component at the time for terminating the reaction of polymerization exceeds 35 mass %, the polymerization can be made to proceed at a high concentration and in one step as well. Thus, it is made possible to obtain a (meth)acrylic acid type polymer of a low molecular weight with high efficiency. The step of concentration which has been necessary for the conventional method of production can be omitted, for example. Thus, the efficiency of the production can be exalted markedly. As a result, it is made possible to enhance the productivity of the (meth)acrylic acid type polymer and repress the rise of the cost of production.

If the concentration of the solid component mentioned above falls short of 35 mass %, the shortage will possibly result in preventing the productivity of the (meth)acrylic acid type polymer from being markedly enhanced as by rendering difficult the omission of the step of concentration, for example.

In the case of the conventional method, the increase of the concentration of the solid component in the reaction system of polymerization has entailed such problems as inducing a remarkable increase in the viscosity of the reaction solution in consequence of the advance of the reaction of polymerization and consequently heightening the weight average molecular weight of the produced polymer markedly. When the reaction of polymerization is carried out on the acid side (the pH at 25° C. falling in the range of 1–6 and the degree of neutralization falling in the range of 1–25 mol %), the rise of the viscosity of the reaction solution in consequence of the advance of the reaction of polymerization can be repressed. Thus, even when the reaction of polymerization is carried out under the condition of a high concentration, the polymer of a low molecular weight can be obtained and the efficiency of production of the polymer can be exalted markedly.

The expression "the point at which the reaction of polymerization is terminated" as used herein may be interpreted as the point at which the dropwise additions of all the components for dropwise addition are terminated and nevertheless is preferred to refer to the point by which the prescribed duration of aging (completion of polymerization) has elapsed thereafter.

The aforementioned duration of aging is generally in the range of 1–120 minutes, preferably in the range of 5–60 minutes, and more preferably in the range of 10–30 minutes. If the duration of aging falls short of 1 minutes, the shortage will result in possibly inducing survival of the monomer component due to the insufficiency of agent and possibly entailing formation of an impurity originating in the surviving monomer and degradation of the quality. Conversely, if the duration of aging exceeds 120 minutes, the excess will result in possibly coloring the polymer solution. Besides, the polymerization has been already completed and further application of the polymerization temperature proves uneconomical.

During the process of aging, the polymerization temperature mentioned above is applied because the aging proceeds during the reaction of polymerization and is embraced in the polymerization. The temperature during the process of aging may be retained at a fixed level (preferably the temperature at the point at which the dropwise addition is terminated) or it may be changed along the course of time during the process of aging. The duration of the polymerization, therefore, refers to the sum of the aforementioned total duration of dropwise addition+the duration of aging and means the time which elapses from the point for starting the first dropwise addition to the point for terminating the aging.

Further, in the method for the production of a (meth) acrylic acid type polymer according to this invention, the polymerization is performed under the aforementioned acid condition (the pH of the reaction solution in the process of polymerization falling in the range of 1–6 at 25° C. and the degree of neutralization in the process of polymerization falling in the range of 1–25 mol %). The degree of neutralization of the produced (meth)acrylic acid type polymer (final degree of neutralization), therefore, can be set in the prescribed range by properly adding an appropriate alkali component by way of an after-treatment, optionally after termination of the polymerization.

The aforementioned final degree of neutralization is variable with the kind of use and, therefore, ought not be particularly restricted. It may be set at a level in a very wide range of 1–100 mol %. When the polymer is utilized as a detergent builder such as in a weakly acidic detergent which is claimed to be tender to the bare skin, for example, the polymer may be used in its original acid state instead of being neutralized in advance. When it is used in a neutral detergent or an alkali detergent, it may be neutralized by way of an after-treatment with an alkali component to a degree of neutralization of not less 90 mol % prior to the use. Particularly when the polymer is used as an acid substance, the final degree of neutralization is preferably in the range of 1–75 mol % and more preferably in the range of 5–70 mol %. When the polymer is used as a neutral or an alkali substance, the final degree of neutralization is preferably in the range of 75–100 mol % and more preferably in the range of 85–99 mol %. If the final degree of neutralization of the polymer being used as a neutral or an alkali substance exceeds 99 mol %, the excess will result in possibly coloring the aqueous solution of the polymer.

As typical concrete examples of the aforementioned alkali component, hydroxides of alkali metals such as sodium hydroxide and potassium hydroxide; hydroxides of alkaline earth metals such as calcium hydroxide and magnesium hydroxide; and organic amines such as ammonia, monoethanol amine, diethanol amine, and triethanol amine may be cited. The alkali components enumerated above may be used either singly or in the form of a combination of two or more members.

Incidentally, it is not impossible to set the final degree of neutralization by subjecting a (meth)acrylic acid type polymer obtained by the conventional method of complete neutralization or partial neutralization to a demineralizing treatment. In this case, however, the addition of this demineralizing treatment may result in complicating the process of production and increasing the cost of production and, as a consequence, possibly imposing a limit on the uses to be found.

When the polymer in its originally acid state is used without being neutralized, since the reaction system is in an acid state as a matter of course, the atmosphere enclosed with the reaction system possibly suffers noxious sulfur dioxide ($SO_2$ gas) to survive therein. In such a case as this, it is commendable to introduce such a peroxide as hydrogen peroxide into the system and decompose the sulfur dioxide or blow air or nitrogen gas into the system and expel the sulfur dioxide from the system.

The (meth)acrylic acid type polymer of this invention may be produced either batchwise or continuously.

The method for the production of a (meth)acrylic acid type polymer of this invention, as described above, is characterized by using as an initiator the combination of one or more species respectively of a persulfate and a bisulfite, wherein the bisulfite is used in a proportion in the range of 0.5–5 by mass ratio relative to the mass of the persulfate taken as 1, the total quantity of the persulfate and the bisulfite to be added to the reaction system of polymerization is in the range of 2–20 g per mol of the monomer, and the polymerization temperature is in the range of 25–99° C. Here, the polymerization is preferred to be performed under an acid condition (the pH of the reaction solution in the process of polymerization falling in the range of 1–6 at 25° C. and the degree of neutralization during the course of polymerization falling in the range of 1–25 mol %), with the duration of dropwise addition of each of the components for dropwise addition continuously adjusted in the meanwhile. Preferably, the concentration of the solid component of polymer at the time of terminating the reaction of polymerization is not less than 35 mass % and the weight average molecular weight of the produced polymer is in the range of 2000–20000. So long as the weight average molecular weight of the produced (meth)acrylic acid type polymer is in the range mentioned above, the quantity of the initiator to be added to the reaction system of polymerization can be markedly repressed. This fact is at an advantage in cutting cost, effectively and efficiently preventing the emission of sulfur dioxide and the formation of an impurity during the process of production, and consequently enabling a (meth) acrylic acid type polymer capable of conspicuously and effectively manifesting such properties as high dispersibility, a high chelating ability, and a high anti-gelling property on high levels to be produced efficiently. That is, a polymer which is usable advantageously for dispersants of inorganic pigments, descaling agents, and detergent builders can be produced in high quality and at a low cost as well. Further, the reduction of the cost can be attained as by repressing markedly the increase in the quantity of the initiator to be added to the reaction system of polymerization.

The uses found for the (meth)acrylic acid type polymer of this invention include aqueous dispersants (inclusive of dispersants for pigments), descaling agents (scale repressing agents), detergent builders, and detergents using the builders, for example. The uses do not need to be limited thereto but may embrace a wide variety of applications. The polymer may be applied to metal ion binding agents, thickening agents, and various binders, for example.

The aqueous dispersant of this invention is characterized by containing a (meth)acrylic acid type polymer (inclusive of the product of purification of (meth)acrylic acid type polymer as described above). Since the quantity of an impurity in the (meth)acrylic acid type polymer is markedly decreased, an aqueous dispersant of a low molecular weight which is capable of manifesting the outstanding dispersibility, chelating ability, and anti-gelling property owned inherently by the (meth)acrylic acid type polymer is provided by this invention. This invention also provides an aqueous dispersant which possesses unusually high quality and performance and excels in stability and induces neither degradation of quality during a protracted storage nor precipitation of an impurity during the preservation at a low temperature.

In the aqueous dispersant of this invention, the components of the composition other than the aforementioned (meth)acrylic acid type polymer and their ratios in the composition are not particularly restricted. Such components and ratios in composition as mentioned above may be properly applied (utilized) within the ranges incapable of impairing the operation and the effect of this invention, based on the various components and their ratios of composition which are effectively applied to the conventional aqueous dispersants.

The descaling agent of this invention is characterized by containing a (meth)acrylic acid type polymer (inclusive of the product of purification of (meth)acrylic acid type polymer as described above). Since the quantity of an impurity in the (meth)acrylic acid type polymer is markedly decreased, a water-soluble descaling agent of a low molecular weight which is capable of manifesting the outstanding dispersibility, chelating ability, and anti-gelling property owned inherently by the (meth)acrylic acid type polymer is provided by this invention. This invention also provides a descaling agent which possesses unusually high quality and performance and excels in stability and induces neither degradation of quality during a protracted storage nor precipitation of an impurity during the preservation at a low temperature.

In the descaling agent of this invention, the components of the composition other than the aforementioned (meth)acrylic acid type polymer and their ratios in the composition are not particularly restricted. Such components and ratios in composition as mentioned above may be properly applied (utilized) within the ranges incapable of impairing the operation and the effect of this invention, based on the various components and their ratios of composition which are effectively applied to the conventional aqueous dispersants.

The detergent builder of this invention is characterized by containing a (meth)acrylic acid type polymer (inclusive of the product of purification of (meth)acrylic acid type polymer as described above). Since the quantity of an impurity in the (meth)acrylic acid type polymer is markedly decreased, a water-soluble detergent builder of a low molecular weight which is capable of manifesting the outstanding dispersibility, chelating ability, and anti-gelling property owned inherently by the (meth)acrylic acid type polymer is provided by this invention. Thus, the detergent builder, when put to use, excels in the ability to prevent the cleansed article from being defiled again. This invention also provides a detergent builder which possesses unusually high quality and performance and excels in stability and induces neither degradation of quality during a protracted storage nor precipitation of an impurity during the preservation at a low temperature.

In the detergent builder of this invention, the components of the composition other than the aforementioned (meth)acrylic acid type polymer and their ratios in the composition are not particularly restricted. Such components and ratios in composition as mentioned above may be properly applied (utilized) within the ranges incapable of impairing the operation and the effect of this invention, based on the various components and their ratios of composition which are effectively applied to the conventional detergent builders.

The detergent of this invention is characterized by containing a (meth)acrylic acid type polymer (inclusive of the product of purification of (meth)acrylic acid type polymer as described above). Since the quantity of an impurity in the (meth)acrylic acid type polymer is markedly decreased, a water-soluble detergent of a low molecular weight which is capable of manifesting the outstanding dispersibility, chelating ability, and anti-gelling property owned inherently by the (meth)acrylic acid type polymer is provided by this invention. This invention also provides a detergent which possesses unusually high quality and performance and excels in stability and induces neither degradation of quality during a protracted storage nor precipitation of an impurity during the preservation at a low temperature.

The detergent of this invention is preferred to contain a (meth)acrylic acid type polymer of this invention in a proportion in the range of 1–20 mass % based on the total mass of the detergent and a surfactant in a proportion in the range of 5–70 mass % based on the total mass of the detergent. Optionally, it may incorporate an enzyme therein in a proportion of not more than 5 mass %.

If the proportion of the (meth)acrylic acid type polymer incorporated in the detergent falls short of 1 mass %, the shortage will result in preventing the effect of the addition from being manifested as expected. If this proportion exceeds 20 mass %, the excess will result in preventing the effect of the addition from being linked with the enhancement of the deterging power and eventually jeopardizing economy. If the quantity of the surfactant which is a main component of the detergent deviates from the aforementioned range, the deviation will result in upsetting the balance of the surfactant with the other components and possibly exerting an adverse effect on the deterging power of the detergent. The incorporation of the enzyme contributes to the enhancement of the deterging power. If the quantity of the enzyme so incorporated exceeds 5 mass %, however, the excess will result in preventing the effect of the addition from being manifested and eventually jeopardizing economy.

The surfactant to be used herein may be at least one member selected from the group consisting of anionic surfactants, nonionic surfactants, amphoteric surfactants, and cationic surfactants. The anionic surfactant is not particularly restricted. As concrete examples of the anionic surfactant which can be used herein, alkyl benzene sulfonates, alkyl or alkenyl ether sulfates, alkyl or alkenyl sulfates, .-olefin sulfonates, .-sulfo-fatty acids or esters, alkane sulfonates, saturated or unsaturated fatty acid salts, alkyl or alkenyl ether carboxylates, amino acid type surfactants, N-acylamino acid type surfactants, and alkyl or alkenyl phosphoric esters or salts thereof may be cited.

The non-ionic surfactant is not particularly restricted. As concrete examples of the non-ionic surfactant which is used herein, polyoxyalkylene alkyl or alkenyl ethers, polyoxyethylene alkylphenyl ethers, higher fatty acid alkanol amides or alkylene oxide adducts thereof, sucrose fatty acid esters, alkyl glycosides, fatty acid glycerin monoesters, and alkyl amine oxides may be cited.

The amphoteric surfactant is not particularly restricted. Carboxyl type or sulfobetain type amphoteric surfactants are usable herein.

The cationic surfactant is not particularly restricted. Quaternary ammonium salts, for example, are usable herein.

As the enzyme to be incorporated in the detergent in this invention, proteases, lipases, and cellulases are usable herein.

Further, the detergent of this invention, when necessary, may incorporate therein such components as known alkali builders, chelate builders, reattachment-preventing agents, soil release agents, color transfer preventing agents, softening agents, fluorescent agents, bleaching agents, bleaching auxiliaries, and perfumed which are in popular use in detergents. Zeolite may be also incorporated.

As the alkali builder, silicates, carbonates, and sulfates can be used. As the chelate builder, diglycolic acid, oxycarboxylates, EDTA (ethylene diamine tetraacetic acid), DTPA (diethylene triamine pentacetic acid), and citric acid may be optionally used. Otherwise, known polycarboxylic acid type polymers may be used in a proportion incapable of impairing the effect of this invention.

The manner of incorporating the aforementioned (meth) acrylic acid type polymer in the detergent of this invention is decided in accordance with the form in which the detergent is marketed (such as, for example, a liquid state or a solid state) and ought not be particularly restricted. The polymer obtained in the form of an aqueous solution after the polymerization may be incorporated in the unmodified form in the detergent. Otherwise, the polymer in the form of an aqueous solution may be treated to distill the water content to a certain extent and incorporated in the concentrated state in the detergent. Alternatively, the polymer which has been hardened to dryness may be incorporated in the detergent.

The detergent mentioned above embraces detergents such as bleaching detergents having one function of the component thereof enriched which are used exclusively for specific purposes besides synthetic detergents for household use, industrial detergents directed toward textile industry and other industries, and hard facial detergents.

The third aspect of this invention is directed toward an unsaturated polyalkylene glycol type copolymer, wherein the copolymer is produced by copolymerizing a (meth) acrylic acid type monomer A and an unsaturated polyalkylene glycol type monomer B, the copolymer possesses sulfur oxygen acid at the terminal thereof, and the value S representing the quantity of the sulfur element introduced which is defined by the formula, $S=(\text{quantity of S contained in the polymer})/(\text{total quantity of S})\times 100$, is not less than 3. The unsaturated polyalkylene glycol type copolymer is produced by polymerizing a (meth)acrylic acid type monomer A and an unsaturated polyalkylene glycol type monomer B in an aqueous solution. Optionally, a monoethylenically unsaturated monomer C which is capable of copolymerizing with the monomer A and the monomer B may participate in the copolymerization. The unsaturated polyalkylene glycol type copolymer of this invention is a water-soluble polymer of a low molecular weight which is endowed at the terminal thereof with a sulfur oxygen acid and is excellent in antigelling property as well as in dispersibility and chelating ability. The requirement that the unsaturated polyalkylene glycol type copolymer have a value S of not less than 3 for S, the quantity of the sulfur element introduced, can be fulfilled by controlling the polymerization temperature and the degree of neutralization in the respectively prescribed ranges during the course of production. By this control, it is made possible to repress emission of sulfur dioxide in a large quantity and formation of an impurity. The unsaturated polyalkylene glycol type copolymer having a value S of not less than 3, the quantity of the sulfur element introduced which is obtained through such a process of production as this has a very small impurity content and has the degradation of quality due to the impurity repressed to a markedly low level. This copolymer, by further having the precipitation of an impurity during the preservation thereof in the form of an aqueous solution at a low temperature repressed to a markedly low level, is colorless and transparent and excellent in hue as compared with the conventional unsaturated polyalkylene glycol type copolymer. Thus, the further enhancement of the quality of this copolymer can be realized.

The term "sulfur oxygen acid" as used in this specification refers to an acidic group containing sulfur atoms and oxygen atoms and salts thereof. As concrete examples of the sulfur oxygen acid, groups derived from sulfonic acid, sulfuric acid, persulfuric acid, and sulfurous acid; salts formed by partially neutralizing or completely neutralizing such acid groups with an alkali metal; and salts formed by partially neutralizing or completely neutralizing such acid groups with either ammonia or such an organic amine as monoethanol amine or triethanol amine may be cited.

The value S, the quantity of the sulfur element introduced, in the unsaturated polyalkylene glycol type copolymer exceeds 3 and preferably falls in the range of 3–50, and more preferably in the range of 3–30. The fact that the value S, the quantity of the sulfur element introduced, falls short of 3 means that the quantity of the initiator used in the polymerization was more than necessary. This shortage, therefore, will result in preventing the formation of an impurity and the emission of sulfur dioxide from being effectively repressed and possibly inducing degradation of quality and precipitation of an impurity during the preservation of the copolymer at a low temperature. Meanwhile, the upper limit of the value S, the quantity of the sulfur element introduced, ought not be particularly restricted.

The expression "the quantity of S contained in a polymer" as used in the definition of the value S, the aforementioned quantity of the sulfur element introduced refers to the quantity of S, which is contained in the unsaturated polyalkylene glycol type copolymer. Specifically, it refers to the quantity of S contained in a high polymer component formed of an unsaturated polyalkylene glycol type copolymer which remains after removing such low molecular components as an impurity and an initiator fragment from an aqueous solution formed by adjusting the solid component concentration of an unsaturated polyalkylene glycol type copolymer obtained by polymerization in accordance with the method of dialysis explained in a working example cited herein below. In other words, it may be regarded as indicating the quantity of S, which is introduced as such a sulfur-containing group as a sulfonic group into the terminal or the side chain of the unsaturated polyalkylene glycol type copolymer. It is logically inferred that the proportion of the S component contained in the used initiator which is suitably incorporated into the unsaturated polyalkylene glycol type copolymer in consequence of the reaction of polymerization increases in accordance as the value S, the quantity of the sulfur element introduced, increases. The term "total quantity of S" used in the definition of the aforementioned value S, the quantity of the sulfur element introduced, refers to the quantity of the whole S contained in the phase in which the unsaturated polyalkylene glycol type copolymer is present. The reason for not-using the quantity of S in the raw material used for the polymerization from the total quantity of S is that the quantity of S (sulfur component) which has been discharged out of the system as sulfur dioxide is absent from the aqueous solution of the unsaturated polyalkylene glycol type copolymer and has no possibility of being precipitated as an S-containing impurity during the preservation at a low temperature.

The term "unsaturated polyalkylene glycol type copolymer" as used in the present invention refers to a comprehensive concept covering an aqueous solution containing an unsaturated polyalkylene glycol type copolymer obtained by polymerization, the aforementioned aqueous solution having such an aqueous solvent as water added thereto or removed therefrom in a proper quantity for the purpose of adjusting a solid content concentration, a solid substance obtained by depriving the aqueous solution of the aqueous solvent and drying the residue, an unsaturated polyalkylene glycol type copolymer formed by purifying an aqueous solution containing an unsaturated polyalkylene glycol type copolymer obtained by polymerization by suitably depriving the aqueous solution of an impurity, the aqueous solution having an aqueous solvent added thereto or removed therefrom for the purpose of adjusting a solid content concentration, an unsaturated polyalkylene glycol type copolymer transformed into a solid substance by drying, and an unsaturated polyalkylene glycol type copolymer obtained by polymerization and optionally having proper additives such as, for example, preservation stabilizers (such as absorbent for ultraviolet light and antioxidant), coloring agents, antistatic agents, slip additives, fillers, flame retardants, and foaming agents incorporated therein in proportions incapable of adversely affecting the quality of the copolymer. The unsaturated polyalkylene glycol type copolymer of this invention, therefore, embraces a substance formed exclusively of a purified unsaturated polyalkylene glycol type copolymer. Thus, the unsaturated polyalkylene glycol type copolymer of this invention has only to satisfy the aforementioned value S representing the quantity of the sulfur element introduced and ought to be interpreted in the broadest possible sense without reference to the designation. It ought not to be interpreted (restricted) narrowly as the solid component of an unsaturated polyalkylene glycol type copolymer or the aqueous solution thereof. From the viewpoint of simplifying the process of production, it is commendable to utilize the aqueous solution containing the unsaturated polyalkyleneglycol type copolymer obtained by polymerization directly as a dispersant, a descaling agent, and a detergent builder, for example. From the viewpoint of lowering the cost of transportation, it is commendable to transport the copolymer in the form of a solid substance instead of such a bulky form of an aqueous solution and optionally transform the solid substance into an aqueous solution when the copolymer is compounded as a dispersant, a descaling agent, or a detergent builder, for example. From the viewpoint of stabilizing the product in quality and stabilizing the preservation of the product, it is commendable to reduce the aqueous solution containing an unsaturated polyalkylene glycol type copolymer obtained by polymerization to a finished product by depriving the aqueous solution of an impurity. Thus, the copolymer may be suitably endowed with such a shape and a composition as befit the purpose of use. That is, the unsaturated polyalkylene glycol type copolymer does not need to be particularly restricted on account of shape and composition but has only to be such that the copolymer obtained by polymerization fulfills the requirement that the value S representing the quantity of the sulfur element introduced determined by the analysis of a prescribed method (specifically described in a working example hereinafter) be not less than 3.

The unsaturated polyalkylene glycol type copolymer according to this invention has a hue (value b) of not more than 2, preferably not more than 1.5. The unsaturated polyalkylene glycol type copolymer of this invention is colorless and transparent as compared with the unsaturated polyalkylene glycol type copolymer of the conventional technique which assumes a yellow-brown color. When general consumers (clients) are sizing up such products as detergents which are mostly in a white color, they often take into consideration even the hues of such detergents. In the light of the fact that the detergents which are colorless and transparent excel those which assume a yellow color in terms of commercial value, the copolymer enjoying colorlessness and transparency proves highly advantageous.

The unsaturated polyalkylene glycol type copolymer according to this invention is preferred to fulfill the requirement that the degree of gelation, q, described specifically in a working example cited herein below be not more than 0.1 when the Ca-binding capacity described specifically in a working example cited herein below is not less than 200, besides satisfying the aforementioned value S, the quantity of the sulfur element introduced. When the Ca-binding capacity falls short of 200, the value $Q=(Ca\text{-binding capacity})^2/\text{degree of gelation } q/10^5$ is preferred to be not less than 30. Heretofore, a polymer having an anti-gelling property used to have a particularly low molecularweight among other polymers of low molecular weights. That is, for the purpose of obtaining a suitable anti-gelling property, it has been necessary to decrease further the molecular weight of a polymer already having a low molecular weight. In a polymer having an unduly small molecular weight, however, it is difficult to introduce such a sulfur-containing group as a sulfonic group quantitatively to the terminal or side chain of the polymer, specifically in such a quantity as satisfies the value S, the aforementioned quantity of the sulfur element introduced. Thus, this polymer has been unable to manifest the dispersing ability and the descaling ability fully satisfactorily and therefore has been unsuitable for such uses as a dispersant, a descaling agent, and a detergent builder. In contrast thereto, the unsaturated polyalkylene glycol type copolymer according to this invention has such a sulfur-containing group as a sulfonic group introduced quantitatively to the terminal or side chain of the polymer, specifically in such a quantity as satisfies the value S, the aforementioned quantity of the sulfur element introduced. Optionally, it is enabled to satisfy the aforementioned value q or Q. Thus, the unsaturated polyalkylene glycol type copolymer mentioned above is capable of exhibiting a satisfactory anti-gelling property despite its large molecular weight as compared with the conventional polymer having an anti-gelling property. So long as the aforementioned value S and the value Q representing the anti-gelling ability as well fall in the aforementioned ranges, the unsaturated polyalkylene glycol type copolymer, when applied to such uses as an aqueous dispersant, a descaling agent, or a detergent builder, is enabled to repress its own trend toward gelation and manifest highly satisfactory anti-gelling property and Ca-binding capacity. Thus, the copolymer can be suitably applied to such uses as an aqueous dispersant, a descaling agent, or a detergent builder. Since this copolymer is enabled to repress its own trend toward gelation under the environment of use in its original form and further under the environment of preservation thereof in a form mixed (compounded) with other components, the product using this copolymer can realize further exaltation of the performance and further stabilization of the quality thereof.

When the Ca-binding capacity exceeds 200, the value q representing the degree of gelation is less than 0.1, preferably less than 0.095. When the Ca-binding capacity is less than 200, the value Q representing the anti-gelling ability is not less than 30, preferably not less than 35, and more preferably not less than 40. If the value q is not less than 0.1 or if the value Q is not more than 30, the uses found for the copolymer will be possibly restricted because of the insufficiency of the anti-gelling ability. The lower limit of the value q or the upper limit of the value Q is not particularly restricted.

For the determination of the aforementioned "degree of gelation, q," the known method for determining the degree of gelation of an unsaturated polyalkylene glycol type copolymer may be suitably used. A test solution, for example, is prepared by adding a low-concentration aqueous solution (having a solid component concentration of 1 mass %, for example) of the unsaturated polyalkylene glycol type copolymer according to this invention and an aqueous calcium chloride solution together in a buffer solution and mixing them altogether. The degree of gelation can be determined by allowing this test solution to stand at rest at a prescribed temperature for a prescribed duration (such as, for example, 90° C. and 1 hour) and testing the test solution for absorbency in the wave range of ultraviolet light (UV). A more specific method for the determination of the degree of gelation, q or the Ca-binding capacity will be described in a working example to be cited herein below.

The weight average molecular weight Mw of the unsaturated polyalkylene glycol type copolymer according to this invention is in the range of 2000–100000, preferably in the range of 3000–50000, and more preferably in the range of 4000–20000. When the weight average molecular weight is in this range, the unsaturated polyalkylene glycol type copolymer is capable of conspicuously and effectively manifesting various properties such as a dispersing ability, a chelating ability, and an anti-gelling property. Thus, the copolymer can be applied more suitably to such uses as a dispersant, a descaling agent, and a detergent builder. If the weight average molecular weight of the unsaturated polyalkylene glycol type copolymer falls short of 2000, the shortage will result in possibly preventing the dispersing ability and the chelating ability from being satisfactorily manifested and imposing a restriction on the uses found therefor. Conversely, if the weight average molecular weight of the unsaturated polyalkylene glycol type copolymer exceeds 100000, the excess will result in imparting a higher molecular weight to the copolymer and consequently preventing the satisfactory water solubility and anti-gelling property from being manifested. The weight average molecular weight found for an unsaturated polyalkylene glycol type copolymer obtained by purifying by a proper method an aqueous solution containing an unsaturated polyalkylene glycol type copolymer resulting from polymerization and the weight average molecular weight found for an aqueous solution containing an unsaturated polyalkylene glycol type copolymer resulting from polymerization show practically no difference. Therefore, it suffices to determine the weight average molecular weight of either an unsaturated polyalkylene glycol type copolymer or an aqueous solution thereof.

The methods for determining the weight average molecular weight (Mw) and the number average molecular weight (Mn) of an unsaturated polyalkylene glycol type copolymer or an aqueous solution thereof will be described in a working example to be cited herein below.

The degree of dispersion (Mw/Mn) of the unsaturated polyalkylene glycol type copolymer according to this invention, though variable with Mw, is in the range of 1.5–2.9, preferably in the range of 1.8–2.7, and more preferably in the range of 2.0–2.5 when (1) Mw is less than 9000. In this case, if the degree of dispersion falls short of 1.5, the shortage will result in complicating synthesis. Conversely if the degree of dispersion exceeds 2.9, the excess will result in decreasing the components effective in performance, consequently inducing a degradation of performance, possibly preventing the unsaturated polyalkylene glycol type copolymer from exhibiting a sufficient dispersing ability, and imposing a restriction on the uses. The degree of dispersion is in the range of 1.5–4.5, preferably in the range of 2.0–4.0, and more preferably in the range of 2.5–3.5 (2) when the Mw is in the range of 9000–20000. In this case, if the degree of dispersion falls short of 1.5, the shortage will result in complicating synthesis. Conversely, if the degree of dispersion exceeds 4.0, the excess will result in decreasing components effective in performance and possibly inducing a decline of performance.

The Ca-binding capacity (one form of the chelating ability) of the unsaturated polyalkylene glycol type copolymer according to this invention can be decided in accordance with the Mw and the composition of the unsaturated polyalkylene glycol type copolymer. When the Mw is in the range of 5000–10000 and the copolymer is composed of 80 mass % of a (meth)acrylic acid type monomer and 20 mass % of an unsaturated polyalkylene glycol type monomer, the Ca-binding capacity is not less than 160, preferably not less than 180, and more preferably not less than 200. If the Ca-binding capacity falls short of 160, the shortage will result in possibly preventing the copolymer from producing a sufficient deterging power. The unsaturated polyalkylene glycol type copolymer of this invention which fulfills the aforementioned value S representing the quantity of the sulfur element introduced and preferably further satisfies the requirement concerning the value q and the value Q excels conspicuously the unsaturated polyalkylene glycol type copolymer of the invention formerly proposed by the present inventors conspicuously in the Ca-binding capacity (the chelating ability) (refer to Table 20 given in a working example). It is, therefore, at an advantage in manifesting an unusually high decomposing and deterging power on dirt of perspiration and dirt of soil adhering to clothing and on dirt containing a Ca component, and a tap water containing Ca.

The range of the degree of neutralization of the unsaturated polyalkylene glycol type copolymer according to this invention ought not be particularly restricted but may be properly adjusted so as to suit the purpose of use. It is 1–100%, preferably 20–99%, and more preferably 50–95%.

The unsaturated polyalkylene glycol type copolymer of this invention fulfills the aforementioned requirement concerning the aforementioned value S representing the quantity of the sulfur element introduced and can be obtained by polymerizing a composition containing 30–99 mass % of a (meth)acrylic acid type monomer and 1–70 mass % of an unsaturated polyalkylene glycol type monomer in an aqueous solution. The copolymer, when necessary, may additionally use 0–60 mass % of a water-soluble monoethylenically unsaturated monomer capable of copolymerizing the monomers mentioned above. It is provided, however, that the total mass % of a (meth)acrylic acid type monomer, an unsaturated polyalkylene glycol type monomer, and a water-soluble monoethylenically unsaturated monomer copolymerizable with the monomers is 100. The unsaturated polyalkylene glycol type copolymer of this invention is preferred to contain an unsaturated polyalkylene glycol type copolymer which has such a sulfur-containing group as a sulfonic group linked to the terminal or the main chain thereof. The unsaturated polyalkylene glycol type copolymer which satisfies such necessary requirements as these is furnished at the terminal or the side chain of the polymer with such a sulfur-containing group as a sulfonic group. Thus, the polymer exhibits a better anti-gelling property than the conventional polymer mentioned above in spite of its large molecular weight as compared with the conventional polymer possessing an anti-gelling property. Further, since the polymer has a small impurity content, it can form an excellent water-soluble polymer of a low molecular weight which has derived to the maximum such a high performance as a dispersibility, chelating ability, and anti-gelling property inherently owned by the polymer without sacrificing the quality. Thus, the polymer can be suitably applied to such uses as a dispersant, a descaling agent, and a detergent builder. The unsaturated polyalkylene glycol type copolymer of this invention is a polymer obtained by polymerizing a composition containing 30–99 mass % of a (meth)acrylic acid type monomer and 1–70 mass % of an unsaturated polyalkylene glycol type monomer in an aqueous solution and may not be furnished at the terminal or the main chain thereof with such a sulfur-containing group as a sulfonic group. So long as the copolymer satisfies the necessary requirement of the aforementioned value S representing the quantity of the sulfur element introduced, it manifests the operation and the effect of this invention. The aqueous solutions of such unsaturated polyalkylene glycol type copolymers as copolymers of maleic acid, fumaric acid, itaconic acid, 2-hydroxyethyl (meth)acrylic acid, and copolymers thereof with monomers cited as Monomer C which will be specifically described herein below are also embraced by this invention when they satisfy the aforementioned necessary conditions regarding the aforementioned value S representing the quantity of the sulfur element introduced.

In the existing water-soluble polymer of a low molecular weight which is used for a dispersant and a descaling agent, when the weight average molecular weight is not less than 1000, the anti-gelling property is heightened in accordance as the molecular weight of the water-soluble polymer decreases, namely the weight average molecular weight approximates more closely to 1000. The chelating ability is heightened in accordance as the weight average molecular weight of the water-soluble polymer increases. Thus, the conventional water-soluble polymer has incurred difficulty in satisfactorily enhancing all the three properties, i.e. dispersibility, chelating ability, and anti-gelling property.

In contrast, the unsaturated polyalkylene glycol type copolymer which is a polymer formed by polymerizing the aforementioned monomer containing 30–99 mass % of (meth)acrylic acid type monomer and 1–70 mass % of an unsaturated polyalkylene glycol type monomer and optionally 0–60 mass % of a water-soluble monoethylenically unsaturated monomer in an aqueous solution and which has such a sulfur-containing group as a sulfonic group linked to the terminal or the main chain thereof and fulfills the necessary conditions regarding the aforementioned value S representing the quantity of the sulfur element introduced excels in dispersibility and anti-gelling property in spite of its comparatively large weight average molecular weight because it has such a sulfur-containing group as a sulfonic group linked to the terminal or the side chain of the polymer. For the large weight average molecular weight, the anti-gelling property is highly satisfactory relatively. Thus, the unsaturated polyalkylene glycol type copolymer which satisfies such necessary conditions as these exhibits a high dispersing ability and a highly excellent anti-gelling property in addition to manifesting the same chelating ability as the conventional unsaturated polyalkylene glycol type copolymer having an about equal weight average molecular weight.

The unsaturated polyalkylene glycol type copolymer according to this invention is preferred to have such a sulfur-containing group as a sulfonic group linked to the terminal or the main chain thereof and possess a high anti-gelling property as described above. By such a sulfur-containing group as a sulfonic group linked to the terminal, it is made possible to exalt the dispersing ability and the chelating ability. Further, the copolymer is enabled to manifest a high anti-gelling property. Thus, this unsaturated polyalkylene glycol type copolymer can be suitably utilized for a dispersant for inorganic pigments, a descaling agent, and a detergent builder.

The necessary condition that the copolymer be a polymer formed by polymerizing the aforementioned monomer containing 30–99 mass % of (meth)acrylic acid type monomer and 1–70 mass % of an unsaturated polyalkylene glycol type monomer and optionally 0–60 mass % of a water-soluble monoethylenically unsaturated monomer in an aqueous solution and have such a sulfur-containing group as a sulfonic group linked to the terminal or the side chain thereof will be described below in conjunction with the method for the production of an unsaturated polyalkylene glycol type copolymer of this invention.

The fourth aspect of this invention is directed toward a method for the production of an unsaturated polyalkylene glycol type copolymer by the copolymerization of a (meth) acrylic acid type monomer A and an unsaturated polyalkylene glycol type monomer B, wherein the combination of one or more species respectively of a persulfate and a bisulfite is used as an initiator.

By having not only a persulfate but also a bisulfite incorporated as an initiator in the aforementioned ranges, the produced unsaturated polyalkylene glycol type copolymer is prevented from acquiring an unnecessarily high molecular weight but enabled to acquire a low molecular weight efficiently. Moreover, the produced unsaturated polyalkylene glycol type copolymer has been enabled to have such a sulfur-containing group as a sulfonic group introduced therein quantitatively, specifically in such a quantity as fulfills the value S representing the quantity of the sulfur element introduced specified above. The fact that such a sulfur-containing group as a sulfonic group can be introduced quantitatively indicates that the persulfate and the bisulfite are functioning very satisfactorily as an initiator. Thus, the reaction system of polymerization does not require addition of an excess initiator and allows a further decrease in the quantity of the initiator to be added. As a result, it is made possible to repress the rise of the cost of production of the polymer and enhance the efficiency of production. The produced unsaturated polyalkylene glycol type copolymer, therefore, is capable of repressing the aggregation with a metal salt of calcium, for example, and acquiring a satisfactory anti-gelling property. Further, by controlling the quantity of the initiator to be added to the reaction system of polymerization and the polymerization temperature within certain ranges, it is made possible to repress the emission of sulfur dioxide in a large quantity and allay the generation of an impurity as well. Thus, the further enhancement of the quality can be realized, the rise of the cost of production of the polymer can be repressed, and the efficiency of production can be exalted.

The monomer to be used in the method of production of this invention is not particularly restricted but is only required to be formed of a monomer component which is capable of producing the unsaturated polyalkylene glycol type copolymer by polymerization. Although it has to contain at least a (meth)acrylic acid type monomer (hereinafter occasionally referred to as "monomer A") and an unsaturated polyalkylene glycol type monomer (hereinafter occasionally referred to as "monomer B"), it may optionally contain additionally a monoethylenically unsaturated monomer copolymerizable with the monomers A and B (hereinafter occasionally referred to as "monomer C"). The term "monomer" as used herein refers to a monomer formed of monomer components and excludes a solvent, an initiator, and other additives which are other components used in the polymerization.

As concrete examples of the monomer A component mentioned above, acrylic acid; methacrylic acid; salts formed by partially or completely neutralizing (meth)acrylic acid with such an alkali metal as sodium or potassium; and salts formed by partially or completely neutralizing the acid with either ammonia or an organic amine such as monoethanol amine or triethanol amine may be cited. These monomers may be used either singly or in the form of a combination of two or more members. Preferably, acrylic acid alone or a mixture formed by mixing acrylic acid and methacrylic acid at a prescribed ratio is used.

The quantity of the monomer A to be incorporated in the aforementioned monomer is in the range of 30–99 mass %, preferably in the range of 40–99 mass %, and more preferably in the range of 50–99 mass %, based on the total mass of the monomer. If the quantity of the monomer A to be incorporated falls short of 30 mass %, the shortage will result in preventing the chelating ability and the dispersing ability from being manifested in satisfactory balance.

The monomer A may be dissolved in a solvent which will be specifically described herein below, preferably in water and incorporated in the form of a monomer A solution (preferably aqueous solution). The concentration of the monomer A which is used as the monomer A solution (preferably aqueous solution) is in the range of 10–100 mass %, preferably in the range of 30–95 mass %, and more preferably in the range of 50–90 mass %. If the concentration of the monomer A solution falls short of 10 mass %, the shortage will result in lowering the concentration of the product and complicating transportation and storage. Conversely, the upper limit of this quantity ought not be particularly restricted. It may be 100 mass % (namely, solely) of monomer A (solution), i.e. total absence of a solvent.

As concrete examples of the monomer B component, compounds formed by adding 1–300 mol, preferably 1–100 mol, and more preferably 5–50 mol of an alkylene oxide having 2–18 carbon atoms to 1 mol of such an unsaturated alcohol as 3-methyl-3-buten-1-ol, 3-methyl-2-buten-1-ol, 2-methyl-3-buten-2-ol, or an allyl alcohol may be cited. As concrete examples of alkylene oxides having 2–18 carbon atoms, styrene oxide, ethylene oxide, and propylene oxide may be cited. Among other alkylene oxides enumerated above, ethylene oxide and/or propylene oxide is used preferably. When ethylene oxide and propylene oxide are used in combination, the order of linkage thereof is not restricted.

If the number of mols of ethylene oxide and/or propylene oxide to be added is 0, the effect of this invention cannot be manifested fully. If this number exceeds 300, the excess will result in preventing the effect of this invention from being enhanced and simply necessitating a large increase in the quantity for addition.

The quantity of the monomer B to be incorporated in the aforementioned monomer is in the range of 1–70 mass %, preferably 1–50 mass %, and more preferably in the range of 1–30 mol %, based on the total mass of the monomer. If the quantity of the monomer B to be incorporated falls short of 1 mass %, the shortage will result in preventing the chelating ability and the dispersing ability from being manifested in a harmonious balance.

The monomer B may be dissolved in the solvent which will be specifically described herein below, preferably in water and incorporated in the form of a monomer B solution (preferably aqueous solution). The concentration of the monomer B when used in the form of the monomer B solution (preferably aqueous solution) is in the range of 10–100 mass %, preferably in the range of 30–95 mass %, and more preferably in the range of 50–90 mass %. If the concentration of the monomer B solution falls short of 10 mass %, the shortage will result in lowering the concentration of the product and complicating transportation and storage o the product. The upper limit of this quantity ought not be particularly restricted. It may be 100 mass % (namely, solely) of monomer B (solution), i.e. total absence of a solvent.

The novel water-soluble copolymer according to this invention is obtained by copolymerizing a monomer component essentially containing a (meth)acrylic acid type monomer A and an unsaturated polyalkylene glycol type monomer B. The monomer component mentioned above may optionally contain besides the monomers A and B a monoethylenically unsaturated monomer C which is copolymerizable with the monomers A and B.

The monoethylenically unsaturated monomer C mentioned above is not particularly restricted. As concrete examples of this monomer C, styrene; styrene sulfonic acid; vinyl acetate; (meth)acrylonitrile; (meth)acrylamide; methyl (meth)acrylate; ethyl (meth)acrylate; butyl (meth)-acrylate; 2-ethylhexyl (meth)acrylate; dimethyl aminoethyl (meth) acrylate; diethyl aminoethyl (meth)acrylate; allyl alcohol; 3-methyl-3-buten-1-ol; 3-methyl-2-buten-1-ol; 2-methyl-3-buten-1-ol; 3-(meth)acryloxy-1,2-dihydroxy propane; 3-(meth)acryloxy-1,2-di(poly)-oxyethylene ether propane; 3-(meth)acryloxy-1,2-di(poly)oxypropylene ether propane; 3-(meth)acryloxy-1,2-dihydroxypropane phosphate and monovalent metal salts, divalent metal salts, ammonium salts, organic amine salts, or mono or diesters thereof with an alkyl group of 1–4 carbon atoms; 3-(meth)acryloxy-1,2-dihydroxypropane sulfate and monovalent metal salts, divalent metal salts, ammonium salts, organic amine salts, and esters thereof with an alkyl group of 1–4 carbon atoms; 3-(meth)acryloxy-2-hydroxypropane sulfonic acid and monovalent metal salts, divalent metal salts, ammonium salts, organic amine salts, and esters thereof with an alkyl group of 1–4 carbon atoms; 3-(meth)acryloxy-2-(poly)oxyethylene ether propane sulfonic acid and monovalent metal salts, divalent metal salts, ammonium salts, organic amine salts, and esters thereof with an alkyl group of 1–4 carbon atoms; monovalent metal salts, divalent metal salts, ammonium salts, organic amine salts, and esters thereof with an alkyl group of 1–4 carbon atoms; 3-(meth)acryloxy-2-(poly) oxypropylene ether propane sulfonic acid and monovalent metal salts, divalent metal salts, ammonium salts, organic amine salts, and esters thereof with an alkyl group of 1–4 carbon atoms; 3-allyloxypropane-1,2-diol; 3-allyloxy-propane-1,2-diol phosphate; 3-allyloxypropane-1,2-diol sulfonate; 3-allyloxypropane-1,2-diol sulfate; 3-allyloxy-1,2-di (poly)oxyethylene ether propane; 3-allyloxy-1,2-di(poly) oxyethylene ether propane phosphate; 3-allyoxy-1,2-di (poly)oxyethylene ether propane; 3-allyloxy-1,2-di(poly) oxyethylene ether propane phosphate; 3-allyloxy-1,2-di (poly)oxyethylene ether propane sulfonate; 3-allyloxy-1,2-di(poly)oxypropylene ether propane; 3-allyloxy-1,2-di (poly)oxypropylene ether propane phosphate; 3-allyoxy-2, 2-di(poly)oxypropylene ether propane sulfonate; 6-allyloxy-hexan-1,2,3,4,5-pentaol; 6-allyloxy-hexan-1,2,3,4,5-pentaolphosphate; 6-allyloxy-hexan-1,2,3,4,5-pentaol sulfonate; 6-allyloxy-hexan-1,2,3,4,5-penta(poly)oxyethylene ether hexane; 6-allyoxy-hexan-1,2,3,4,5-penta-(poly) oxypropylene ether hexane; vinyl sulfonic acid, allyl sulfonic acid, 3-allyloxy-2-hydroxy-propane sulfonic acid, 3-allyloxy-2-(poly)-oxyethylene propane sulfonic acid, 3-al-lyloxy-2-(poly)oxypropylene propane sulfonic acid and monoethylenically unsaturated monomers having a sulfonic group and monovalent metal salts, divalent metal salts, ammonium salts, and organic amine salts thereof o phosphoric esters or sulfate esters of such compounds and monovalent metal salts, divalent metal salts, ammonium salts, and organic amine salts thereof; monoethylenically-unsaturated aliphatic monocarboxylic acids such as (meth) acrylic acid, crotonic acid, and .-hydroxyacrylic acid; salts formed by partially or completely neutralizing the monoethylenically unsaturated aliphatic monocarboxylic acids with an alkali metal; salts formed by partially or completely neutralizing the monoethylenically unsaturated aliphatic monocarboxylic acids with either ammonia or such an organic amine as monoethanol amine or triethanol amine; monoethylenically unsaturated aliphatic dicarboxylic acids such as maleic acid, fumaric acid, and itaconic acid; salts formed by partially or completely neutralizing the monoethylenically unsaturated aliphatic dicarboxylic acids with an alkali metal; and salts formed by partially or completely neutralizing the monoethylenically unsaturated aliphatic dicarboxylic acid with either ammonia or such an organic amine as monoethanol amine or triethanol amine may be cited, though not exclusively.

The method of this invention prefers the monomer to be polymerized in an aqueous solution. This aqueous solution contains a solvent, an initiator, and other additives.

The solvent to be used in the reaction system of polymerization when the monomer is polymerized in the aqueous solution is preferred to be such an aqueous solvent as water, alcohol, glycol, glycerin, or a polyethylene glycol. Water is particularly preferable. These solvents may be used either singly or in the form of a combination of two or more members. For the purpose of improving the solubility of the monomer in the solvent, an organic solvent may be properly added in such a proportion as avoids exerting an adverse effect on the polymerization of each of the monomers.

As concrete examples of the organic solvent mentioned above, lower alcohols such as methanol and ethanol; amides such as dimethyl formaldehyde; and ethers such as diethyl ether and dioxane may be cited. These organic solvents may be used either singly or in the form of a combination of two or more members.

The quantity of the solvent mentioned above to be used is in the range of 40–200 mass %, preferably in the range of 45–180 mass %, and more preferably in the range of 50–150 mass %, based on the total mass of the monomer. If the quantity of this monomer to be used falls short of 10 mass %, the shortage will result in heightening the molecular weight. Conversely, if the quantity of the solvent to be used exceeds 200 mass %, the excess will result in lowering the concentration of the produced unsaturated polyalkylene glycol type copolymer and possibly necessitating removal of the solvent. The greater part or the whole of the solvent may be placed in the reaction vessel during the initial stage of the polymerization. Part of the solvent may be properly added (dropwise) independently into the reaction vessel during the process of polymerization. Otherwise, the monomer component, the initiator component, and other additives may be dissolved in advance in the solvent and these components may be properly added (dropwise) together into the reaction vessel during the process of the polymerization.

The initiator to be used in the reaction system for polymerization when the monomer is polymerized in the aqueous solution is preferred to be in the form of the combination of one or more species respectively of a persulfate and a bisulfite. By using the initiator in this manner, it is made possible to obtain a water-soluble polymer of a low molecular weight excelling not only in anti-gelling property but also in dispersing ability and chelating ability and enable the operation and the effect of this invention to be manifested effectively. By adding the bisulfite besides the persulfate to the initiator system, it is made possible to repress impartation of an unnecessarily high molecular weight to the produced polymer and permit efficient production of the polymer of a low molecular weight.

As concrete examples of the persulfate mentioned above, sodium persulfate, potassium persulfate, and ammonium persulfate may be cited. As concrete examples of the bisulfite, sodium bisulfite, potassium bisulfite and ammonium bisulfite may be cited. It is permissible to use a sulfite or a hyposulfite in the place of the bisulfite.

The ratio of the quantity of the persulfate and the quantity of the bisulfite to be added is such that the proportion of the bisulfite is in the range of 0.1–10 parts by mass, preferably in the range of 0.5–5 parts by mass, and more preferably in the range of 1–3 parts by mass relative to 1 part by weight of the persulfate. If the proportion of the bisulfite falls short of 0.1 part by mass relative to 1 part by mass of the persulfate, the shortage will result in preventing the bisulfite from producing a sufficient effect, possibly disabling the introduction of a sulfonic group to the terminal of the polymer in such a quantity as satisfies the value S representing the quantity of the sulfur element introduced defined above, and disposing the unsaturated polyalkylene glycol type copolymer to increase the weight average molecular weight. Conversely, if the proportion of the bisulfite exceeds 10 parts by mass relative 1 part by mass of the persulfate, the excess will result in inducing excess supply of the bisulfite to the reaction system of polymerization while the effect of the bisulfite has not been proportionated to the ratio of addition, consequently suffering the excess bisulfite to undergo decomposition in the reaction system and emit sulfur dioxide in a large quantity, and further inducing occurrence of an impurity in the unsaturated polyalkylene glycol type copolymer, entailing degradation of the performance of the produced unsaturated polyalkylene glycol type copolymer and precipitation of an impurity during the preservation at a low temperature.

The quantity of the aforementioned initiator comprising a persulfate and a bisulfite to be added is such that the total quantity of the persulfate and the bisulfite of the initiator is in the range of 1–30 g, preferably in the range of 3–20 g, and more preferably 5–15 g based on 1 mol of the monomer. Even when the persulfate and the bisulfite are added in such a small total quantity as this, this invention is enabled to repress remarkably the emission of sulfur dioxide and the generation of an impurity during the process of production because it causes it manages to repress the polymerization temperature to a low level. Thus, the produced unsaturated polyalkylene glycol type copolymer is enabled to have such a sulfur-containing group as a sulfonic group introduced to the terminal or the side chain thereof in such a quantity as satisfies the value S representing the quantity of the sulfur element introduced defined above. Besides, the produced unsaturated polyalkylene glycol type copolymer can be prevented from the degradation of performance and the precipitation of an impurity during the preservation at a low temperature. If the total quantity of the persulfate and the bisulfite of the aforementioned initiator falls short of 1 g, the shortage will result in inevitably heightening the molecular weight of the produced polymer, possibly disabling the introduction of such a sulfur-containing group as a sulfonic group to the terminal of the produced unsaturated polyalkylene glycol type copolymer in such a quantity as satisfies the value S representing the quantity of the sulfur element introduced defined above, and disposing the polymer to increase the weight average molecular weight. Conversely, if the quantity of addition exceeds 30 g, the excess will result in preventing the persulfate and the bisulfite of the initiator from producing an effect proportionately to the quantity of addition and inducing such adverse effects as lowering the purity of the produced unsaturated polyalkylene glycol type copolymer.

The aforementioned persulfate which is one of the components of the initiator may be dissolved in the aforementioned solvent, preferably in water and incorporated in the form of a sulfate solution (preferably aqueous solution). The concentration of the persulfate when the persulfate is used in the form of a persulfate solution (preferably aqueous solution) is in the range of 1–35 mass %, preferably in the range of 5–35 mass %, and more preferably in the range of 10–30 mass %. If the concentration of the sulfate solution falls short of 1 mass %, the shortage will result in lowering the concentration of the product and complicating transportation and preservation. Conversely, if the concentration of the persulfate solution exceeds 35 mass %, the excess will result in possibly inducing precipitation of the persulfate.

The bisulfite which is one of the components of the initiator may be dissolved in the aforementioned solvent, preferably in water and incorporated in the form of a bisulfite solution (preferably an aqueous solution). The concentration of the bisulfite when the bisulfite is used in the form of a bisulfite solution (preferably an aqueous solution) is in the range of 10–40 mass %, preferably in the range of 20–40 mass %, and more preferably in the range of 30–40 mass %. If the concentration of the bisulfite solution falls short of 10 mass %, the shortage will result in inevitably lowering the concentration of the product and complicating transportation and preservation. Conversely, if the concentration of the bisulfite solution exceeds 40 mass %, the excess will result in possibly inducing precipitation of the bisulfite.

This invention does not exclude such a mode of embodiment as uses the initiator mentioned above in conjunction with other initiator (inclusive of a chain transfer agent). When necessary, such other initiator as this may be properly used in a quantity incapable of exerting an adverse effect on the operation and the effect of this invention. Further in this invention, the aforementioned combination of a persulfate and a bisulfite is suitably used as initiator. The initiator, however, does not need to be particularly limited to this combination. The initiator which is capable of introducing such a sulfur-containing group as a sulfonic group in such as satisfies the value S defined above and allowing the polymer of a low molecular weight to be produced by one-step polymerization can be effectively used in this invention.

The other initiator mentioned above and the manner of addition thereof are the same as are already described concerning the method for the production of a (meth)acrylic acid type polymer and, therefore, will be omitted from the following description.

In the polymerization of the aforementioned monomer, the polymerization temperature is generally in the range of 25–99° C. The polymerization temperature is preferably not lower than 50° C. and more preferably not lower than 70° C. The polymerization temperature is preferably not higher than 95° C. and more preferably not higher than 90° C. The polymerization may be performed at a temperature of lower than 90. The range of this temperature is preferably 50–95° C. and more preferably 70–90° C. If the polymerization temperature falls short of 25° C., the shortage will result in raising the molecular weight, increasing the impurity, and elongating the polymerization time so much as to degrade the productivity. Conversely, if the polymerization temperature exceeds 99° C., the excess will result in inducing decomposition of the bisulfite of the initiator and emission of sulfur dioxide in a large quantity, consequently suffering the sulfur dioxide to dissolve in the liquid phase and form an impurity after polymerization and escape from the system during the process of polymerization and necessitate a costly treatment for recovery, preventing the added initiator from producing a satisfactory effect proportionately to the quantity of addition because of the escape of the bisulfite of the initiator in the form of sulfur dioxide, and disabling the reduction of the molecular weight. The term "polymerization temperature" as used herein refers to the temperature of the reaction solution in the reaction system.

The polymerization temperature does not need to be constantly retained approximately at a fixed level throughout the whole course of polymerization. The information about this polymerization temperature is the same as already described concerning the method for the production of a (meth)acrylic acid type polymer and, therefore, will be omitted from the following description.

In the polymerization of the aforementioned monomer, the pressure in the reaction system is not particularly restricted. The information about this pressure is the same as already described concerning the method for the production of a (meth)acrylic acid type polymer and, therefore, will be omitted from the following description.

The information about the atmosphere in the reaction system is the same as already described concerning the method for the production of a (meth)acrylic acid type polymer and, therefore, will be omitted from the following description.

In the method of production of this invention, the polymerization of the aforementioned monomer is preferred to be performed under an acid condition. The information about the acid condition is the same as already described concerning the method for the production of a (meth)acrylic acid type polymer and, therefore, will be omitted from the following description. The information about the preferred pH and the pH adjusting agent is the same as already described concerning the method for the production of a (meth)acrylic acid type polymer and, therefore, will be omitted from the following description.

The degree of neutralization in the process of polymerization is in the range of 1–25 mol %, preferably in the range of 2–15 mol %, and more preferably in the range of 3–10 mol %. If the degree of neutralization falls short of 1 mol %, the shortage will result in increasing the quantity of sulfur dioxide to be emitted and possibly increasing the molecular weight. Conversely, if the degree of neutralization in the process of polymerization exceeds 25 mol %, the excess will result in possibly degrading the efficiency of chain transfer of the bisulfite and increasing the molecular weight, suffering the viscosity of the aqueous solution in the reaction system of polymerization to increase conspicuously in consequence of the advance of polymerization, consequently inducing an unnecessarily large increase in the molecular weight of the produced polymer and disabling the production of a polymer of a low molecular weight, and further preventing the effect of the decrease of the degree of neutralization from being sufficiently manifested and possibly rendering it difficult to decrease the impurity markedly.

The method for effecting the neutralization is not particularly restricted. The information about the method for effecting the neutralization is the same as already described regarding the method for the production of a (meth)acrylic acid type polymer and, therefore, will be omitted from the following description.

In preparation for the polymerization, the aforementioned monomer, the persulfate and the bisulfite of the initiator system, and other additives are generally dissolved in advance in a proper solvent (preferably a solvent of the same kind as the solvent used for the liquid directed toward dropwise addition) to form respectively a monomer solution, a persulfate solution, a bisulfite solution, and an additive solution. Then, these solutions are preferred to be continuously added dropwise into the (aqueous) solvent (optionally adjusted to a prescribed temperature) placed in the reaction vessel over a prescribed duration of dropwise addition to effect the expected polymerization. Further, part of the aqueous solvent may be added dropwise later separately from the solvent initially placed in advance in the container of the reaction system. The method of production of this invention, however, is not limited to such a procedure as this. As regards the method of dropwise addition, for example, the dropwise addition may be performed either continuously or intermittently as divided into several small fractions. The monomer may be placed partially or wholly by way of initial charging (namely, the whole or part of the monomer may be regarded as added dropwise all at once at the time of starting the polymerization). As regards the speed of the dropwise addition of the monomer (the quantity of the monomer added dropwise), the dropwise addition may be performed at a fixed speed (fixed quantity) constantly from the start till the completion of the dropwise addition. Otherwise, the speed of the dropwise addition (the quantity of the monomer added dropwise) may be varied along the course of time, depending on such factors as the polymerization temperature. Instead of using one and the same speed for all the components for dropwise addition, the time for starting the polymerization and the time for terminating it may be staggered from one to another of the components for dropwise addition or the duration of dropwise addition may be shortened or elongated. Thus, the method of production of this invention may be properly altered within a range incapable of impairing the operation and the effect of the invention. When the individual components are added dropwise each in the form of a solution, the solutions for the dropwise addition may be heated to the same level as the polymerization temperature in the reaction system. Owing to this measure, the polymerization temperature which is elected to be retained at a fixed level produces only a small variation and permits easy adjustment.

Further, the bisulfite is such that the molecular weight thereof during the initial stage of polymerization largely affects the final molecular weight thereof. For the purpose of lowering the initial molecular weight, it is commendable to add dropwise the bisulfite or a solution thereof in a proportion in the range of 5–20 mass % within 60 minutes, preferably within 30 minutes, and more preferably within 10 minutes after the start of polymerization. This addition is particularly effective when the polymerization is initiated at room temperature as described specifically afterward.

For the polymerization, it is important to lower the polymerization temperature, repress the emission of sulfur dioxide, and prevent the formation of an impurity. Thus, the polymerization requires the total duration of dropwise addition to be so long as to fall in the range of 180–600 minutes, preferably in the range of 210–480 minutes, and more preferably in the range of 240–420 minutes. In consideration of the aforementioned problems encountered during the course of production and the exaltation of performance of the produced polymer, this elongation of the duration of polymerization may well be rated as a significant measure. If the total duration of dropwise addition falls short of 180 minutes, the shortage will result in preventing the persulfate and the bisulfite added as he initiator system from efficiently producing the effect thereof, thus causing the produced unsaturated polyalkylene glycol type copolymer to incur difficulty in introducing such a sulfur-containing group as a sulfonic group to the terminal or the side chain thereof in such a quantity as satisfies the value S representing the quantity of the sulfur element introduced, consequently disposing the polymer to heighten the weight average molecular weight thereof, possibly inducing the occurrence of an excess initiator owing to the quick dropwise addition of the initiator into the reaction system, and therefore suffering the excess initiator to decompose, emit sulfur dioxide, discharge it from the system, and form an impurity. Conversely, if the total duration of dropwise addition exceeds 600 minutes, in spite of the satisfactory performance of the produced polymer owing to the repressed emission of sulfur dioxide, the excess will result in degrading the productivity of the unsaturated polyalkylene glycol type copolymer and possibly imposing a limit on the uses to be found. The term "total duration of dropwise addition" as used herein refers to the length of time which intervenes between the time of the dropwise addition of the first component for dropwise addition (not necessarily limited to one component) is initiated and the time of the dropwise addition of the last component for dropwise addition (not necessarily limited to one component) is completed.

As regards the duration of dropwise addition of the bisulfite or the solution thereof among other components for dropwise addition during the process of polymerization, the termination of this dropwise addition is advanced by an interval of 1–30 minutes, preferably 1–20 minutes, and more preferably 1–15 minutes from the termination of the dropwise addition of the monomer or the solution thereof. The information about this procedure is the same as already described concerning the (meth)acrylic acid type polymer and, therefore, will be omitted from the following description.

As regards the duration of dropwise addition of the persulfate (solution) among other components for dropwise addition during the process of polymerization, the termination of this dropwise addition is advanced by an interval of 1–30 minutes, preferably 1–20 minutes, and more preferably 1–15 minutes from the termination of the dropwise addition of the monomer (solution). The information about this procedure is the same as already described concerning the (meth)acrylic acid type polymer and, therefore, will be omitted from the following description the excess.

The solid component concentration in the aqueous solution (namely the solid component concentration of the monomer) at the time that the dropwise addition of each of the components mentioned above is terminated and the reaction of polymerization in the reaction system of polymerization is terminated exceeds 35 mass % and preferably falls in the range of 40–70 mass %, and more preferably in the range of 45–65 mass %. The information about this solid component concentration is the same as already described regarding the (meth)acrylic acid type polymer and, therefore, will be omitted from the following description.

In the method for the production of an unsaturated polyalkylene glycol type copolymer of this invention, the polymerization is carried out under the aforementioned acid condition (the pH of the reaction solution in the process of polymerization falling in the range of 1–6 at 25° C. and the degree of neutralization in the process of polymerization falling in the range of 1–25 mol %). The information about the degree of neutralization under the acid condition is the same as already described with the (meth)acrylic acid type polymer and, therefore, will be omitted from the following description.

The unsaturated polyalkylene glycol type copolymer of this invention may be produced either batchwise or continuously.

The method for the production of an unsaturated polyalkylene glycol type copolymer of this invention is characterized by using as an initiator the combination of one or more species respectively of a persulfate and a bisulfite, wherein the bisulfite is used in a proportion in the range of 0.1–10 by mass ratio relative to the mass of the persulfate taken as 1, the total quantity of the persulfate and the bisulfite to be added to the reaction system of polymerization is in the range of 1–30 g per mol of the monomer, and the polymerization temperature is in the range of 25–99° C. Here, the polymerization is preferred to be performed under an acid condition (the pH of the reaction solution in the process of polymerization falling in the range of 1–6 at 25° C. and the degree of neutralization during the course of polymerization falling in the range of 1–25 mol %), with the durations of dropwise addition of the individual components for dropwise addition adjusted in the meanwhile. Preferably, the solid component concentration at the time of termination of the polymerization is not less than 35 mass % and the weight average molecular weight of the produced polymer is in the range of 2000–100000. When the weight average molecular weight of the produced unsaturated alkylene glycol type copolymer is in the aforementioned range, the quantity of the initiator added to the reaction system of polymerization can be markedly repressed so as to favor the cost of production and the emission of sulfur dioxide and the occurrence of an impurity during the process of production can be effectively and efficiently prevented (repressed) as well. Thus, an unsaturated polyalkylene glycol type copolymer capable of conspicuously and effectively manifesting various properties as high dispersibility, a high chelating ability, and a high anti-gelling property at high levels can be efficiently produced. That is, a polymer of high quality suitably applicable to a dispersant of inorganic pigments, a descaling agent, and a detergent builder can be produced at a low cost. Further, the cost can be decreased as by repressing an increase in the quantity of the initiator to be added to the reaction system of polymerization.

As concrete examples of the use found for the unsaturated polyalkylene glycol type copolymer of this invention, aqueous dispersants (inclusive of calcium carbonate, kaolin, and a pigment dispersant), water treating agents, descaling agents (scale repressing agent), cement additives, detergent builders (inclusive of liquid and pulverulent detergents), and detergents using the builders may be cited, though not exclusively. The copolymer ought not be limited to these uses but may be utilized in a wide variety of applications. It can be applied to metal ion binding agents, thickeners, and various types of binders, for example.

The aqueous dispersant of this invention is characterized by containing an unsaturated polyalkylene glycol type copolymer (inclusive of the product of purification of such an unsaturated polyalkylene glycol type copolymer as mentioned above). Since the unsaturated polyalkylene glycol type polymer has the impurity content thereof decreased markedly, it can provide an aqueous dispersant of a low molecular weight which manifests veritably excellent dispersibility, chelating ability, and anti-gelling property inherent in an unsaturated polyalkylene glycol type copolymer. It also provides an aqueous dispersant which enjoys very high quality and performance and excels in stability such that it is incapable of inducing either degradation of performance during the protracted preservation or precipitation of an impurity during the preservation at a low temperature.

In the descaling agent of this invention, the components of composition other than the unsaturated polyalkylene glycol type copolymer and their proportions of incorporation are not particularly restricted. This descaling agent can be suitably applied (utilized) in a quantity incapable of impairing the operation and the effect of this invention, based on the various components and their proportions of incorporation effectively applied to the conventional aqueous dispersant.

The descaling agent of this invention is characterized by containing an unsaturated polyalkylene glycol type copolymer (inclusive of the product of purification of such an unsaturated polyalkylene glycol type copolymer as mentioned above). Since the unsaturated polyalkylene glycol type polymer has the impurity content thereof decreased markedly, it can provide a water-soluble descaling agent of a low molecular weight which manifests veritably excellent dispersibility, chelating ability, and anti-gelling property inherent in an unsaturated polyalkylene glycol type copolymer. It also provides a descaling agent which enjoys very high quality and performance and excels in stability such that it is incapable of inducing either degradation of performance during the protracted preservation or precipitation of an impurity during the preservation at a low temperature.

The cement additive of this invention is characterized by containing an unsaturated polyalkylene glycol type copolymer (inclusive of the product of purification of such an unsaturated polyalkylene glycol type copolymer as mentioned above). Since the unsaturated polyalkylene glycol type polymer has the impurity content thereof decreased markedly, it can provide a water-soluble cement additive of a low molecular weight which manifests veritably excellent dispersibility, chelating ability, and anti-gelling property inherent in an unsaturated polyalkylene glycol type copolymer. It also provides a cement additive which enjoys very high quality and performance and excels in stability such that it is incapable of inducing either degradation of performance during the protracted preservation or precipitation of an impurity during the preservation at a low temperature.

In the cement additive of this invention, the components of composition other than the unsaturated polyalkylene glycol type copolymer and their proportions of incorporation are not particularly restricted. This cement additive can be suitably applied (utilized) in a quantity incapable of impairing the operation and the effect of this invention, based on the various components and their proportions of incorporation effectively applied to the conventional cement additive.

The detergent builder of this invention is characterized by containing an unsaturated polyalkylene glycol type copolymer (inclusive of the product of purification of such an unsaturated polyalkylene glycol type copolymer as mentioned above). Since the unsaturated polyalkylene glycol type polymer has the impurity content thereof decreased markedly, it can provide a water-soluble detergent builder of a low molecular weight which manifests veritably excellent compatibility with a liquid detergent, dispersibility, chelating ability, and anti-gelling property inherent in an unsaturated polyalkylene glycol type copolymer. The detergent builder, in actual use, exhibits an excellent ability to prevent soil redeposition. It also provides a detergent builder which enjoys very high quality and performance and excels in stability such that it is incapable of inducing either degradation of performance during the protracted preservation or precipitation of an impurity during the preservation at a low temperature.

In the detergent builder of this invention, the components of composition other than the unsaturated polyalkylene glycol type copolymer and their proportions of incorporation are not particularly restricted. This detergent builder can be suitably applied (utilized) in a quantity incapable of impairing the operation and the effect of this invention, based on the various components and their proportions of incorporation effectively applied to the conventional detergent builder.

The detergent of this invention is characterized by containing an unsaturated polyalkylene glycol type copolymer (inclusive of the product of purification of such an unsaturated polyalkylene glycol type copolymer as mentioned above). Since the unsaturated polyalkylene glycol type polymer has the impurity content thereof decreased markedly, it can provide a water-soluble detergent of a low molecular weight which manifests veritably excellent dispersibility, chelating ability, and anti-gelling property inherent in an unsaturated polyalkylene glycol type copolymer. It also provides a detergent which enjoys very high quality and performance and excels in stability such that it is incapable of inducing either degradation of performance during the protracted preservation or precipitation of an impurity during the preservation at a low temperature.

Preferably in the detergent of this invention, the quantity of an unsaturated polyalkylene glycol type copolymer to be incorporated is in the range of 1–20 mass % based on the total mass of the detergent and the quantity of a surfactant to be incorporated is in the range of 5–70 mass % based on the total mass of the detergent. Optionally, this detergent may incorporate therein an enzyme in a quantity of not more than 5 mass %.

If the quantity of an unsaturated polyalkylene glycol type copolymer incorporated in the detergent falls short of 1 mass %, the shortage will result in preventing the effect of this addition from being manifested. Conversely, if this quantity exceeds 20 mass %, the excess will be at a disadvantage economically in preventing the effect of addition from being linked to the exaltation of deterging power. If the quantity of the surfactant which is the principal component of the detergent deviates from the range mentioned above, this deviation will result in possibly upsetting the balance of the surfactant with other components and exerting an adverse effect on the deterging power of the detergent. When an enzyme is incorporated in the detergent, it will contribute to the exaltation of deterging power. If the quantity of the enzyme to be incorporated exceeds 5 mass %, however, the excess will result in preventing the effect of addition from being manifested and imperiling the economy of the use of the enzyme.

The detergent builder according to this invention may be intended for use in a liquid detergent or a pulverulent detergent. Since the unsaturated polyalkylene glycol type copolymer excels in compatibility with a surfactant which will be specifically described herein below, it permits production of a liquid detergent of a high concentration. In the light of this fact, it is commendable to use the unsaturated polyalkylene glycol type copolymer of this invention as a builder for a liquid detergent.

The information about the surfactant and the enzyme which can be used herein is the same as already described concerning the (meth)acrylic acid type polymer and, therefore, will be omitted from the following description.

Further, the detergent of this invention may optionally incorporate therein a known alkali builder. The information about the incorporation of an alkali builder is the same as already described regarding the (meth)acrylic acid type polymer and, therefore, will be omitted from the following description.

The manner of incorporating an unsaturated polyalkylene glycol type copolymer in the detergent of this invention is decided in accordance with the form in which the detergent is marketed (a liquid product or a solid product, for example) and ought not be particularly restricted. The copolymer may be incorporated in the form of an aqueous solution assumed at the end of polymerization. Otherwise, it may be incorporated in a state concentrated by expelling the water content thereof to a certain degree. Alternatively, it may be incorporated in a state solidified to dryness.

This detergent embraces detergents such as bleaching detergents having one function of the component thereof enriched which are used exclusively for specific purposes besides synthetic detergents for household use, industrial detergents directed toward textile industry and other industries, and hard facial detergents.

EXAMPLES

Now, this invention will be described more specifically below with reference to working examples and comparative examples. This invention is not restricted in any respect by these examples. The symbol "%" entered in the working examples and the comparative examples represents "mass %" unless otherwise specified.

<Regarding (Meth)Acrylic Acid Type Polymer>

As regards the (meth)acrylic acid type polymer of this invention, (1—1) the quantity of S contained in the polymer and the total quantity of S and the method for dialysis to be used in the determination thereof, (1-2) the weight average molecular weight (Mw) and the number average molecular weight (Mn) of the polymer, (1-3) the degree of gelation, q, to be used in determining the value Q representing the anti-gelling ability, (1-4) the NMR to be used in determining the value R, (1-5) the iron ion concentration, (1-6) the Ca-binding capacity, (1-7) the quantity of sulfur dioxide emitted, (1-8) the quantity of precipitation at a low temperature, and (1-9) the method for determining the sulfur dioxide component are shown below.

(1—1) Determination of the Quantity of S Contained in the Polymer and the Total Quantity of S The quantity of S in the (meth)acrylic acid type polymer obtained by polymerization before and after the treatment of dialysis was determined by the inductively coupled plasma (ICP) emission spectroscopy. Here, the quantity of S of the (meth)acrylic acid type polymer prior to the treatment of dialysis was designated "the total quantity of S." The quantity of S of the (meth)acrylic acid type polymer after the treatment of dialysis was designated as "the quantity of S contained in the polymer." The method of dialysis used herein will be described below.

<<Method of Dialysis>>

① An aqueous solution of (meth)acrylic acid type polymer having a solid component concentration of 30 mass % was prepared by adding a suitable quantity of water to a (meth)acrylic acid type polymer obtained by polymerization. In a dialysis membrane 40 cm long, 20 g of the aqueous solution was placed and sealed tightly. As the dialysis membrane was a Spectra/Por Membrane MWCO: 1000 having a fractional molecular weight of 1000 (made by Spectrum Laboratories Inc.). This invention allows use of a dialysis membrane having an about equal fractional molecular weight to the membrane just mentioned.

② The dialysis membrane was immersed in 2000 g of water held in a 2-liter beaker and the water was agitated with a stirrer.

③ After the agitation was continued for 6 hours, the dialysis membrane was withdrawn from the beaker and the content of the dialysis membrane was extracted after the outside of the dialysis membrane had been thoroughly rinsed with water.

④ The extract was concentrated with the use of an evaporator and the resultant concentrate was used as a sample of the (meth)acrylic acid type polymer after the treatment of dialysis.

As a sample of the (meth)acrylic acid type polymer prior to the treatment of dialysis, the concentrate obtained by subjecting a (meth)acrylic acid type polymer obtained by polymerization as described in the step ① mentioned above to the same treatment with an evaporator as described in the step ④ was used.

(1-2) Determination of Weight Average Molecular Weight (Mw) and Number Average Molecular Weight (Mw)

The weight average molecular weight (Mw) and the number average molecular weight (Mn) of a (meth)acrylic acid type polymer were both determined by gel permeation chromatography (GPC). As the sample for this determination, a (meth)acrylic acid type polymer obtained by polymerization as described in the step ① of the paragraph (1) Method of dialysis was used in its unmodified form. The conditions and the devices used for the determination were as follows.

A column made by Tosoh K.K. and sold under the trademark designation of G-3000PWXL was used for the GPC.

As the mobile phase for the GPC, an aqueous solution prepared by diluting 34.5 g of hydrogen disodium phosphate dodecahydrate and 46.2 g of dihydrogen sodium phosphate (both reagent chemicals) with purified water to give a total weight of 5000 g and filtering the resultant aqueous solution through a 0.45 μm membrane filter was used.

As the detector, a sensor made by Waters Corp. and sold under the product code of "Model 481 type" and operated with a detection wavelength of UV: 214 nm was used.

As the pump, a product of Hitachi, Ltd. sold under the trademark designation of L-7110 was used.

The flow rate of the mobile phase was fixed at 0.5 ml/minute and the temperature at 35° C. The calibration curve was prepared by using a standard sample of sodium polyacrylate made by Sowa Kagaku K.K.

(1-3) Determination of Degree of Gelation, q, and Value Q Representing Anti-Gelling Ability For the determination of the degree of gelation, a borate buffer solution, an aqueous calcium chloride solution, and an aqueous 1% polymer solution were prepared. The borate buffer solution was formed by diluting 7.42 g of boric acid, 1.75 g of sodium chloride, and 7.63 g of sodium borate decahydrate with purified water to give a total weight of 1000 g. The aqueous calcium chloride solution was formed by diluting 0.735 g of calcium chloride dihydrate with purified water to give a total weight of 2500 g. The aqueous 1% polymer solution mentioned above was formed by diluting a (meth)acrylic acid type polymer obtained by polymerization as described in the step ① of the paragraph (1) Method of dialysis with a suitable water to give a solid component concentration of 1 mass %.

Then, a tall beaker having an inner volume of 500 ml was charged with the aforementioned solutions added in a prescribed order in prescribed quantities. The prescribed order and the prescribed quantities were as follows: The beaker was charged firstly with 250 ml of purified water, secondly with 10 ml of the borate buffer solution, thirdly with 5 ml of the aqueous 1% polymer solution, and lastly with 250 ml of the aqueous calcium chloride solution.

By mixing the solutions introduced in this order into the beaker, the polymer contained in the aqueous 1% polymer solution was allowed to be gelled and the resultant mixed solution was used as a test solution. The tall beaker holding the test solution was stoppered and then left standing at rest for one hour in a constant temperature bath adjusted in advance to 90° C. After the elapse of this one hour, the test solution was immediately transferred into a quartz cell 5 cm in depth and measured for absorbency, a, at an UV wavelength of 380 nm.

Separately, a blank solution was prepared by following the procedure used in the preparation of the test solution with the four components identified above while using 250 ml of purified water in place of 250 ml of the aqueous calcium chloride solution, i.e. one of the four components mentioned above. This blank solution was processed in the same manner as the test solution mentioned above and measured for absorbency (blank value), b, at an UV wavelength of 380 nm. The degree of gelation, q, was calculated by the formula, a–b, wherein a denotes the absorbency and b the blank value.

The value Q representing the anti-gelling ability was calculated in accordance with the formula, Q=Degree of gelation×$10^5$/Mw, using this degree of gelation and the weight average molecular weight (Mw) obtained by the determination described in (2) above.

(1-4) $^1$H-NMR to be used in Determining the Value R
Device: A product of Varian Corp. and sold under the trademark designation of "Gemini 2000 (200 MHz)
Solvent: $D_2O$
Resonance frequency: 199.93 MHz
Probe: A 5-mm switchable probe
Nucleus for observation: Hydrogen nucleus
Conditions for determination: Pulses of 90 degrees, 10 μsec. (irradiation with 45-degree pulses)

| Waiting time | 1.254 sec |
| Number of integrations | 16 |
| Temperature | Room temperature |

Method for preparation of sample: A sample was formed by diluting 0.1 g of a (meth)acrylic acid type polymer having the solvent component thoroughly removed by vacuum drying with $D_2O$ to give a total weight of 1.0 g and completely dissolving the polymer.

(1-5) Determination of Iron Ion Concentration

A (meth)acrylic acid type polymer obtained by polymerization was measured for iron ion concentration by the method of ICP emission spectroscopy.

(1-6) Determination of Ca-Binding Capacity

In a beaker having an inner volume of 100 ml, 50 g of an aqueous 0.001 mol/liter calcium chloride solution was placed. To the solution, 10 mg of poly(meth)acrylate as reduced to a solid content was added. Then, this aqueous solution was adjusted with diluted sodium hydroxide solution to give a pH in the range of 9–11. Subsequently, the solution was kept stirred and 1 ml of an aqueous 4 mol/liter potassium chloride solution was added to the stirred solution as a calcium ion electrode stabilizer.

The resultant solution was measured for free calcium ion with the use of an ion analyzer (made by Orion K.K. and sold under the product code of "EA920 model") and a calcium ion electrode (made by Orion K.K. and sold under the product code of "93-20 model") to find by calculation the quantity of calcium ion, mg reduced to calcium carbonate, which had undergone chelation (the Ca-binding capacity, one form of chelating ability) per g of poly(meth)acrylate. The unit of the Ca-binding capacity which is one form of the chelating ability was "mg $CaCO_3$/g."

(1-7) Quantity of Sulfur Dioxide Emitted (Quantity of Gas)

The quantity of the gas discharged between the time of starting polymerization and the time of terminating polymerization was measured by the use of a gas meter (made by Shinagawa K.K. and sold under the trademark designation of "Dry Test Gas Meter Model DC-2") connected to a reflux condenser.

(1-8) Quantity of Precipitate at Low Temperature

① In a 50-ml screw cap bottle measuring 32 mm in inside diameter, 50 g of a given aqueous polymer solution (the polymer of a working example or the polymer of a comparative example) was cooled to 0° C.

② A small amount of single crystals of $Na_2SO_4$ was placed as seed crystals in the solution and left standing at rest at 0° C. for 12 hours.

③ Standard for evaluation: A precipitation of crystals to not less than half of the height of the liquid level was rated as "many" and a precipitation of crystals less than this amount was rated as "small."

(1-9) Method for Quantitative Determination of Sulfur Dioxide Content

A solution (hereinafter referred to as "solution ②") was prepared by mixing 20 g of an aqueous polymer solution (the polymer of a working example or the polymer of a comparative example) and 1 g of an aqueous about 1% hydrogen peroxide solution (hereinafter referred to as "solution ①") and stirring them together for 5 minutes. Then, the solution ② was tested for the hydrogen peroxide concentration as follows.

In a Meyer flask having an inner volume of 300 ml, 2 g of potassium iodide was placed and stirred together with 100 g of purified water added thereto with the use of a magnetic stirrer. When the potassium iodide was completely dissolved, 30 ml of 18N (9 mol/$(dm)^3$) sulfuric acid was added to the resultant aqueous solution. The produced solution and about 18–20 g of the solution ② added thereto were stirred together in a state covered with a light shielding paper for 5 minutes. The mixture consequently formed was titrated with a 0.1M sodium thiosulfate. The titration was continued slowly till the solution assumed a light yellow color. The solution and 1 ml of an aqueous 1% starch solution added thereto were together titrated till the color of iodine starch disappeared (A ml). A blank (obtained by omitting the addition of the solution ② in the procedure described above) was titrated in the same manner as described above (B ml). The hydrogen peroxide concentration of the solution ② was calculated in accordance with the following formula. The hydrogen peroxide concentration of the solution ① was similarly calculated.

Hydrogen peroxide concentration (%) =

$$\frac{(A-B) \times 0.1 \text{ M sodium thiosulfate factor} \times 17}{\text{Quantity of solution ① or solution③ (g) added}}$$

Then, the hydrogen peroxide concentration (%) consumed in the solution ② was calculated.

Hydrogen peroxide concentration (%) consumed in the solution ②=[Hydrogen peroxide concentration (%) of solution ①]×[(Solution ① (g)/Solution ② (g))-1]

The sulfur dioxide component present in the added solution ② was calculated as reduced to sodium bisulfite in accordance with the following formula.

Sulfur dioxide component (g) present in added solution ②=(Hydrogen peroxide concentration (%) consumed in solution ②)/100×[Quantity of solution ② (g) added]×108/34

Finally, the sulfur dioxide content (g) in the whole aqueous polymer solution, namely all the aqueous polymer solution in the polymerization kettle, was calculated as reduced to sodium bisulfite according to the following formula.

Sulfur dioxide content (g) in the whole aqueous polymer solution=(Bisulfurous acid content (g) present in added solution ②)×{Total quantity of aqueous polymer solution (g)}/[{Quantity of solution ② added (g)}×{(Quantity of aqueous polymer solution in solution ② (g))/(Solution ② (g)}]

Example 1

In a separable flask made of SUS, having an inner volume of 2.5 liters, and provided with a reflux condenser and a stirrer, 156.5 g of purified water was placed (initial charging) and heated to 90° C. as kept in a stirred state.

Then, to the reaction system of polymerization kept stirred at a fixed temperature of about 90° C., 427.5 g (4.75 mols) of an aqueous 80% acrylic acid solution (hereinafter abbreviated as "80% AA"), 63.5 g (0.25 mol) of an aqueous 37% sodium acrylate solution (hereinafter abbreviated as "37% SA"), 66.7 g (2.0 g/mol as reduced relative to the quantity of monomer introduced (wherein, the term "the quantity of monomer introduced" as used herein means the total quantity of all the monomers introduced; which applies similarly hereinafter)) of an aqueous 15% sodium persulfate solution (hereinafter abbreviated as "15% NaPS"), and 71.4 g (5.0 g/mol as reduced relative to the quantity of monomer introduced) of an aqueous 35% sodium bisulfite solution (hereinafter abbreviated as "35% SBS") were added dropwise through respectively independent dropping nozzles. The duration of dropwise addition was 300 minutes for the 80% AA, the 37% SA, and the 35% SBS each and 310 minutes for the 15% NaPS. During each of the durations of dropwise addition, the relevant component was continuously dropped at a fixed speed of dropping.

After termination of the dropwise addition, the reaction solution was retained at 90° C. over a period of 30 minutes to age the solution and terminate the polymerization. After completion of the polymerization, the reaction solution was left cooling and then neutralized by having 366.7 g (4.40 mols) of an aqueous 48% sodium hydroxide solution (hereinafter abbreviated as "48% NaOH") gradually added dropwise thereto as kept stirred. Thus, an aqueous solution containing sodium polyacrylate having a solid component concentration of 45 mass % and a final degree of neutralization of 93 mol % (hereinafter referred to as "polymer (1)") was obtained. The prescriptions for polymerization involved herein are summarized in Table 1 below.

The polymer (1) consequently obtained was measured for molecular weight, value S, value R, value Q, iron ion concentration, Ca-binding capacity, quantity of gas, and quantity of precipitation at low temperature. The results are shown in Table 11.

Examples 2–14

Polymers of these examples were obtained by following the procedure of example 1. The prescriptions for these polymers were summarized in Table 1 and Table 2 below.

The polymers (2)-(14) thus obtained were each measured for molecular weight, value S, value R, value Q, iron ion concentration, Ca-binding capacity, quantity of gas, and quantity of precipitation at low temperature. The results are shown in Table 11.

TABLE 1

| | | Example |||||||
|---|---|---|---|---|---|---|---|---|
| | | 1 | 2 | 3 | 4 | 5 | 6 | 7 |
| | | Polymer |||||||
| | | (1) | (2) | (3) | (4) | (5) | (6) | (7) |
| Initial charge of purified water | (g) | 156.5 | 140.0 | 145.0 | 160.0 | 165.0 | 135.0 | 165.0 |
| Dropwise addition | | | | | | | | |
| 80% AAaq | (g) | 427.5 | 405.0 | 405.0 | 405.0 | 405.0 | 405.0 | 405.0 |
| | (mol) | 4.75 | 4.50 | 4.50 | 4.50 | 4.50 | 4.50 | 4.50 |
| 37% SAaq | (g) | 63.5 | 127.0 | 127.0 | 127.0 | 127.0 | 127.0 | 127.0 |
| | (mol) | 0.25 | 0.50 | 0.50 | 0.50 | 0.50 | 0.50 | 0.50 |
| 35% SBSaq | (g) | 71.4 | 114.3 | 85.7 | 114.3 | 85.7 | 114.3 | 71.4 |
| | (g/mol) | 5.0 | 8.0 | 6.0 | 8.0 | 6.0 | 8.0 | 5.0 |
| 25% NaPSaq | (g) | 66.7 | 80.0 | 80.0 | 40.0 | 40.0 | 20.0 | 40.0 |
| | (g/mol) | 2.0 | 4.0 | 4.0 | 2.0 | 2.0 | 1.0 | 2.0 |
| Purified water | (g) | 0.0 | 0.0 | 0.0 | 0.0 | 0.0 | 30.0 | 0.0 |
| Duration of dropwise addition | (min) | | | | | | | |

TABLE 1-continued

| | | Example 1 Polymer (1) | Example 2 Polymer (2) | Example 3 Polymer (3) | Example 4 Polymer (4) | Example 5 Polymer (5) | Example 6 Polymer (6) | Example 7 Polymer (7) |
|---|---|---|---|---|---|---|---|---|
| 80% AAaq | | 0–300 | 0–240 | 0–240 | 0–240 | 0–240 | 0–240 | 0–240 |
| 37% SAaq | | 0–300 | 0–240 | 0–240 | 0–240 | 0–240 | 0–240 | 0–240 |
| 35% SBSaq | | 0–300 | 0–250 | 0–250 | 0–250 | 0–240 | 0–240 | 0–240 |
| 15% NaPSaq | | 0–310 | 0–250 | 0–250 | 0–250 | 0–250 | 0–250 | 0–250 |
| Purified water | | — | — | — | — | — | 0–250 | — |
| Polymerization temperature | (° C.) | 90 | 90 | 90 | 90 | 90 | 90 | 90 |
| Aging time | (min) | 30 | 30 | 30 | 30 | 30 | 30 | 30 |
| Degree of neutralization after dropwise addition | (mol %) | 5.0 | 10.0 | 10.0 | 10.0 | 10.0 | 10.0 | 10.0 |
| After treatment | | | | | | | | |
| 48% NaOHaq | (g) | 366.7 | 333.3 | 333.3 | 333.3 | 333.3 | 333.3 | 333.3 |
| | (mol) | 4.40 | 4.00 | 4.00 | 4.00 | 4.00 | 4.00 | 4.00 |
| Final degree of neutralization | (mol %) | 93.0 | 90.0 | 90.0 | 90.0 | 90.0 | 90.0 | 90.0 |
| Polymerization kettle | | SUS2.5L | SUS2.5L | SUS2.5L | SUS2.5L | SUS2.5L | SUS2.5L | SUS2.5L |
| Stirring vanes | | Paddle vanes | Paddle vanes | Paddle vanes | Paddle vanes | Paddle vanes | Paddle vanes | Paddle vanes |

TABLE 2

| | | Example 8 Polymer (8) | Example 9 Polymer (9) | Example 10 Polymer (10) | Example 11 Polymer (11) | Example 12 Polymer (12) | Example 13 Polymer (13) | Example 14 Polymer (14) |
|---|---|---|---|---|---|---|---|---|
| Initial charge of purified water | (g) | 165.0 | 137.8 | 137.8 | 98.0 | 156.5 | 158.5 | 156.5 |
| Dropwise addition | | | | | | | | |
| 80% AAaq | (g) | 405.0 | 405.0 | 405.0 | 405.0 | 427.5 | 427.5 | 427.5 |
| | (mol) | 4.50 | 4.50 | 4.50 | 4.50 | 4.75 | 4.75 | 4.75 |
| 37% SAaq | (g) | 127.0 | 127.0 | 127.0 | 127.0 | 63.5 | 63.51 | 63.5 |
| | (mol) | 0.50 | 0.50 | 0.50 | 0.50 | 0.25 | 0.25 | 0.25 |
| 35% SBSaq | (g) | 85.7 | 89.3 | 89.3 | 71.4 | 71.4 | 62.5 | 69.0 |
| | (g/mol) | 6.0 | 6.3 | 6.3 | 5.0 | 5.0 | 4.4 | 4.8 |
| 15% NaPSaq | (g) | 66.7 | 66.7 | 66.7 | 133.3 | 66.7 | 66.7 | 66.7 |
| | (g/mol) | 2.0 | 2.0 | 2.0 | 4.0 | 2.0 | 2.0 | 2.0 |
| Duration of dropwise addition | (min) | | | | | | | |
| 80% AAaq | | 0–240 | 10–250 | 10–250 | 0–240 | 0–240 | 0–240 | 0–240 |
| 37% SAaq | | 0–240 | 10–250 | 10–250 | 0–240 | 0–240 | 0–240 | 0–240 |
| 35% SBSaq | | 0–240 | 0–250 | 0–250 | 0–240 | 0–240 | 0–210 | 0–240 |
| 15% NaPSaq | | 0–250 | 10–260 | 10–260 | 0–250 | 0–250 | 0–250 | 0–250 |
| Polymerization temperature | (° C.) | 70 | 70 | 90 | 90 | 90 | 90 | 90 |
| Aging time | (min) | 30 | 30 | 30 | 30 | 30 | 30 | 30 |
| Degree of neutralization after dropwise addition | (mol %) | 10.0 | 10.0 | 10.0 | 10.0 | 5.0 | 5.0 | 5.0 |
| After treatment | | | | | | | | |
| 48% NaOHaq | (g) | 333.3 | 333.3 | 333.3 | 333.3 | 366.7 | 366.7 | 366.7 |
| | (mol) | 4.00 | 4.00 | 4.00 | 4.00 | 4.40 | 4.40 | 4.40 |
| Final degree of neutralization | (mol %) | 90.0 | 90.0 | 90.0 | 90.0 | 93.0 | 93.0 | 93.0 |
| Polymerization kettle | | SUS2.5L | SUS2.5L | SUS2.5L | SUS2.5L | SUS2.5L | SUS2.5L | SUS2.5L |
| Stirring vanes | | Paddle vanes | Paddle vanes | Paddle vanes | Paddle vanes | Paddle vanes | Paddle vanes | Paddle vanes |

Examples 15–17

Polymers of these examples were obtained by following the procedure of Example 1 while quickly adding 7.1 g (0.5 g/mol as reduced relative to the quantity of polymer introduced) of 35% SBS immediately prior to starting the dropwise addition of the 80% AA, 37% SA, 35% SBS, and 15% NaPS. The prescriptions for the polymers are summarized in Table 3 below.

The polymers (15)–(17) obtained were each measured for molecular weight, value S, value R, value Q, iron ion concentration, Ca-binding capacity, quantity of gas, and quantity of precipitation at low temperature. The results are shown in Table 11 below.

TABLE 3

| | | Example |  |  |
|---|---|---|---|---|
| | | 15 | 16 | 17 |
| | | | Polymer | |
| | | (15) | (16) | (17) |
| Initial charge of purified water | (g) | 137.0 | 137.0 | 137.0 |
| 35% SBSaq | (g) | 7.1 | 7.1 | 7.1 |
| | (g/mol) | 0.5 | 0.5 | 0.5 |
| Dropwise addition | | | | |
| 80% AAaq | (g) | 405.0 | 405.0 | 405.0 |
| | (mol) | 4.50 | 4.50 | 4.50 |
| 37% SAaq | (g) | 127.0 | 127.0 | 127.0 |
| | (mol) | 0.50 | 0.50 | 0.50 |
| 35% SBSaq | (g) | 85.7 | 85.7 | 85.7 |
| | (g/mol) | 6.0 | 6.0 | 6.0 |
| 15% NaPSaq | (g) | 66.7 | 66.7 | 66.7 |
| | (g/mol) | 2.0 | 2.0 | 2.0 |
| Duration of dropwise addition | (min) | | | |
| 80% AAaq | | 0–240 | 0–240 | 0–240 |
| 37% SAaq | | 0–240 | 0–240 | 0–240 |
| 35% SBSaq | | 0–240 | 0–240 | 0–240 |
| 15% NaPSaq | | 0–250 | 0–250 | 0–250 |
| Polymerization temperature | (° C.) | 70 | 90 | 50 |
| Aging time | (min) | 30 | 30 | 30 |
| Degree of neutralization after dropwise addition | (mol %) | 10.0 | 10.0 | 10.0 |
| After treatment 48% NaOHaq | (g) | 333.3 | 333.3 | 333.3 |
| | (mol) | 4.00 | 4.00 | 4.00 |
| Final degree of neutralization | (mol %) | 90.0 | 90.0 | 90.0 |
| Polymerization kettle | | SUS2.5L | SUS2.5L | SUS2.5L |
| Stirring vanes | | Paddle vanes | Paddle vanes | Paddle vanes |

Example 18

In a separable flask made of SUS, having an inner volume of 2.5 liters, and provided with a reflux condenser and a stirrer, 137.0 g of purified water was placed (initial charging) and heated to 30° C. as kept in a stirred state. Then, 7.1 g (0.5 g/mol as reduced relative to the quantity of monomer introduced) of 35% SBS was quickly added as stirred thereto. To the reaction system of polymerization thus obtained, 405.0 g (4.50 mols) of 80% AA, 127.0 g (0.50 mol) of 37% SA, 66.7 g (2.0 g/mol as reduced relative to the quantity of monomer introduced) of 15% NaPS, and 85.7 g (6.0 g/mol as reduced relative to the quantity of monomer introduced) of 35% SBS were added dropwise through respectively independent dropping nozzles. The duration of dropwise addition was 240 minutes for the 80% AA, the 37% SA, and the 35% SBS each and 250 minutes for the 15% NaPS. The polymerization temperature was elevated at a rate of 1° C. per minute after the polymerization was initiated at 30° C. and it was fixed at 90° C. after the elapse of 60 minutes following the initiation of polymerization. During each of the durations of dropwise addition, the relevant component was continuously dropped at a fixed speed of dropping.

After termination of the dropwise addition, the reaction solution was retained at 90° C. over a period of 30 minutes to age the solution and terminate the polymerization. After completion of the polymerization, the reaction solution was left cooling and then neutralized by having 366.7 g (4.40 mols) of 48% NaOH gradually added dropwise thereto as kept stirred. Thus, an aqueous solution containing sodium polyacrylate having a solid component concentration of 45 mass % and a final degree of neutralization of 93 mol % (hereinafter referred to as "polymer (18)") was obtained. The prescriptions for polymerization involved herein are summarized in Table 4 below.

The polymer (18) consequently obtained was measured for molecular weight, value S, value R, value Q, iron ion concentration, Ca-binding capacity, quantity of gas, and quantity of precipitation at low temperature. The results are shown in Table 11.

Example 19

In a separable flask made of SUS, having an inner volume of 2.5 liters, and provided with a reflux condenser and a stirrer, 154.0 g of purified water was placed (initial charging ) and heated to 30° C. as kept in a stirred state. To the reaction system of polymerization thus obtained and continuously kept stirred, 427.5 g (4.75 mols) of 80% AA, 63.5 g (0.25 mol) of 37% SA, 66.7 g (2.0 g/mol as reduced relative to the quantity of monomer introduced) of 15% NaPS, and 85.7 g (6.0 g/mol as reduced relative to the quantity of monomer introduced) of 35% SBS were added dropwise through respectively independent dropping nozzles. The duration of dropwise addition was 300 minutes for the 80% AA, the 37% SA, and the 35% SBS each and 310 minutes for the 15% NaPS. In the case of the 35% SBS, however, it was added dropwise to a total of 7.1 g (0.5 g/mol as reduced relative to the quantity of monomer introduced) in 10 minutes following the start of the polymerization and then to a total of 78.6 g (5.5 g/mol reduced relative to the quantity of monomer introduced) in the remainder of 290 minutes. The polymerization temperature was elevated at a rate of 1° C. per minute after the polymerization was initiated at 30° C. and it was fixed at 90° C. after the elapse of 60 minutes following the initiation of polymerization. During each of the durations of dropwise addition, the relevant component was continuously dropped at a fixed speed of dropping. In the case of the 35% SBS, however, the speed of dropwise addition (fixed) during 10 minutes following the start of the polymerization and the speed of dropwise addition (fixed) during the remainder of 290 minutes were different.

After termination of the dropwise addition, the reaction solution was retained at 90° C. over a period of 30 minutes to age the solution and terminate the polymerization. After completion of the polymerization, the reaction solution was left cooling and then neutralized by having 366.7 g (4.40 mols) of 48% NaOH gradually added dropwise thereto as kept stirred. Thus, an aqueous solution containing sodium polyacrylate having a solid component concentration of 45 mass % and a final degree of neutralization of 93 mol % (hereinafter referred to as "polymer (19)") was obtained. The prescriptions for polymerization involved herein are summarized in Table 4 below.

The polymer (19) consequently obtained was measured for molecular weight, value S, value R, value Q, iron ion concentration, Ca-binding capacity, quantity of gas, and quantity of precipitation at low temperature. The results are shown in Table 11.

Example 20

A polymer was obtained by following the procedure of Example 19 (hereinafter referred to as "polymer 20"). The prescriptions for the polymer are summarized in Table 4.

The polymer (20) consequently obtained was measured for molecular weight, value S, value R, value Q, iron ion concentration, Ca-binding capacity quantity of gas, and quantity of precipitation at low temperature. The results are shown in Table 11.

Example 21

In a separable flask made of SUS, having an inner volume of 2.5 liters, and provided with a reflux condenser and a stirrer, 154.0 g of purified water was placed (initial charging) and stirred and nitrogen was blown therein at a rate of 1 liter/min over a period of 30 minutes and they were heated together to 30° C. To the reaction system of polymerization thus obtained and continuously kept stirred, 427.5 g (4.75 mols) of 80% AA, 63.5 g (0.25 mol) of 37% SA, 66.7 g (2.0 g/mol as reduced relative to the quantity of monomer introduced) of 15% NaPS, and 78.6 g (5.5 g/mol as reduced relative to the quantity of monomer introduced) of 35% SBS were added dropwise through respectively independent dropping nozzles. The duration of dropwise addition was 300 minutes for the 80% AA, the 37% SA, and the 35% SBS each and 310 minutes for the 15% NaPS. In the case of the 35% SBS, however, it was added dropwise to a total of 7.1 g (0.5 g/mol as reduced relative to the quantity of monomer introduced) in 10 minutes following the start of the polymerization and then to a total of 71.5 g (5.0 g/mol reduced relative to the quantity of monomer introduced) in the remainder of 290 minutes. The polymerization temperature was elevated at a rate of 0.5° C. per minute after the polymerization was initiated at 30° C. and it was fixed at 90° C. after the elapse of 120 minutes following the initiation of polymerization.

After termination of the dropwise addition, the reaction solution was retained at 90° C. over a period of 30 minutes to age the solution and terminate the polymerization. After completion of the polymerization, the reaction solution was left cooling and then neutralized by having 366.7 g (4.40 mols) of 48% NaOH gradually added dropwise thereto as kept stirred. Thus, an aqueous solution containing sodium polyacrylate having a solid component concentration of 45 mass % and a final degree of neutralization of 93 mol % (hereinafter referred to as "polymer (21)") was obtained. The prescriptions for polymerization involved herein are summarized in Table 4 below.

The polymer (21) consequently obtained was measured for molecular weight, value S, value R, value Q, Ca-binding capacity, quantity of gas, and quantity of precipitation at low temperature. The results are shown in Table 11.

Example 22

In a separable flask made of SUS, having an inner volume of 2.5 liters, and provided with a reflux condenser and a stirrer, 156.5 g of purified water was placed (initial charging) and heated to 90° C. as kept in a stirred state. To the resultant reaction system of polymerization which was kept stirred at a fixed temperature of about 90° C., 427.5 g (4.75 mols) of 80% AA, 63.5 g (0.25 mol) of 37% SA, 66.7 g (2.0 g/mol as reduced relative to the quantity of monomer introduced) of 15% NaPS, and 71.4 g (5.0 g/mol as reduced relative to the quantity of monomer introduced) of 35% SBS were added dropwise through respectively independent dropping nozzles. The duration of dropwise addition was 240 minutes for the 80% AA, the 37% SA, and the 35% SBS each and 250 minutes for the 15% NaPS.

After termination of the dropwise addition, the reaction solution was retained at 90° C. over a period of 30 minutes to terminate the polymerization. After completion of the polymerization, nitrogen was blown into the reaction solution at a rate of 1 liter/min over a period of 30 minutes to expel sulfur dioxide from the reaction solution. Then, the reaction solution was left cooling. Thus, an aqueous solution containing sodium polyacrylate having a solid component concentration of 53 mass % and a final degree of neutralization of 5 mol % (hereinafter referred to as "polymer (22)") was obtained. The prescriptions for polymerization involved herein are summarized in Table 5 below.

The polymer (22) consequently obtained was measured for molecular weight, value S, value R, value Q, iron ion concentration, Ca-binding capacity, quantity of gas, and quantity of precipitation at low temperature. The results are shown in Table 11.

Example 23

In a separable flask made of SUS, having an inner volume of 2.5 liters, and provided with a reflux condenser and a stirrer, 156.5 g of purified water was placed (initial charging) and heated to 90° C. as kept in a stirred state. To the reaction system of polymerization kept stirred at a fixed temperature of about 90° C., 427.5 g (4.75 mols) of 80% AA, 63.5 g (0.25 mol) of 37% SA, 66.7 g (2.0 g/mol as reduced relative to the quantity of monomer introduced) of 15% NaPS, and 71.4 g (5.0 g/mol as reduced relative to the quantity of monomer introduced) of 35% SBS were added dropwise through respectively independent dropping nozzles. The duration of dropwise addition was 240 minutes for the 80% AA, the 37% SA, and the 35% SBS each and 250 minutes for the 15% NaPS.

After termination of the dropwise addition, the reaction solution was retained at 90° C. over a period of 30 minutes to terminate the polymerization. After completion of the polymerization, the reaction solution was left cooling and measured for sulfur dioxide content, which was found to be 1.2 g. For the purpose of decreasing this sulfur dioxide content, 1.1 g (equimolar to sulfur dioxide component) of an aqueous 35% hydrogen peroxide solution (hereinafter abbreviated as "35% $H_2O_2$") was added to the reaction solution. Thus, an aqueous solution containing sodium polyacrylate having a solid component concentration of 53 mass % and a final degree of neutralization of 5 mol % (hereinafter referred to as "polymer (23)") was obtained. The prescriptions for polymerization involved herein are summarized in Table 5 below.

The polymer (23) consequently obtained was measured for molecular weight, value S, value R, value Q, iron ion concentration, Ca-binding capacity, quantity of gas, and quantity of precipitation at low temperature. The results are shown in Table 11.

Example 24

In a separable flask made of SUS, having an inner volume of 2.5 liters, and provided with a reflux condenser and a stirrer, 156.5 g of purified water was placed (initial charging) and heated to 90° C. as kept in a stirred state. Then, to the reaction system of polymerization kept stirred at a fixed temperature of about 90° C., 427.5 g (4.75 mols) of 80% AA, 63.5 g (0.25 mol) of 37% SA, 66.7 g (2.0 g/mol as reduced relative to the quantity of monomer introduced) of 15% NaPS, and 71.4 g (5.0 g/mol as reduced relative to the quantity of monomer introduced) of 35% SBS were added dropwise through respectively independent dropping nozzles. The duration of dropwise addition was 240 minutes for the 80% AA, the 37% SA, and the 35% SBS each and 250 minutes for the 15% NaPS.

After termination of the dropwise addition, the reaction solution was retained at 90° C. over a period of 30 minutes to terminate the polymerization. After completion of the polymerization, the reaction solution was left cooling and then neutralized by having 366.7 g (4.40 mols) of 48% NaOH gradually added dropwise thereto as kept stirred. When the reaction solution was measured for sulfur dioxide content, this content was found to be 1.8 g. For the purpose of decreasing this sulfur dioxide content, 1.7 g (equimolar to the sulfur dioxide content) of an aqueous 35% hydrogen peroxide solution was added. Thus, an aqueous solution containing sodium polyacrylate having a solid component concentration of 45 mass % and a final degree of neutralization of 93 mol % (hereinafter referred to as "polymer (24)") was obtained. The prescriptions for polymerization involved herein are summarized in Table 5 below.

The polymer (24) consequently obtained was measured for molecular weight, value S, value R, value Q, iron ion concentration, Ca-binding capacity, quantity of gas, and quantity of precipitation at low temperature. The results are shown in Table 11.

TABLE 4

| | | Example | | | |
|---|---|---|---|---|---|
| | | 18 | 19 | 20 | 21 |
| | | Polymer | | | |
| | | (18) | (19) | (20) | (21) |
| Initial charge of purified water | (g) | 137.0 | 154.0 | 154.0 | 154.0 |
| 35% SBSaq | (g) | 7.1 | 0.0 | 0.0 | 0.0 |
| | (g/mol) | 0.5 | 0.0 | 0.0 | 0.0 |
| $N_2$ | (L/min) | 0.0 | 0.0 | 0.0 | 1.0 |
| | (min) | 0 | 0 | 0 | 30 |
| Dropwise addition | | | | | |
| 80% AAaq | (g) | 405.0 | 427.5 | 427.5 | 427.5 |
| | (mol) | 4.50 | 4.75 | 4.75 | 4.75 |
| 37% SAaq | (g) | 127.0 | 63.51 | 63.51 | 63.51 |
| | (mol) | 0.50 | 0.25 | 0.25 | 0.25 |
| 35% SBSaq | (g) | 85.7 | 85.7 | 78.6 | 78.6 |
| | (g/mol) | 6.0 | 6.0 | 5.5 | 5.5 |
| 15% NaPSaq | (g) | 66.7 | 66.7 | 66.7 | 66.7 |
| | (g/mol) | 2.0 | 2.0 | 2.0 | 2.0 |
| Duration of dropwise addition | (min) | | | | |
| 80% AAaq | | 0–240 | 0–300 | 0–300 | 0–300 |
| 37% SAaq | | 0–240 | 0–300 | 0–300 | 0–300 |
| 35% SBSaq | | 0–240 | 0–300** | 0–300** | 0–300** |
| 15% NaPSaq | | 0–250 | 0–310 | 0–310 | 0–310 |
| Polymerization temperature | (° C.) | 30–90* | 30–90*** | 30–90**** | 30–90**** |
| Aging time | (min) | 30 | 30 | 30 | 30 |
| Degree of neutralization after dropwise addition | (mol %) | 10.0 | 5.0 | 5.0 | 5.0 |
| After treatment | | | | | |
| 48% NaOHaq | (g) | 333.3 | 366.7 | 366.7 | 366.7 |
| | (mol) | 4.00 | 4.40 | 4.40 | 4.40 |
| Final degree of neutralization | (mol %) | 90.0 | 93.0 | 93.0 | 93.0 |

TABLE 4-continued

| | Example | | | |
|---|---|---|---|---|
| | 18 | 19 | 20 | 21 |
| | | | Polymer | |
| | (18) | (19) | (20) | (21) |
| Polymerization kettle | SUS2.5L | SUS2.5L | SUS2.5L | SUS2.5L |
| Stirring vanes | Paddle vanes | Paddle vanes | Paddle vanes | Paddle vanes |

*After start of polymerization at 30° C., the temperature was elevated at a rate of 1° C. per minute and fixed at 90° C. after elapse of 60 minutes following the start of polymerization.
**35% SBS was added in a quantity of 0.5 g/mol in 0–10 minutes and in the remainder of quantity in 10–300 minutes.
***After start of polymerization at 30° C., the temperature was elevated at a rate of 1° C. per minute and fixed at 90° C. after lapse of 60 minutes following the start of polymerization.
****After start of polymerization at 30° C., the temperature was elevated at a rate of 0.5° C. per minute and fixed at 90° C. after lapse of 120 minutes following the start of polymerization.

TABLE 5

| | | Example | | |
|---|---|---|---|---|
| | | 22 | 23 | 24 |
| | | | Polymer | |
| | | (22) | (23) | (24) |
| Initial charge of purified water | (g) | 156.5 | 156.5 | 156.5 |
| Dropwise addition | | | | |
| 80% AAaq | (g) | 427.5 | 427.5 | 427.5 |
| | (mol) | 4.75 | 4.75 | 4.75 |
| 37% SAaq | (g) | 63.5 | 63.5 | 63.5 |
| | (mol) | 0.25 | 0.25 | 0.25 |
| 35% SBSaq | (g) | 71.4 | 71.4 | 71.4 |
| | (g/mol) | 5.0 | 5.0 | 5.0 |
| 15% NaPSaq | (g) | 66.7 | 66.7 | 66.7 |
| | (g/mol) | 2.0 | 2.0 | 2.0 |
| Duration of dropwise addition | (min) | | | |
| 80% AAaq | | 0–240 | 0–240 | 0–240 |
| 37% SAaq | | 0–240 | 0–240 | 0–240 |
| 35% SBSaq | | 0–240 | 0–240 | 0–240 |
| 15% NaPSaq | | 0–250 | 0–250 | 0–250 |
| Polymerization temperature | (° C.) | 90 | 90 | 90 |
| Aging time | (min) | 30 | 30 | 30 |
| Degree of neutralization after dropwise addition | (mol %) | 5.0 | 5.0 | 5.0 |
| After treatment | | | | |
| 48% NaOHaq | (g) | 0.0 | 0.0 | 366.7 |
| | (mol) | 0.00 | 0.00 | 4.40 |
| 35% $H_2O_2$ | (g) | 0.0 | 1.1 | 1.7 |
| | (mol) | 0.000 | 0.012 | 0.017 |
| $N_2$ | (L/min) | 1.0 | 0.0 | 0.0 |
| | (min) | 30 | 0 | 0 |
| Final degree of neutralization | (mol %) | 5.0 | 5.0 | 93.0 |
| Polymerization kettle | | SUS2.5L | SUS2.5L | SUS2.5L |
| Stirring vanes | | Paddle vanes | Paddle vanes | Paddle vanes |

Example 25

In a separable flask made of SUS316, having an inner volume of 2.5 liters, and provided with a reflux condenser and a stirrer, 185 g of purified water, 116 g (1 mol) of maleic anhydride (hereinafter abbreviated as "MA anhydride"), 16.7 g (0.2 mol) of an aqueous 48% sodium hydroxide solution (hereinafter abbreviated as "48% NaOH") were placed and heated as stirred to 90° C. Then, 360 g (4 mols) of an aqueous 80% acrylic acid solution (hereinafter abbreviated as "80% AA"), 33.3 g (0.4 mol) of 48% NaOH, 133.3 g (4 g/mol as reduced relative to the quantity of monomer introduced) of an aqueous 15% sodium persulfate solution (hereinafter abbreviated as "15% NaPS"), and 114.3 g (8 g/mol as reduced relative to the quantity of monomer introduced) of an aqueous 35% sodium bisulfite (hereinafter abbreviated as "35% SBS") were added dropwise to the stirred mixture in the flask through respectively independent dropping ports. The duration of dropwise addition was 180 minutes for the 80% AA, 185 minutes for the 48% NaOH, 185 minutes for the 15% NaPS, and 175 minutes for the 35% SBS. The time for starting the dropwise addition was fixed for all the components. In this while, the temperature was maintained at 90° C. This temperature was further maintained over 30 minutes after completion of the dropwise addition of 80% AA to age the reaction solution and complete the polymerization. After completion of the polymerization, the reaction solution was left cooling and then neutralized by the addition of 375 g (4.5 mols) of 48% NaOH thereto. Thus, an acrylic acid/maleic acid copolymer (25) having a solid component content of 45 mass % and a final degree of neutralization of 85 mol % was obtained. The prescriptions for the polymer and the molecular weight are summarized in Table 6.

Example 26

An acrylic acid/maleic acid copolymer (26) was obtained by following the procedure of Example 25 while changing the prescriptions for the polymer as shown in Table 6. The prescriptions for the polymer and the molecular weight are summarized in Table 6.

Example 27

In a separable flask made of SUS316, having an inner volume of 2.5 liters, and provided with a reflux condenser and a stirrer, 222 g of purified water was placed and heated as stirred to 90° C. Then, 116 g (1 mol) of melted MA an hydride, 360 g (4 mols) of 80% AA, 50 g (0.6 mol) of 48% NaOH, 133.3 g (4 g/mol as reduced relative to the quantity of monomer introduced) of 15% NaPS, and 114.3 g (8 g/mol as reduced relative to the quantity of monomer introduced) of 35% SBS were added dropwise to the stirred water in the flask through respectively independent dropping ports. The duration of dropwise addition was 180 minutes for the MA anhydride, 300 minutes for the 80% AA, 300 minutes for the 48% NaOH, 310 minutes for the 15% NaPS, and 290 minutes for the 35% SBS. The time for starting the dropwise addition was fixed for all the components. In this while, the temperature was maintained at 90° C. This temperature was further maintained over 30 minutes after completion of the dropwise addition of 80% AA to age the reaction solution and complete the polymerization. After completion of the polymerization, the reaction solution was left cooling and then neutralized by the addition of 375 g (4.5 mols) of 48% NaOH thereto. Thus, an acrylic acid/maleic acid copolymer (27) having a solid component content of 45 mass % and a final degree of neutralization of 85 mol % was obtained. The prescriptions for the polymer and the molecular weight are summarized in Table 6.

Example 28

In a separable flask made of SUS316, having an inner volume of 2.5 liters, and provided with a reflux condenser and a stirrer, 208 g of purified water was placed and heated as stirred to 90° C. Then, 139 g (1.5 mols) of methacrylic acid (hereinafter abbreviated as "MAA"), 315 g (3.5 mols) of 80% AA, 20.8 g (0.25 mol) of 48% NaOH, 100 g (3 g/mol as reduced relative to the quantity of monomer introduced) of 15% NaPS, and 85.7 g (6 g/mol as reduced relative to the quantity of monomer introduced) of 35% SBS were added dropwise to the stirred mixture in the flask through respectively independent dropping ports. The duration of dropwise addition was 180 minutes for MAA, 180 minutes for 80% AA, 180 minutes for 48% NaOH, 185 minutes for 15% NaPS, and 175 minutes for 35% SBS. The time for starting the dropwise addition was fixed for all the components. In this while, the temperature was maintained at 90° C. This temperature was further maintained over 30 minutes after completion of the dropwise addition of 80% AA to age the reaction solution and complete the polymerization. After completion of the polymerization, the reaction solution was left cooling and then neutralized by the addition of 375 g (4.5 mols) of 48% NaOH thereto. Thus, an acrylic acid/methacrylic acid copolymer (28) having a solid component content of 45 mass % and a final degree of neutralization of 95 mol % was obtained. The prescriptions for the polymer and the molecular weight are summarized in Table 7.

Example 29

In a separable flask made of SUS316, having an inner volume of 2.5 liters, and provided with a reflux condenser and a stirrer, 114 g of purified water was placed and heated as stirred to 90° C. Then, 20.8 g (0.2 mol) of styrene (hereinafter a abbreviated as "St"), 342 g (3.8 mols) of 80% AA, 15.8 g (0.19 mol) of 48% NaOH, 106.7 g (4 g/mol as reduced relative to the quantity of monomer introduced) of 15% NaPS, 91.4 g (8 g/mol as reduced relative to the quantity of monomer introduced) of 35% SBS, and 5.2 g of purified water were added dropwise to the stirred mixture in the flask. While the purified water was added as mixed with 80% AA, the other components were added dropwise through respectively independent dropping ports. The duration of dropwise addition was 150 minutes for the St, 180 minutes for the 80% AA, 180 minutes for the 48% NaOH, 190 minutes for the 15% NaPS, and 180 minutes for the 35% SBS. The time for starting the dropwise addition was fixed for all the components. In this while, the temperature was maintained at 90° C. This temperature was further maintained over 30 minutes after completion of the dropwise addition of 80% AA to age the reaction solution and complete the polymerization. After completion of the polymerization, the reaction solution was left cooling and then neutralized by the addition of 285 g (3.42 mols) of 48% NaOH thereto. Thus, an acrylic acid/styrene copolymer (29) having a solid component content of 45 mass % and a final degree of neutralization of 95 mol % was obtained. The prescriptions for the polymer and the molecular weight are summarized in Table 8.

Example 30

In a separable flask made of SUS316, having an inner volume of 2.5 liters, and provided with a reflux condenser and a stirrer, 145 g of purified water was placed and heated as stirred to 90° C. Then, 43 g (0.5 mol) of methyl acrylate (hereinafter abbreviated as "AM"), 405 g (4.5 mols) of 80% AA, 18.8 g (0.23 mol) of 48% NaOH, 133.3 g (4 g/mol as reduced relative to the quantity of monomer introduced) of 15% NaPS, 114.3 g (8 g/mol as reduced relative to the quantity of monomer introduced) of 35% SBS, and 10.8 g of purified water were added dropwise to the stirred water in the flask. While the purified water was added dropwise as mixed with the 80% AA, the other components were added dropwise through respectively independent dropping ports. The duration of dropwise addition was 180 minutes for the AM, 180 minutes for the 80% AA and the purified water, 180 minutes for the 48% NaOH, 185 minutes for the 15% NaPS, and 175 minutes for the 35% SBS. The time for starting the dropwise addition was fixed for all the components. In this while, the temperature was maintained at 90° C. This temperature was further maintained over 30 minutes after completion of the dropwise addition of 80% AA to age the reaction solution and complete the polymerization. After completion of the polymerization, the reaction solution was left cooling and then neutralized by the addition of 337.5 g (4.05 mols) of 48% NaOH thereto. Thus, an acrylic acid/methyl acrylate copolymer (30) having a solid component content of 45 mass % and a final degree of neutralization of 95 mol % was obtained. The prescriptions for the polymer and the molecular weight are summarized in Table 9.

TABLE 6

| | | Example | | |
|---|---|---|---|---|
| | | 25 | 26 | 27 |
| | | | Polymer | |
| | | (25) | (26) | (27) |
| Initial charge of | (g) | 116.0 | 58.0 | 0.0 |
| MA anhydride | (mol) | 1.0 | 0.5 | 0.0 |
| 48% NaOH | (g) | 16.7 | 4.2 | 0.0 |
| | (mol) | 0.2 | 0.2 | 0.0 |
| Purified water | (g) | 185.0 | 198.0 | 222.0 |
| Dropwise addition | | | | |
| MA anhydride | (g) | 0.0 | 0.0 | 116.0 |
| | (mol) | 0.0 | 0.0 | 1.0 |
| 80% AA | (g) | 360.0 | 405.0 | 360.0 |
| | (mol) | 4.0 | 4.5 | 4.0 |
| 48% NaOH | (g) | 33.3 | 18.8 | 50.0 |
| | (mol) | 0.4 | 0.225 | 0.6 |
| 15% NaPS | (g) | 133.3 | 133.3 | 133.3 |
| | (g/mol) | 4.0 | 4.0 | 4.0 |
| 35% SBS | (g) | 114.3 | 114.3 | 114.3 |
| | (g/mol) | 8.0 | 8.0 | 8.0 |

TABLE 6-continued

| | | | | |
|---|---|---|---|---|
| Duration of dropwise addition | (min) | | | |
| MA anhydride | | — | — | 0–180 |
| 80% AA | | 0–180 | 0–180 | 0–300 |
| 48% NaOH | | 0–180 | 0–180 | 0–300 |
| 15% NaPS | | 0–175 | 0–175 | 0–290 |
| 35% SBS | | 0–185 | 0–185 | 0–310 |
| Polymerization and aging temperature | (° C.) | 90 | 90 | 90 |
| Aging time | (min) | 30 | 30 | 30 |
| Degree of neutralization after dropwise addition | (mol %) | 10 | 5 | 10 |
| After treatment | | | | |
| 48% NaOH | (g) | 375.0 | 366.7 | 375.0 |
| | (mol) | 4.5 | 4.4 | 4.5 |
| Final degree of neutralization | (mol %) | 85.0 | 85.0 | 85.0 |
| Polymerization kettle | | SUS2.5L | SUS2.5L | SUS2.5L |
| Stirring vanes | | Paddle vanes | Paddle vanes | Paddle vanes |
| Molecular weight | Mw | 9700 | 9400 | 7800 |
| | Mn | 2900 | 2200 | 2400 |

TABLE 7

| | | Example 28 Polymer (28) |
|---|---|---|
| Initial charge of purified water | (g) | 208.0 |
| Dropwise addition | | |
| MAA | (g) | 129.0 |
| | (mol) | 1.5 |
| 80% AA | (g) | 315.0 |
| | (mol) | 3.5 |
| 48% NaOH | (g) | 20.8 |
| | (mol) | 0.25 |
| 15% NaPS | (g) | 100.0 |
| | (g/mol) | 3.0 |
| 35% SBS | (g) | 85.7 |
| | (g/mol) | 6.0 |
| Duration of dropwise addition | (min) | |
| MAA | | 0–180 |
| 80% AA | | 0–180 |
| 48% NaOH | | 0–180 |
| 15% NaPS | | 0–185 |
| 35% SBS | | 0–175 |
| Polymerization and aging temperature | (° C.) | 90 |
| Aging time | (min) | 30 |
| Degree of neutralization after dropwise addition | (mol %) | 5 |
| After treatment | | |
| 48% NaOH | (g) | 375.0 |
| | (mol) | 4.5 |
| Final degree of neutralization | (mol %) | 95.0 |
| Polymerization kettle | | SUS2.5L |
| Stirring vanes | | Paddle vanes |
| Molecular weight | Mw | 6600 |
| | Mn | 2600 |

TABLE 8

| | | Example 29 Polymer (29) |
|---|---|---|
| Initial charge of purified water | (g) | 114.0 |
| Dropwise addition | | |
| St | (g) | 20.8 |
| | (mol) | 0.2 |
| 80% AA | (g) | 342.0 |
| | (mol) | 3.8 |
| 48% NaOH | (g) | 15.8 |
| | (mol) | 0.19 |
| Purified water | (g) | 5.2 |
| 15% NaPS | (g) | 106.7 |
| | (g/mol) | 4.0 |
| 35% SBS | (g) | 91.4 |
| | (g/mol) | 8.0 |
| Duration of dropwise addition | (min) | |
| St | | 0–150 |
| 80% AA | | 0–180 |
| 48% NaOH | | 0–180 |
| Purified water | | 0–180 |
| 15% NaPS | | 0–190 |
| 35% SBS | | 0–180 |
| Polymerization and aging temperature | (° C.) | 90 |
| Aging time | (min) | 30 |
| Degree of neutralization after dropwise addition | (mol %) | 5 |
| After treatment | | |
| 48% NaOH | (g) | 285.0 |
| | (mol) | 3.42 |
| Final degree of neutralization | (mol %) | 95.0 |
| Polymerization kettle | | SUS2.5L |
| Stirring vanes | | Paddle vanes |
| Molecular weight | Mw | 8500 |
| | Mn | 2600 |

TABLE 9

| | | Example 30 Polymer (30) |
|---|---|---|
| Initial charge of purified water | (g) | 145.0 |
| Dropwise addition | | |
| AM | (g) | 43.0 |
| | (mol) | 0.5 |
| 80% AA | (g) | 405.0 |
| | (mol) | 4.5 |
| 48% NaOH | (g) | 18.8 |
| | (mol) | 0.23 |
| Purified water | (g) | 10.8 |
| 15% NaPS | (g) | 133.3 |
| | (g/mol) | 4.0 |
| 35% SBS | (g) | 114.3 |
| | (g/mol) | 8.0 |
| Duration of dropwise addition | (min) | |
| AM | | 0–180 |
| 80% AA | | 0–180 |
| 48% NaOH | | 0–180 |
| purified water | | 0–180 |

TABLE 9-continued

|  |  | Example 30 Polymer (30) |
|---|---|---|
| 15% NaPS |  | 0–185 |
| 35% SBS |  | 0–175 |
| Polymerization and aging temperature | (° C.) | 90 |
| Aging time | (min) | 30 |
| Degree of neutralization after dropwise addition | (mol %) | 5 |
| After treatment |  |  |
| 48% NaOH | (g) | 337.5 |
|  | (mol) | 4.05 |
| Final degree of neutralization | (mol %) | 95.0 |
| Polymerization kettle |  | SUS2.5L |
| Stirring vanes |  | Paddle vanes |
| Molecular weight | Mw | 3600 |
|  | Mn | 1500 |

Comparative Example 1

In a separable flask made of SUS, having an inner volume of 5 liters, and provided with are flux condenser and a stirrer, 350 g of purified water was placed (initial charging) and heated as stirred to the boiling point. Then, 900 g (10 mols) of 80% AA, 266.7 g (4.0 g/mol as reduced relative to the quantity of monomer introduced) of 15% NaPS, 228.6 g (8.0 g/mol as reduced relative to the quantity of monomer introduced) of 35% SBS, and 83.3 g (1 mol) of 48% NaOH were added dropwise to the reaction system of polymerization kept stirred in a refluxed state at the boiling point through respectively independent dropping nozzles. The duration of dropwise addition was 180 minutes for the 80% AA and the 48% NaOH, and 190 minutes for the 15% NaPS and the 35% SBS. The components were each added dropwise at a fixed speed continuously throughout the relevant length of dropwise addition.

After completion of the dropwise addition, the reaction solution was further retained at the boiling point over a period of 30 minutes to age the reaction solution and complete the polymerization. After completion of the polymerization, the reaction solution was left cooling and then neutralized by having 225 g (2.7 mols) of 48% NaOH gradually added dropwise as stirred thereto. Thus, an aqueous solution containing sodium polyacrylate having a solid component concentration of 45 mass % and a final degree of neutralization of 37 mol % (hereinafter referred to as "Comparative polymer (1))." The prescriptions for the polymer are summarized in Table 10 below.

The comparative polymer (1) consequently obtained was measured for molecular weight, value S, value R, value Q, iron ion concentration, Ca-binding capacity, quantity of gas, and quantity of precipitation at low temperature. The results are shown in Table 11 below.

Comparative Example 2

In a separable flask made of SUS, having an inner volume of 5 liters, and provided with a reflux condenser and a stirrer, 150 g of purified water was placed (initial charging) and heated as stirred to the boiling point. Then, 900 g (10 mols) of 80% AA, 266.7 g (4.0 g/mol as reduced relative to the quantity of monomer introduced) of 15% NaPS, 228.6 g (8.0 g/mol as reduced relative to the quantity of monomer introduced) of 35% SBS, and 11.4 g of purified water were added dropwise invariably over a period of 120 minutes to the reaction system of polymerization kept stirred in a refluxed state at the boiling point through respectively independent dropping nozzles. The components were each added dropwise at a fixed speed continuously throughout the relevant length of dropwise addition.

After completion of the dropwise addition, the reaction solution was further retained at the boiling point over a period of 30 minutes to age the reaction solution and complete the polymerization. After completion of the polymerization, the reaction solution was left cooling and then neutralized by having 750 g (9.0 mols) of 48% NaOH gradually added dropwise as stirred thereto. Thus, an aqueous solution containing sodium polyacrylate having a solid component concentration of 45 mass % and a final degree of neutralization of 90 mol % (hereinafter referred to as "Comparative polymer (2))." The prescriptions for the polymer are summarized in Table 10 below.

The comparative polymer (2) consequently obtained was measured for molecular weight, value S, value R, value Q, iron ion concentration, Ca-binding capacity, quantity of gas, and quantity of precipitation at low temperature. The results are shown in Table 11 below.

Comparative Example 3

In a separable flask made of SUS, having an inner volume of 2.5 liters, and provided with a reflux condenser and a stirrer, 133.5 g of purified water was placed (initial charging) and heated as stirred to the boiling point. Then, 405.0 g (4.50 mols) of 80% AA, 127.0 g (0.50 mol) of 37% SA, 66.7 g (2.0 g/mol as reduced relative to the quantity of monomer introduced) of 15% NaPS, and 85.7 g (6.0 g/mol as reduced relative to the quantity of monomer introduced) of 35% SBS were added dropwise to the reaction system of polymerization kept stirred in a refluxed state at the boiling point through respectively independent dropping nozzles. The duration of dropwise addition was 240 minutes for the 80% AA, the 37% SA, and the 35% SBS and 250 minutes for the 15% NaPS.

After completion of the dropwise addition, the reaction solution was further retained at the boiling point over a period of 30 minutes to age the reaction solution and complete the polymerization. After completion of the polymerization, the reaction solution was left cooling and then neutralized by having 345.8 g (415 mols) of 48% NaOH gradually added dropwise as stirred thereto. Thus, an aqueous solution containing sodium polyacrylate having a solid component concentration of 45 mass % and a final degree of neutralization of 93 mol % (hereinafter referred to as "Comparative polymer (3))." The prescriptions for the polymer are summarized in Table 10 below.

The comparative polymer (3) consequently obtained was measured for molecular weight, value S, value R, value Q, iron ion concentration, Ca-binding capacity, quantity of gas, and quantity of precipitation at low temperature. The results are shown in Table 11 below.

Comparative Example 4

In a separable flask made of SUS, having an inner volume of 2.5 liters, and provided with a reflux condenser and a stirrer, 635.3 g of purified water was placed (initial charging) and heated as stirred to the boiling point. Then, 762.5 g (3.0 mols) of 37% SA, 24.0 g (1.2 g/mol as reduced relative to the quantity of monomer introduced) of 15% NaPS, and 82.3 g of purified water were added dropwise to the reaction system of polymerization kept stirred in a refluxed state at the boiling point through respectively independent dropping nozzles. The duration of dropwise addition was 200 minutes for the 37% SA and 205 minutes for the 15% NaPS and the purified water.

After completion of the dropwise addition, the reaction solution was further retained at the boiling point over a period of 30 minutes to age the reaction solution and complete the polymerization. After completion of the polymerization, the reaction solution was left cooling. Thus, an aqueous solution containing sodium polyacrylate having a solid component concentration of 20 mass % and a final degree of neutralization of 100 mol % (hereinafter referred to as "Comparative polymer (4) )." The prescriptions for the polymer are summarized in Table 10 below.

The comparative polymer (4) consequently obtained was measured for molecular weight, value S, value R, value Q, iron ion concentration, Ca-binding capacity, quantity of gas, and quantity of precipitation at low temperature. The results are shown in Table 11 below.

TABLE 10

| | | Comparative Example | | | |
|---|---|---|---|---|---|
| | | 1 | 2 | 3 | 4 |
| | | Comparative polymer | | | |
| | | (1) | (2) | (3) | (4) |
| Initial charge | | | | | |
| Purified water | (g) | 350.0 | 150.0 | 133.5 | 635.3 |
| 35% SBSaq | (g) | 0.0 | 0.0 | 0.0 | 0.0 |
| | (g/mol) | 0.0 | 0.0 | 0.0 | 0.0 |
| Dropwise addition | | | | | |
| 80% AAaq | (g) | 900.0 | 900.0 | 427.5 | 0.0 |
| | (mol) | 10.0 | 10.0 | 4.75 | 0.0 |
| 37% SAaq | (g) | 0.0 | 0.0 | 63.51 | 762.5 |
| | (mol) | 0.0 | 0.0 | 0.25 | 3 |

TABLE 10-continued

| | | Comparative Example | | | |
|---|---|---|---|---|---|
| | | 1 | 2 | 3 | 4 |
| | | Comparative polymer | | | |
| | | (1) | (2) | (3) | (4) |
| 35% SBSaq | (g) | 228.6 | 228.6 | 85.7 | 0.0 |
| | (g/mol) | 8.0 | 8.0 | 6.0 | 0.0 |
| 15% NaPSaq | (g) | 266.7 | 266.7 | 66.7 | 24 |
| | (g/mol) | 4.0 | 4.0 | 2.0 | 1.2 |
| 48% NaOHaq | (g) | 83.3 | 0.0 | 0.0 | 0.0 |
| | (g/mol) | 1.0 | 0.0 | 0.0 | 0.0 |
| Purified water | (g) | 0.0 | 11.4 | 0.0 | 82.3 |
| Duration of dropwise addition | (min) | | | | |
| 80% AAaq | | 0–180 | 0–120 | 0–240 | — |
| 37% SAaq | | — | — | 0–240 | 0–200 |
| 35% SBSaq | | 0–190 | 0–120 | 0–240 | — |
| 15% NaPSaq | | 0–190 | 0–120 | 0–250 | 0–205 |
| 48% NaOHaq | | 0–180 | — | — | — |
| Purified water | | — | 0–120 | — | 0–205 |
| Polymerization temperature | (° C.) | 100 (boiling point) | 100 (boiling point) | 100 (boiling point) | 100 (boiling point) |
| Aging time | (min) | 30 | 30 | 30 | 30 |
| Degree of neutralization after dropwise addition | (mol %) | 10 | 0 | 0 | 100 |
| After treatment | | | | | |
| 48% NaOHaq | (g) | 225.0 | 750.0 | 345.8 | 0 |
| | (mol) | 2.7 | 9.0 | 15.0 | 0 |
| Final degree of neutralization | (mol %) | 37.0 | 90.0 | 93.0 | 100 |
| Polymerization kettle | | SUS5L | SUS5L | SUS2.5L | SUS2.5L |
| Stirring vanes | | Paddle vanes | Paddle vanes | Paddle vanes | Paddle vanes |

TABLE 11

| | Molecular weight Mw/Mn | Quantity of S Value S | NMR Value R | Anti-gelling ability Value Q | Fe concentration (ppm) | Ca-binding ability (mgCaCO$_3$/g) | Quantity of gas (L) | Quantity of precipitation at low temperature |
|---|---|---|---|---|---|---|---|---|
| Polymer (1) | 5800/2400 | 49 | 5.0 | 2.02 | 1.40 | 250 | ≦0.3 | a little |
| Polymer (2) | 2500/1200 | 43 | 8.3 | 1.85 | 1.56 | 220 | ≦0.3 | a little |
| Polymer (3) | 4100/1500 | 40 | 6.1 | 2.01 | 1.83 | 236 | ≦0.3 | a little |
| Polymer (4) | 3200/1600 | 44 | 7.5 | 2.05 | 1.46 | 224 | ≦0.3 | a little |
| Polymer (5) | 4700/2000 | 45 | 5.9 | 2.01 | 1.23 | 239 | ≦0.3 | a little |
| Polymer (6) | 3900/1800 | 46 | 6.2 | 1.99 | 0.98 | 232 | ≦0.3 | a little |
| Polymer (7) | 6200/2600 | 46 | 3.9 | 2.23 | 1.53 | 244 | ≦0.3 | a little |
| Polymer (8) | 6200/2800 | 45 | 5.8 | 2.21 | 1.85 | 242 | ≦0.3 | a little |
| Polymer (9) | 8100/3200 | 38 | 4.4 | 2.39 | 1.76 | 262 | ≦0.3 | a little |
| Polymer (10) | 4700/2100 | 46 | 4.8 | 2.18 | 2.02 | 242 | ≦0.3 | a little |
| Polymer (11) | 8200/3000 | 43 | 5.1 | 2.37 | 1.65 | 260 | ≦0.3 | a little |
| Polymer (12) | 6000/2400 | 47 | 5.0 | 2.06 | 1.73 | 248 | ≦0.3 | a little |
| Polymer (13) | 7600/2600 | 44 | 1.9 | 2.33 | 1.98 | 257 | ≦0.3 | a little |
| Polymer (14) | 5900/2400 | 44 | 4.5 | 2.23 | 1.76 | 251 | ≦0.3 | a little |
| Polymer (15) | 4800/2100 | 42 | 3.2 | 2.22 | 0.83 | 240 | ≦0.3 | a little |
| Polymer (16) | 4700/2000 | 43 | 4.3 | 2.30 | 1.77 | 240 | ≦0.3 | a little |
| Polymer (17) | 7800/2800 | 39 | 5.5 | 2.30 | 0.95 | 259 | ≦0.3 | a little |
| Polymer (18) | 5500/2400 | 43 | 5.6 | 2.24 | 1.23 | 243 | ≦0.3 | a little |
| Polymer (19) | 5800/2800 | 42 | 4.5 | 2.31 | 0.78 | 249 | ≦0.3 | a little |

TABLE 11-continued

|  | Molecular weight Mw/Mn | Quantity of S Value S | NMR Value R | Anti-gelling ability Value Q | Fe concentration (ppm) | Ca-binding ability (mgCaCO$_3$/g) | Quantity of gas (L) | Quantity of precipitation at low temperature |
|---|---|---|---|---|---|---|---|---|
| Polymer (20) | 6500/2400 | 40 | 4.2 | 2.25 | 1.45 | 252 | ≦0.3 | a little |
| Polymer (21) | 6300/2400 | 44 | 4.1 | 2.18 | 0.49 | 250 | ≦0.3 | a little |
| Polymer (22) | 6000/2400 | 47 | 3.9 | 2.19 | 1.56 | 255 | ≦0.3 | a little |
| Polymer (23) | 5900/2400 | 49 | 5.5 | 2.22 | 1.37 | 251 | ≦0.3 | a little |
| Polymer (24) | 6000/2500 | 47 | 6.3 | 2.23 | 1.11 | 254 | ≦0.3 | a little |
| Comparative polymer (1) | 6600/2200 | 30 | 4.8 | 1.38 | 1.89 | 231 | 3.9 | much |
| Comparative polymer (2) | 7200/2400 | 32 | 3.3 | 1.51 | 1.95 | 234 | 4.3 | much |
| Comparative polymer (3) | 23000/5000 | 25 | 2.3 | 1.04 | 2.03 | 266 | 2.6 | much |
| Comparative polymer (4) | 4800/2100 | 0 | 0.0 | 3.92 | 0.40 | 250 | ≦0.3 | a little |

The Ca-binding capacity in Table 11 tends to increase in accordance as the molecular weight increases. The results of this quality must be therefore compared between samples having about equal molecular weights. As concerns the results shown in Table 11, while the polymer (20) and the comparative polymer (1) are samples of nearly equal molecular weights, the Ca-binding capacity is 252 for the polymer (20) and 231 for the comparative polymer (1), i.e. the polymer (20) clearly excels the comparative polymer (1). It is noteworthy that while the polymer (16), for example, excels in the Ca-binding capacity notwithstanding it has a fairly small molecular weight as compared with the comparative polymer (1).

Incidentally, this polymer has a large value Q representing the anti-gelling ability (namely the anti-gelling ability is lowered), as compared with the comparative polymers (1) and (2). This fact may be logically explained by the following postulate.

The anti-gelling ability, on account of the nature of evaluation, tends to decline in accordance as the polymer concentration increases. The polymer in the working examples of this invention which has succeeded in markedly decreasing the impurity content, therefore, inevitably exhibits poor anti-gelling ability as compared with the comparative polymers (1) and (2) which have large impurity contents (referred to the data of quantity of precipitate at low temperature, value S, and Ca-binding capacity regarding this point). The results under discussion, therefore, do not necessarily imply that the polymers of this invention are inferior in the anti-gelling ability.

<Regarding Unsaturated Polyalkylene Glycol Type Copolymer>

The unsaturated polyalkylene glycol type copolymers produced according to this invention were measured or determined for (2-1) the quantity S contained in a given polymer and the total quantity S and the method of dialysis used for their determination, (2—2) the weight average molecular weight (Mw) and the number average molecular weight (Mn), (2-3) the degree of gelation to be used for finding the anti-gelling ability, (2-4) the hue (value b), (2-5) the Ca-binding capacity, (2-6) the clay dispersing ability, and (2-7) the compatibility with a liquid detergent by the methods shown below.

Of these items, (2-1) and (2-3) were rated by following the procedure used in the working examples producing such (meth)acrylic acid type polymers as mentioned above. That is, they are equal respectively to (1—1) and (1-3) excepting that unsaturated polyalkylene glycol type copolymers are used instead of (meth)acrylic acid type polymers.

(2) Measurement of Weight Average Molecular Weight (Mw) and Number Average Molecular Weight (Mn)

The weight average molecular weight (Mw) and the number average molecular weight (Mn) of a given unsaturated polyalkylene glycol type copolymer were both measured by means of GPC (gel permeation chromatography). The conditions and the devices used for the measurement were as follows.

Device: Product of Hitachi, Ltd. sold under the product code of "L-7000 series"
Detector: RI
Column: Products of Shodex Corp. sold under product codes of "SB-G", "SB-804", "SB-803", "SB-802.5"
Column temperature: 40° C.
Calibration curve: Product of Sowa Kagaku K.K. sold under the trademark designation of Polyacrylic Acid Standard
GPC software: Product of Nippon Bunko K.K. sold under the trademark designation of "BORWIN"
Eluent: 0.1M phosphate buffer (pH 8.0)/acetonitrile=9/1 (weight ratio)

(4) Hue (Value b)

A given polymer or an aqueous polymer solution was diluted or concentrated till a polymer concentration of 40 mass %. By testing the prepared aqueous solution for transmittance by the use of a calorimeter made by Nippon Denshoku Kogyo K.K. and sold under the product code of "ND-1001DP" to find the laboratory grade value b. The value b is such that the yellow color of a given aqueous solution gains in density in accordance as the magnitude of the value b increase in the direction of positive number.

(5) Measurement of Ca-Binding Capacity

As the calcium ion standard solutions for the calibration curve, aqueous solutions were prepared using calcium chloride dihydrate each in a fixed quantity of 50 g respectively at concentrations of 0.01 mol/liter, 0.001 mol/liter and 0.0001 mol/liter. They were adjusted to pH values in the range of 9–11 with an aqueous 4.8% NaOH solution and further were thoroughly stirred together with 1 ml of an aqueous 4 mol/liter potassium chloride solution (hereinafter abbreviated as "4M-KCl aqueous solution") added thereto by the use of a magnetic stirrer to prepare sample solutions for the calibration curve. As the calcium ion standard solutions for the testing, aqueous 0.001 mol/liter calcium chloride dihydrate solutions were prepared in a necessary quantity (50 g per sample).

Then, in a 100-ml beaker, a test sample (polymer) weighed out in a quantity of 10 mg as reduced to a solid component content was placed and then thoroughly stirred together with 50 g of the aforementioned calcium ion standard solution for the testing by means of a magnetic stirrer. Further, similarly to the calibration curve sample, the resultant solution was adjusted to a pH in the range of 9–11 with an aqueous 4.8% NaOH solution and made to produce a testing sample solution by the addition of 1 ml of an aqueous 4M-KCl solution.

The calibration curve sample solutions and the testing sample solutions thus prepared were assayed with a calcium ion electrode 93-20 and a reference electrode 90-01, both made by Orion K.K. in a titrating device made by Hiranuma Sangyo K.K. and sold under the trademark designation of "COMTITE-550."

The quantity of calcium ion binded by a given sample (polymer) was found by calculation using the values found consequently of the sample solutions for the calibration curve and for the testing. This quantity, i.e. the quantity of the binded calcium ion per g of the solid content of the relevant polymer, was expressed in the number of mg as reduced to calcium carbonate. This quantity was reported as the value of Ca-binding capacity.

(6) Clay Dispersing Property

A buffer was prepared by diluting 67.56 g of glycine, 52.6 g of sodium chloride, and 2.4 g of NaOH with purified water to give a total weight of 600 g. Sixty (60) g of the buffer and 0.3268 g of calcium chloride dihydrate were added together and were further purified water was added to give a total weight of 1000 g (to be used as a buffer). Four (4) g (reduced to a weight of a solid component) of an aqueous 0.1 mass % solution of a given copolymer and 36 g of the buffer added thereto were stirred together to form a dispersion. In a test tube measuring 18 mm in diameter and 180 mm in height (made by Iwaki Glass K.K.), 0.3 g of clay (made by Nippon Funtai Kogyo Gijutsu Kyokai Corp. and sold under the product code of "Testing Dust Type 8") was placed and then 30 g of the dispersion mentioned above was added thereto and they are together sealed in the test tube.

The test tube was shaken till the clay was uniformly dispersed. Thereafter, the test tube was left standing at rest in a dark place for 20 hours. At the end of the 20 hours' standing, 5 ml of the supernatant of the dispersion was taken and tested for absorbency with an UV spectroscope using a 1-cm cell and a wavelength of 380 nm (made by Shimadzu Seisakusho K.K. and sold under the product code of "UV-1200"). The larger the absorbency is, the higher the clay dispersing property is.

(7) Compatibility with Liquid Detergent

Detergents containing novel copolymers obtained in the following working examples were rated for compatibility with a liquid detergent.

Various detergents were prepared by using novel copolymers obtained in the working examples and the following components. These materials were thoroughly stirred till the relevant components were uniformly blended and the resultant samples were tested for turbidity at 25° C. A turbidometer made by Nippon Denshoku K.K. and sold under the product code of "NDH2000" was used for the measurement of the turbidity (kaolin turbidity mg/liter).

The results were rated on the following three-point scale, wherein

○: Value of turbidity (0–50 (mg/liter)), absence of a visually discernible sign of separation, sedimentation, or cloudiness.

Δ: Value of turbidity (50–200 (mg/liter)), presence of a visually discernible sign of slight cloudiness X: Value of turbidity (not less than 200 (mg/liter)), presence of a visually discernible sign of cloudiness Formulation of Detergent:

SFT-70H (Softanol 70H polyoxyethylenealkyl ether, made by Nippon Shokubai Co., Ltd.); 11 g Neopelex F-65 (sodium dodecylbenzene sulfonate made by Kao Corporation): 32 g
Diethanol amine: 10 g
Ethanol; 5 g
Propylene glycol; 15 g
A novel copolymer and a comparative polymer obtained in examples; 1.5 g (each)
Water; Balance Example 31

In a separable flask made of SUS, having an inner volume of 2.5 liters, and provided with a reflux condenser and a stirrer, 145.0 g of purified water was placed (initial charging) and heated as stirred to 90° C.

Then, 180.0 g (2.00 mols) of an aqueous 80% acrylic acid solution (hereinafter abbreviated as "80% AA"), 8.33 g (0.10 mol) of 48% sodium hydroxide (hereinafter abbreviated as "48% NaOH"), 328.8 g (0.50 mol) of an unsaturated alcohol resulting from adding 10 mols of ethylene oxide to 80% 3-methyl-3-buten-1-ol (hereinafter referred to as "80% IPN-10"), 66.7 g (4.0 g/mol as reduced to the quantity of monomer introduced (wherein the expression "quantity of monomer introduced" as used herein means the quantity of all the monomers introduced; which similarly applies hereinafter) of an aqueous 15% sodium persulfate solution (hereinafter abbreviated as "15% NaPS"), 57.1 g (8.0 g/mol as reduced relative to the quantity of monomer introduced) of an aqueous 35% sodium bisulfite solution (hereinafter abbreviated as "35% SBS"), and 100 g of purified water were added dropwise to the reaction system of polymerization kept stirred at a fixed temperature of about 90° C. through respectively independent dropping nozzles. The duration of dropwise addition was 180 minutes for the 80% AA and the 48% NaOH, 170 minutes for the 80% IPN-10, 175 minutes for the 35% SBS, and 210 minutes for the 15% NaPS and the purified water. The components were each continuously added dropwise at a fixed speed throughout the entire length of dropwise addition.

After completion of the dropwise addition, the reaction solution was retained at 90° C. over a period of 30 minutes to age the reaction solution and complete the polymerization. After completion of the polymerization, the reaction solution was left cooling and then neutralized by having 75.0 g (0.90 mol) of an aqueous 48% sodium hydroxide solution gradually added dropwise to the reaction solution in a stirred state. Thus, an unsaturated polyalkylene glycol type copolymer having a solid component concentration of 45 mass % and a final degree of neutralization of 50 mol % (hereinafter referred to "polymer (31)"). The prescriptions for the polymer are summarized in Table 12 below.

The polymer (31) consequently obtained was measured for molecular weight, value S, value b, value q or value Q, Ca-binding capacity, clay dispersing ability, and compatibility with a liquid detergent. The results are shown in Tables 18 and 20 below.

Examples 32–39

Polymers (32)–(39) were obtained by following the procedure of Example 31. The prescriptions for the polymers are summarized in Tables 12 and 13 below.

The polymers (32)–(39) consequently obtained were measured each for molecular weight, value S, value b, value q or value Q, Ca-binding capacity, clay dispersing ability, and compatibility with a liquid detergent. The results are shown in Tables 18 and 20 below.

TABLE 12

| | | Example | | | | |
|---|---|---|---|---|---|---|
| | | 31 | 32 | 33 | 34 | 35 |
| | | Polymer | | | | |
| | | (31) | (32) | (33) | (34) | (35) |
| Initial charge of purified water | (g) | 250.0 | 230.0 | 255.0 | 200.0 | 145.0 |
| Dropwise addition | | | | | | |
| 80% AAaq | (g) | 180.0 | 360.0 | 342.0 | 342.0 | 243.7 |
| | (mol) | 2.00 | 4.00 | 3.80 | 3.80 | 2.71 |
| 80% IPN-10 | (g) | 328.8 | 90.1 | 131.5 | 131.5 | 131.2 |
| | (mol) | 0.50 | 0.14 | 0.20 | 0.20 | 0.20 |
| 48% NaOHaq | (g) | 8.33 | 16.67 | 15.83 | 15.83 | 11.28 |
| | (mol) | 0.10 | 0.20 | 0.19 | 0.19 | 0.14 |
| 35% SBSaq | (g) | 57.1 | 94.6 | 91.4 | 57.1 | 41.5 |
| | (g/mol) | 8.0 | 8.0 | 8.0 | 5.0 | 5.0 |
| 15% NaPSaq | (g) | 66.7 | 110.3 | 106.7 | 106.7 | 96.9 |
| | (g/mol) | 4.0 | 4.0 | 4.0 | 4.0 | 5.0 |
| Water | (g) | 100.0 | 0.0 | 0.0 | 60.0 | 60.0 |
| Duration of dropwise addition | (min) | | | | | |
| 80% AAaq | | 0–180 | 0–180 | 0–180 | 0–180 | 0–180 |
| 80% IPN-10 | | 0–170 | 0–170 | 0–170 | 0–180 | 0–180 |
| 80% NaOHaq | | 0–180 | 0–180 | 0–180 | 0–180 | 0–180 |
| 35% SBSaq | | −10–180 | −10–180 | −10–180 | 0–170 | 0–170 |
| 15% NaPSaq | | 0–210 | 0–210 | 0–210 | 0–210 | 0–240 |
| Water | | 0–↑ | — | — | 0–↑ | 0–↑ |
| Polymerization and ageing temperature | (°C.) | 90 | 90 | 90 | 90 | 90 |
| Aging time | (min) | 30 | 30 | 30 | 30 | 30 |
| Degree of neutralization after dropwise addition | (%) | 5.0 | 5.0 | 5.0 | 5.0 | 5.0 |
| After treatment | | | | | | |
| 48% NaOHaq | (g) | 75.0 | 150.0 | 142.5 | 142.5 | 101.5 |
| | (mol) | 0.90 | 1.80 | 1.71 | 1.71 | 1.22 |
| Final degree of neutralization | (%) | 50.0 | 50.0 | 50.0 | 50.0 | 50.0 |
| Charged solid component | (%) | 43.06 | 43.14 | 43.19 | 43.25 | 43.17 |
| Polymerization kettle | | SUS2.5L | SUS2.5L | SUS2.5L | SUS2.5L | SUS2.5L |
| Stirring vanes | | Paddle vanes | Paddle vanes | Paddle vanes | Paddle vanes | Paddle vanes |
| Final charge | (g) | 1065.89 | 1051.62 | 1084.93 | 1055.64 | 831.20 |

TABLE 13

| | | Example | | | |
|---|---|---|---|---|---|
| | | 36 | 37 | 38 | 39 |
| | | Polymer | | | |
| | | (36) | (37) | (38) | (39) |
| Initial charge of purified water | (g) | 240.0 | 340.0 | 140.0 | 155.0 |
| Dropwise addition | | | | | |
| 80% AAaq | (g) | 250.0 | 342.0 | 243.7 | 295.9 |
| | (mol) | 2.78 | 3.80 | 2.71 | 3.29 |
| 80% IPN-10 | (g) | 250.0 | 131.5 | 131.2 | 32.9 |
| | (mol) | 0.38 | 0.20 | 0.20 | 0.05 |
| 48% NaOHaq | (g) | 11.57 | 15.83 | 11.28 | 13.70 |
| | (mol) | 0.14 | 0.19 | 0.14 | 0.16 |
| 35% SBSaq | (g) | 45.1 | 57.1 | 66.5 | 76.3 |
| | (g/mol) | 5.0 | 5.0 | 8.0 | 8.0 |
| 15% NaPSaq | (g) | 105.3 | 106.7 | 96.9 | 89.0 |
| | (g/mol) | 5.0 | 4.0 | 5.0 | 4.0 |
| Water | (g) | 60.0 | 60.0 | 60.0 | 0.0 |
| Duration of dropwise addition | (min) | | | | |
| 80% AAaq | | 0–180 | 0–180 | 0–180 | 0–180 |
| 80% IPN-10 | | 0–180 | 0–180 | 0–180 | 0–180 |
| 80% NaOHaq | | 0–180 | 0–180 | 0–180 | 0–180 |
| 35% SBSaq | | 0–170 | 0–170 | 0–180 | 0–180 |
| 15% NaPSaq | | 0–240 | 0–210 | 0–240 | 0–210 |

TABLE 13-continued

|  |  | Example 36 | Example 37 | Example 38 | Example 39 |
|---|---|---|---|---|---|
|  |  | Polymer (36) | Polymer (37) | Polymer (38) | Polymer (39) |
| Water |  | 0–↑ | 0–↑ | 0–↑ | — |
| Polymerization and ageing temperature | (° C.) | 90 | 90 | 90 | 90 |
| Aging time | (min) | 30 | 30 | 30 | 30 |
| Degree of neutralization after dropwise addition | (%) | 5.0 | 5.0 | 5.0 | 5.0 |
| After treatment |  |  |  |  |  |
| 48% NaOHaq | (g) | 104.2 | 142.5 | 101.5 | 123.3 |
|  | (mol) | 1.25 | 1.71 | 1.22 | 1.48 |
| Final degree of neutralization | (%) | 50.0 | 50.0 | 50.0 | 50.0 |
| Charged solid component | (%) | 43.35 | 38.19 | 43.18 | 43.15 |
| Polymerization kettle |  | SUS2.5L | SUS2.5L | SUS2.5L | SUS2.5L |
| Stirring vanes |  | Paddle vanes | Paddle vanes | Paddle vanes | Paddle vanes |
| Final charge | (g) | 1066.12 | 1195.64 | 851.12 | 786.07 |

Examples 40–42

Polymers (40)–(42) were obtained by following the procedure of Example 31 while using an unsaturated alcohol resulting from the addition of 50 mols of ethylene oxide to 50% 3-methyl-3-buten-1-ol (hereinafter referred to as "50% IPN-50") in place of the 80% IPN-10. The prescriptions for the polymers are summarized in Table 14 below.

The polymers (40)–(42) consequently obtained were each tested for molecular weight, value S, value b, value q or value Q, Ca-binding capacity, clay dispersing ability and compatibility with a liquid detergent. The results are shown in Tables 18 and 20 below.

TABLE 14

|  |  | Example 40 | Example 41 | Example 42 |
|---|---|---|---|---|
|  |  | Polymer (40) | Polymer (41) | Polymer (42) |
| Initial charge of purified water | (g) | 151.0 | 145.0 | 238.0 |
| Dropwise addition |  |  |  |  |
| 80% AAaq | (g) | 300.0 | 270.0 | 450.0 |
|  | (mol) | 3.33 | 3.00 | 5.00 |
| 50% IPN-50 | (g) | 120.0 | 168.0 | 80.0 |
|  | (mol) | 0.03 | 0.04 | 0.02 |
| 48% NaOHaq | (g) | 13.89 | 12.50 | 20.83 |
|  | (mol) | 0.17 | 0.15 | 0.25 |
| 35% SBSaq | (g) | 76.8 | 69.4 | 86.0 |
|  | (g/mol) | 8.0 | 8.0 | 6.0 |
| 15% NaPSaq | (g) | 89.6 | 81.0 | 100.3 |
|  | (g/mol) | 4.0 | 4.0 | 3.0 |
| Water | (g) | 0.0 | 0.0 | 0.0 |
| Duration of dropwise addition | (min) |  |  |  |
| 80% AAaq |  | 0–180 | 0–180 | 0–180 |
| 50% IPN-50 |  | 0–120 | 0–120 | 0–150 |
| 80% NaOHaq |  | 0–180 | 0–180 | 0–180 |

TABLE 14-continued

|  |  | Example 40 | Example 41 | Example 42 |
|---|---|---|---|---|
|  |  | Polymer (40) | Polymer (41) | Polymer (42) |
| 35% SBSaq |  | 0–180 | 0–180 | 0–180 |
| 15% NaPSaq |  | 0–210 | 0–210 | 0–210 |
| Water |  |  |  |  |
| Polymerization and ageing temperature | (° C.) | 90 | 90 | 90 |
| Aging time | (min) | 30 | 30 | 30 |
| Degree of neutralization after dropwise addition | (%) | 5.0 | 5.0 | 5.0 |
| After treatment |  |  |  |  |
| 48% NaOHaq | (g) | 124.9 | 112.5 | 187.5 |
|  | (mol) | 1.50 | 1.35 | 2.25 |
| Final degree of neutralization | (%) | 50.0 | 50.0 | 50.0 |
| Charged solid component | (%) | 43.02 | 43.04 | 43.02 |
| Polymerization kettle |  | SUS2.5L | SUS2.5L | SUS2.5L |
| Stirring vanes |  | Paddle vanes | Paddle vanes | Paddle vanes |
| Final charge | (g) | 876.18 | 858.39 | 1162.70 |

Example 43

A polymer was obtained by following the procedure of Example 31 while using an unsaturated alcohol resulting from adding 5 mols of ethylene oxide to 80% allyl alcohol in place of the 80% IPN-10 (hereinafter referred to as "80% PEA A-5"). The prescriptions for this polymer are summarized in Table 15 blow.

The polymer (43) consequently obtained was measured for molecular weight, value S, value b, value q or value Q, Ca-binding capacity, dispersing ability, and compatibility with a liquid detergent. The results are shown in Tables 18 and 20 below.

TABLE 15

|  |  | Example 43 Polymer (43) |
|---|---|---|
| Initial charge of purified water | (g) | 270.0 |
| Dropwise addition |  |  |
| 80% AAaq | (g) | 360.0 |
|  | (mol) | 4.00 |
| 80% PEA-5 | (g) | 140.0 |
|  | (mol) | 0.40 |
| 48% NaOHaq | (g) | 16.67 |
|  | (mol) | 0.20 |
| 35% SBSaq | (g) | 100.6 |
|  | (g/mol) | 8.0 |
| 15% NaPSaq | (g) | 117.4 |
|  | (g/mol) | 4.0 |
| Water | (g) | 0.0 |
| Duration of dropwise addition | (min) |  |
| 80% AAaq |  | 0–180 |
| 80% PEA-5 |  | 0–180 |
| 80% NaOHaq |  | 0–180 |
| 35% SBSaq |  | 0–180 |

TABLE 15-continued

|  |  | Example 43 Polymer (43) |
|---|---|---|
| 15% NaPSaq |  | 0–210 |
| Water |  | '0–↑ |
| Polymerization and ageing temperature | (° C.) | 90 |
| Aging time | (min) | 30 |
| Degree of neutralization after dropwise addition | (%) | 5.0 |
| After treatment |  |  |
| 48% NaOHaq | (g) | 150.0 |
|  | (mol) | 1.80 |
| Final degree of neutralization | (%) | 50.0 |
| Charged solid component | (%) | 43.03 |
| Polymerization kettle |  | SUS2.5L |
| Stirring vanes |  | Paddle vanes |
| Final charge | (g) | 1154.71 |

Example 44

A polymer (44) was obtained by following the procedure of Example 31 while using maleic anhydride (hereinafter referred to as "100% MA") as a third monomer component. The prescriptions for this polymer are summarized in Table 16 below.

The polymer (44) consequently obtained was measured for molecular weight, value S, value b, value q or value Q, Ca-binding capacity, clay dispersing ability, and compatibility with a liquid detergent. The results are shown in Tables 18 and 20 below.

TABLE 16

|  |  | Example 44 Polymer (44) |
|---|---|---|
| Initial charge of purified water |  (g) | 297.0 |
| Dropwise addition |  |  |
| 80% AAaq | (g) | 300.0 |
|  | (mol) | 3.33 |
| 100% MA | (g) | 16.9 |
|  | (mol) | 0.17 |
| 80% IPN-10 | (g) | 175.0 |
|  | (mol) | 0.27 |
| 48% NaOHaq | (g) | 30.65 |
|  | (mol) | 0.37 |
| 35% SBSaq | (g) | 86.2 |
|  | (g/mol) | 8.0 |
| 15% NaPSaq | (g) | 100.6 |
|  | (g/mol) | 4.0 |
| Water | (g) | 0.0 |
| Duration of dropwise addition | (min) |  |
| 80% AAaq |  | 0–180 |
| 100% MA |  | 0–110 |
| 80% IPN-10 |  | 0–180 |
| 80% NaOHaq |  | 0–180 |
| 35% SBSaq |  | 0–180 |
| 15% NaPSaq |  | 0–210 |

TABLE 16-continued

|  |  | Example 44 Polymer (44) |
|---|---|---|
| Water |  | — |
| Polymerization and ageing temperature | (° C.) | 90 |
| Aging time | (min) | 30 |
| Degree of neutralization after dropwise addition | (%) | 10.0 |
| After treatment |  |  |
| 48% NaOHaq | (g) | 122.5 |
|  | (mol) | 1.47 |
| Final degree of neutralization | (%) | 50.0 |
| Charged solid component | (%) | 43.03 |
| Polymerization kettle |  | SUS2.5L |
| Stirring vanes |  | Paddle vanes |
| Final charge | (g) | 1128.85 |

Example 45

A polymer (45) was obtained by following the procedure of Example 31 while using 100% methacrylic acid as a third monomer component (hereinafter referred to as "100% MAA"). The prescriptions for the polymer are summarized in Table 17 below.

The polymer (45) consequently obtained was measured for molecular weight, value S, value b, value q or value Q, Ca-binding capacity, clay dispersing ability, and compatibility with a liquid detergent. The results are shown in Tables 18 and 20 below.

TABLE 17

|  |  | Example 45 Polymer (45) |
|---|---|---|
| Initial charge of purified water | (g) | 214.0 |
| Dropwise addition |  |  |
| 80% AAaq | (g) | 225.0 |
|  | (mol) | 2.50 |
| 100% MAA | (g) | 60.0 |
|  | (mol) | 0.70 |
| 80% IPN-10 | (g) | 75.0 |
|  | (mol) | 0.11 |
| 48% NaOHaq | (g) | 13.32 |
|  | (mol) | 0.16 |
| 35% SBSaq | (g) | 75.7 |
|  | (g/mol) | 8.0 |
| 15% NaPSaq | (g) | 88.3 |
|  | (g/mol) | 4.0 |
| Water | (g) | 0.0 |
| Duration of dropwise addition | (min) |  |
| 80% AAaq |  | 0–180 |
| 100% MAA |  | 0–180 |
| 80% IPN-10 |  | 0–180 |
| 80% NaOHaq |  | 0–180 |
| 35% SBSaq |  | 0–180 |
| 15% NaPSaq |  | 0–210 |
| Water |  | — |
| Polymerization and ageing temperature | (° C.) | 90 |
| Aging time | (min) | 30 |

TABLE 17-continued

| | | Example 45 Polymer (45) |
|---|---|---|
| Degree of neutralization after dropwise addition | (%) | 5.0 |
| After treatment | | |
| 48% NaOHaq | (g) | 120.0 |
| | (mol) | 1.44 |
| Final degree of neutralization | (%) | 50.0 |
| Charged solid component | (%) | 43.03 |
| Polymerization kettle | | SUS2.5L |
| Stirring vanes | | Paddle vanes |
| Final charge | (g) | 871.33 |

Comparative Example 5

In a separable flask having an inner volume of 1000 ml and provided with a stirrer, a condenser, a thermometer, a nitrogen inlet tube, and a dropping funnel, 200 g of an aqueous 63.87 mass % IPN-10 solution was placed and, with the interior of the flask displaced with nitrogen, the aqueous solution was heated as stirred to 65° C. At the point that the temperature reached a prescribed level, 1.58 g of an aqueous 30 mass % hydrogen peroxide solution was introduced all at once. Then, 32.61 g of 100 mass % acrylic acid, 29.29 g of an aqueous 2.1 mass % L-ascorbic acid solution, and 17.22 g of an aqueous 3 mass % mercapto propionic acid solution were respectively added dropwise to the solution in the flask. The acrylic acid monomer and the mercapto propionic acid were added dropwise over a period of 60 minutes and the L-ascorbic acid was added dropwise over a period of 90 minutes. After completion of the dropwise addition of the aqueous L-ascorbic acid solution, the resultant reaction solution was left aging at the same temperature for 120 minutes to complete the polymerization and obtain a comparative polymer (5).

The comparative polymer (5) was measured for molecular weight, value S, value b, value Q, Ca-binding capacity, clay dispersing ability, and compatibility with a liquid detergent. The results are shown in Tables 18 and 19 below.

Comparative Example 6

In a separable flask having an inner volume of 500 ml and provided with a stirrer, a condenser, a thermometer, a nitrogen inlet tube, and a dropping funnel, 167.24 g of purified water was placed and, with the interior of the flask displaced with nitrogen, the water was heated as stirred to 95° C. 28.9 g of an aqueous 3 mass % ammonium persulfate solution, 82.67 g of an aqueous 50 mass % IPN-25 solution, and an aqueous solution resulting from mixing 8.25 g of an aqueous 80% acrylic acid solution with 48.75 g of 40% ammonium acrylate were respectively added dropwise to the solution in the flask. The IPN-25 and the acrylic acid monomer were added dropwise over a period of 120 minutes and the aqueous ammonium persulfate solution was added dropwise over a period of 150 minutes. After completion of the dropwise addition of the IPN-25 and the acrylic monomer, the resultant reaction solution was left aging at the same temperature for 30 minutes to complete the polymerization. After the polymerization, the reaction solution was made by the addition of 1.5 g of an aqueous 28% ammonia solution to form a comparative polymer (6).

The comparative polymer (6) was measured for molecular weight, value S, value b, value Q, Ca-binding capacity, clay dispersing ability, and compatibility with a liquid detergent. The results are shown in Tables 18 and 19 below.

Comparative Example 7

In a separable flask having an inner volume of 500 ml and provided with a stirrer, a condenser, a thermometer, a nitrogen inlet tube, and a dropping funnel, 174.2 g of purified water was placed and, with the interior of the flask displaced with nitrogen, the water was heated as stirred to 100° C. At the point that the temperature reached the stated level, 32.5 g of an aqueous 3 mass % sodium persulfate solution, 82.67 g of an aqueous 50 mass % IPN-10 solution, and an aqueous solution resulting from mixing 8.25 g of an aqueous 80% acrylic acid solution with 56.2 g of 37% sodium acrylate were respectively added dropwise to the solution in the flask. The IPN-10 and the acrylic acid monomer were added dropwise over a period of 120 minutes and the aqueous sodium persulfate solution was added dropwise over a period of 150 minutes. After completion of the dropwise addition of the IPN-10 and the acrylic acid monomer, the resultant reaction solution was left aging at the same temperature for 30 minutes to complete the polymerization. After the polymerization, the resultant reaction solution was made by the addition of 7.43 g of 48% sodium hydroxide, to yield a comparative polymer (7).

The comparative polymer (7) consequently obtained was measured for molecular weight, value S, value b, value Q, Ca-binding capacity, clay dispersing ability, and compatibility with a liquid detergent. The results are shown in Tables 18 and 19 below.

Comparative Example 8

In a separable flask having an inner volume of 1000 ml and provided with a stirrer, a condenser, a thermometer, a nitrogen inlet tube, and a dropping funnel, 312.9 g of purified water was placed and, with the interior of the flask displaced with nitrogen, the water was heated as stirred to 100° C. At the point that the temperature reached the stated level, 68.9 g of an aqueous 10 mass % sodium persulfate solution, 32.5 g of an aqueous 80 mass % IPN-10 solution, and an aqueous resulting from mixing 15.6 g of an aqueous 80% acrylic acid solution with 332.1 g of 37% sodium acrylate were respectively added dropwise to the solution in the flask. The IPN-10 and the acrylic acid monomer were added dropwise over a period of 120 minutes and the aqueous sodium persulfate was added dropwise over a period of 150 minutes. After completion of the dropwise addition of the IPN-10 and the acrylic monomer, the resultant reaction solution was left aging at the same temperature for 30 minutes to complete the polymerization and obtain a comparative polymer (8).

The comparative polymer (8) consequently obtained was measured for molecular weight, value S, value b, value Q, Ca-binding capacity, clay dispersing ability, and compatibility with a liquid detergent. The results are shown in Tables 18 and 19 below.

TABLE 18

| Polymer | Monomers A/B/C (charge ratio, weight ratio) | Monomer A | Monomer B | Monomer C | Molecular weight, Mw |
|---|---|---|---|---|---|
| (31) | 35/65/0 | AA | IPN-10 | — | 23000 |
| (32) | 80/20/0 | AA | IPN-10 | — | 6500 |
| (33) | 72/28/0 | AA | IPN-10 | — | 8400 |
| (34) | 72/28/0 | AA | IPN-10 | — | 14000 |
| (35) | 65/35/0 | AA | IPN-10 | — | 15000 |
| (36) | 50/50/0 | AA | IPN-10 | — | 15000 |
| (37) | 72/28/0 | AA | IPN-10 | — | 12000 |
| (38) | 65/35/0 | AA | IPN-10 | — | 9100 |
| (39) | 90/10/0 | AA | IPN-10 | — | 5300 |
| (40) | 80/20/0 | AA | IPN-50 | — | 5800 |
| (41) | 72/28/0 | AA | IPN-50 | — | 6500 |
| (42) | 90/10/0 | AA | IPN-50 | — | 7700 |
| (43) | 72/28/0 | AA | PEA-5 | — | 6500 |
| (44) | 60/35/5 | AA | IPN-10 | MA | 14000 |
| (45) | 60/20/20 | AA | IPN-10 | MAA | 7600 |

TABLE 19

| Comparative Polymer | Monomers A/B/C (charge ratio, weight ratio) | Monomer A | Monomer B | Monomer C | Molecular weight, Mw |
|---|---|---|---|---|---|
| (5) | 25/75/0 | AA | IPN-10 | — | 92000 |
| (6) | 35/65/0 | AA | IPN-25 | — | 17000 |
| (7) | 35/65/0 | AA | IPN-10 | — | 5900 |
| (8) | 80/20/0 | AA | IPN-10 | — | 6000 |

TABLE 20

| Example | Polymer | Value s | Value b (40%) | Binding ability | Dispersing ability | Value q | Value Q | Compatibility |
|---|---|---|---|---|---|---|---|---|
| 31 | (31) | 5 | 1 | 105 | 0.3 | — | 55 | ○ |
| 32 | (32) | 9 | <1 | 215 | 0.5 | 0.008 | — | ○ |
| 33 | (33) | 8 | 1 | 205 | 0.5 | 0.004 | — | ○ |
| 34 | (34) | 12 | <1 | 215 | 0.4 | 0.002 | — | ○ |
| 35 | (35) | 13 | <1 | 215 | 0.3 | 0.003 | — | ○ |
| 36 | (36) | 7 | 1 | 170 | 0.3 | — | 145 | ○ |
| 37 | (37) | 11 | <1 | 225 | 0.4 | 0.003 | — | ○ |
| 38 | (38) | 17 | <1 | 200 | 0.4 | 0.005 | — | ○ |
| 39 | (39) | 16 | <1 | 220 | 0.4 | 0.010 | — | ○ |
| 40 | (40) | 16 | 1 | 210 | 0.4 | 0.089 | — | ○ |
| 41 | (41) | 11 | <1 | 200 | 0.4 | 0.078 | — | ○ |
| 42 | (42) | 20 | <1 | 215 | 0.4 | 0.073 | — | ○ |
| 43 | (43) | 12 | 1 | 195 | 0.3 | — | 190 | ○ |
| 44 | (44) | 18 | 1 | 235 | 0.3 | 0.005 | — | ○ |
| 45 | (45) | 16 | 1 | 210 | 0.4 | 0.002 | — | ○ |
| Comparative Example 5 | Comparative polymer (5) | 0 | 3 | 60 | 0.2 | — | 4 | ○ |
| 6 | (6) | 0 | 11 | 90 | 0.3 | — | 20 | ○ |
| 7 | (7) | 0 | 4 | 85 | 0.3 | — | 24 | ○ |
| 8 | (8) | 0 | 8 | 195 | 0.4 | — | 15 | ○ |

The (meth)acrylic acid type polymer of this invention, in spite of a relatively large molecular weight as compared with the conventional polymer possessing an anti-gelling property, exhibits not only high chelating ability and dispersing ability but also a better anti-gelling property than the conventional polymer. Particularly by satisfying the quantity S representing the quantity of a sulfur element introduced specified above and fulfilling the value R, the iron ion concentration, and the value Q representing the anti-gelling ability mentioned above, the polymer permits a marked decrease in the impurity content. The polymer possesses high quality and excels in stability of preservation which is free from such problems as degradation of performance and precipitation of an impurity during the preservation at a low temperature. Thus, it can be advantageously applied to such uses as a dispersant, a descaling agent, and a detergent builder. Moreover, it is highly advantageous in terms of cost over the conventional polymer.

The method for the production of a (meth)acrylic acid type polymer of this invention can produce a polymer of a low molecular weight efficiently under the condition of such a high concentration as has never been attained heretofore. By performing the polymerization at a low temperature over a long span of time, this method is enabled to repress the emission of sulfur dioxide gas. Then, by decreasing the quantity of an initiator (preferably also by lowering the degree of neutralization in the process of polymerization), the method allows the occurrence of an impurity to be repressed. By this method, it is made possible to produce a (meth)acrylic acid type polymer of a markedly enhanced performance. The produced (meth)acrylic acid type polymer entails neither degradation of performance nor precipitation of an impurity during the preservation at a low temperature. Further, it can retain the high performance endowed during the course of production stably and constantly without being influenced by the environment of storage (namely, it can manifest fully satisfactorily the inherent performance without being degraded).

Since this method enables the initiator system to function highly satisfactorily in the polymerization at a low temperature which is apparently regarded as deficient in productivity, it obviates the necessity for adding an excess initiator to the reaction system of polymerization. It is, therefore, capable of repressing the rise of cost for the production of the polymer and exalting the efficiency of production in addition to repressing the emission of sulfur dioxide gas and the precipitation of an impurity.

Further, by the method of this invention, it is made possible to obtain a (meth)acrylic acid type polymer which has the value S representing the quantity of a sulfur element introduced, the value R, the iron ion concentration, the value Q representing the quantity of an anti-gelling ability, and further the weight average molecular weight invariably falling in the prescribed ranges. The polymer manifests various properties such as dispersibility, chelating ability, and anti-gelling property most effectively. The polymer of this high quality can be obtained by the polymerization at a high concentration in one step without entailing any addition to the quantity of an initiator. The method, therefore, greatly exalts the productivity as by omitting the step of concentration and effectively represses the rise of the cost of production.

The detergent of this invention contains the (meth)acrylic acid type polymer described above. Thus, it forms a high-performance detergent builder which combines dispersibility, chelating ability, and anti-gelling property. It entails neither degradation of performance with time nor precipitation of an impurity during the preservation at a low temperature and retains stably constantly the high performance endowed during the course of production without being influenced by the environment of preservation. This the product of this invention can contribute markedly to the enhancement of the quality of a detergent.

The unsaturated polyalkylene glycol type copolymer of this invention possesses high chelating ability and dispersibility and exhibits a better anti-gelling property than the conventional polymer. Particularly by satisfying the value S representing the quantity of a sulfur element introduced which is defined above, it is enabled to repress the occurrence of an impurity markedly. This polymer possesses high quality and excels in stability of preservation and avoids entailing such problems as degradation of performance and occurrence of an impurity during the preservation at a low temperature. Thus, it can be advantageously applied to such uses as a dispersant, a descaling agent, a detergent builder, and a cement additive. Moreover, it is highly advantageous in terms of cost as compared with the conventional polymer.

By the method for the production of an unsaturated polyalkylene glycol type copolymer of this invention, it is made possible to produce efficiently the polymer of a low molecular weight under the condition of such a high concentration as has never been attained by the conventional method. Further, by performing the polymerization at a low temperature for a long time, it is made possible to repress the occurrence of sulfur dioxide gas. The occurrence of an impurity can also be repressed by decreasing the quantity of an initiator (preferably also by lowering the degree of neutralization during the process of polymerization). By these method, it is made possible to produce an unsaturated polyalkylene glycol type copolymer of markedly enhanced performance. The produced unsaturated polyalkylene glycol type copolymer entails neither degradation of performance nor precipitation of an impurity during the preservation at a low temperature. It also is capable of stably retaining constantly the high performance endowed during the course of production without being influenced by the environment of preservation (namely, the inherently owned performance can be manifested fully satisfactorily without being impaired).

Since the method of this invention enables the initiator system to function highly satisfactorily in the polymerization at a low temperature which is apparently regarded as deficient in productivity, it obviates the necessity for adding an excess initiator to the reaction system of polymerization.

Thus, it can repress the rise of the cost of production of the polymer and exalt the efficiency of production in addition to curbing the emission of sulfur dioxide gas and the precipitation of an impurity.

By the method of this invention, it is made possible to obtain an unsaturated polyalkylene glycol type copolymer which has the value S representing the quantity of a sulfur element introduced and the weight average molecular weight confined within the stated ranges. The polymer manifests various properties such as dispersibility, chelating ability, and an anti-gelling property most effectively. Moreover, this method is capable of producing the polymer of such high quality at a high concentration in one step without entailing an increase in the quantity of an initiator. Thus, it is capable of markedly exalting productivity as by omitting a step of concentration and effectively repressing the rise of the cost of production.

The detergent of this invention contains the unsaturated polyalkylene glycol type copolymer described above. Thus, it forms a high-performance detergent builder which combines dispersibility, chelating ability, and an anti-gelling property. It entails neither degradation of performance with time nor precipitation of an impurity during the preservation at a low temperature and stably retains constantly the high performance endowed during the course of production without being influenced by the environment of preservation. Thus, it can greatly contribute to the enhancement of the quality of a detergent.

The entire disclosure of Japanese Patent Application No. 2001-307757 filed on Oct. 3, 2001 and No. 2002-180455 filed on Jun. 20, 2001 including specification, claims, drawings, and summary are incorporated herein by reference in its entirety.

What is claimed is:

1. A (meth)acrylic acid type polymer having a sulfur-containing group linked to the terminal portion of said (meth)acrylic acid type polymer comprising a value S, wherein said value S is not less than 35 and said value S represents the quantity of a sulfur element introduced which is defined by the formula, S=(quantity of S contained in polymer)/(total quantity of S)×100.

2. A (meth)acrylic acid type polymer according to claim 1 further comprising a value R, said value R=(integral ratio of signals of 2.3–4.3 ppm)/(integral ratio of 0.8–4.3 ppm including the signal of PSA)×100 in the $^1$H-NMR spectrum is in the range of 1–15.

3. A (meth)acrylic acid type polymer according to claim 1 further comprising an iron ion concentration of said (meth)acrylic acid type polymer in the range of 0.05–10 ppm.

4. A (meth)acrylic acid type polymer according to claim 1 further comprising a value Q, said value Q=degree of gelation×$10^5$/weight average molecular weight is less than 3.0.

5. A method for the production of a (meth) acrylic acid type polymer, characterized by using as an initiator the combination of one or more species respectively of a persulfate and a bisulfite, wherein the bisulfite is used in a proportion in the range of 0.5–5 by mass ratio relative to the mass of the persulfate taken as 1, the total quantity of the persulfate and the bisulfite to be added to the reaction system of polymerization is in the range of 2–20 g per mol of the monomer to be polymerized, and the polymerization temperature is in the range of 25–99° C.

6. A method according to claim 5, wherein the degree of neutralization in the process of polymerization is in the range of 1–25 mol %.

7. A detergent builder comprising a (meth)acrylic acid type polymer of claim 1.

8. A detergent comprising a (meth)acrylic acid type polymer of claim 1.

9. A (meth)acrylic acid type polymer according to claim 1, wherein said (meth)acrylic acid type polymer is obtained by using as an initiator the combination of one or more species respectively of a persulfate and a bisulfite, the bisulfite is used in a proportion in the range of 0.5–5 by mass ratio relative to the mass of the persulfate taken as 1, the total quantity of the persulfate and the bisulfite to be added to the reaction system of polymerization is in the range of 2–20 g per mol of the monomer to be polymerized, the polymerization temperature is in the range of 50–95° C., and the degree of neutralization in the process of polymerization is in the range of 1–25 mol %.

* * * * *